(12) United States Patent
Wang et al.

(10) Patent No.: US 12,549,949 B2
(45) Date of Patent: Feb. 10, 2026

(54) NODE HANDOVER METHOD AND APPARATUS

(71) Applicant: HUAWEI TECHNOLOGIES CO., LTD., Guangdong (CN)

(72) Inventors: Rui Wang, Shanghai (CN); Mingzeng Dai, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 666 days.

(21) Appl. No.: 17/965,183

(22) Filed: Oct. 13, 2022

(65) Prior Publication Data
US 2023/0034534 A1    Feb. 2, 2023

Related U.S. Application Data

(63) Continuation of application No. PCT/CN2021/085968, filed on Apr. 8, 2021.

(30) Foreign Application Priority Data

Apr. 17, 2020   (CN) .......................... 202010306629.4

(51) Int. Cl.
*H04W 12/10* (2021.01)
*H04W 36/00* (2009.01)
(Continued)

(52) U.S. Cl.
CPC ....... *H04W 12/10* (2013.01); *H04W 36/0064* (2023.05); *H04W 36/0235* (2023.05);
(Continued)

(58) Field of Classification Search
CPC ............. H04W 12/10; H04W 36/0064; H04W 36/0235; H04W 36/18; H04W 36/00695;
(Continued)

(56) References Cited

U.S. PATENT DOCUMENTS

2003/0137953 A1\*   7/2003   Chae .................... H04W 36/18
                                                                   455/436
2019/0253945 A1    8/2019   Paladugu et al.
(Continued)

FOREIGN PATENT DOCUMENTS

CN        106941733 A     7/2017
CN        109076417 A    12/2018
(Continued)

OTHER PUBLICATIONS

Huawei, HiSilicon, DC based NR scheme for 0ms interruption handover. 3GPP TSG-RAN WG2 #101, Athens, Greece, Feb. 26-Mar. 2, 2018, R2-1802473, 7 pages.

*Primary Examiner* — Marcos Batista
(74) *Attorney, Agent, or Firm* — WOMBLE BOND DICKINSON (US) LLP

(57) ABSTRACT

Embodiments of this application provide a node handover method and an apparatus. A source secondary node receives first handover information and determines to perform an uninterrupted node handover. The source secondary node performs, in a process of the uninterrupted node handover, first processing on first data received by the source secondary node, to obtain second data, and sends the second data to a terminal device. The source secondary node performs second processing on the first data to obtain third data in the process of the uninterrupted node handover, and sends fourth data to the terminal device via a target secondary node. According to some embodiments provided in this application, a communication delay of the terminal device can be reduced, and user experience of the terminal device can be improved.

20 Claims, 34 Drawing Sheets

(51) Int. Cl.
  *H04W 36/02*    (2009.01)
  *H04W 36/18*    (2009.01)
(52) U.S. Cl.
  CPC ...... *H04W 36/18* (2013.01); *H04W 36/00695* (2023.05); *H04W 36/00698* (2023.05)
(58) Field of Classification Search
  CPC ........... H04W 36/00698; H04W 12/03; H04W 12/106; H04W 36/0027; H04W 12/02
  USPC .......................................... 370/331; 455/312
  See application file for complete search history.

(56) References Cited

U.S. PATENT DOCUMENTS

| | | |
|---|---|---|
| 2019/0297537 A1 | 9/2019 | Tsai et al. |
| 2019/0357097 A1 | 11/2019 | Rugeland et al. |
| 2020/0008113 A1 | 1/2020 | Chen |
| 2020/0120552 A1* | 4/2020 | Yang ................. H04W 36/0069 |
| 2020/0396656 A1* | 12/2020 | Yang ............... H04W 36/00698 |
| 2022/0272598 A1* | 8/2022 | Liang ................... H04L 5/0053 |

FOREIGN PATENT DOCUMENTS

| | | |
|---|---|---|
| CN | 109565727 A | 4/2019 |
| CN | 110972223 A | 4/2020 |
| WO | 2019243901 A1 | 12/2019 |
| WO | 2020063847 A1 | 4/2020 |

\* cited by examiner

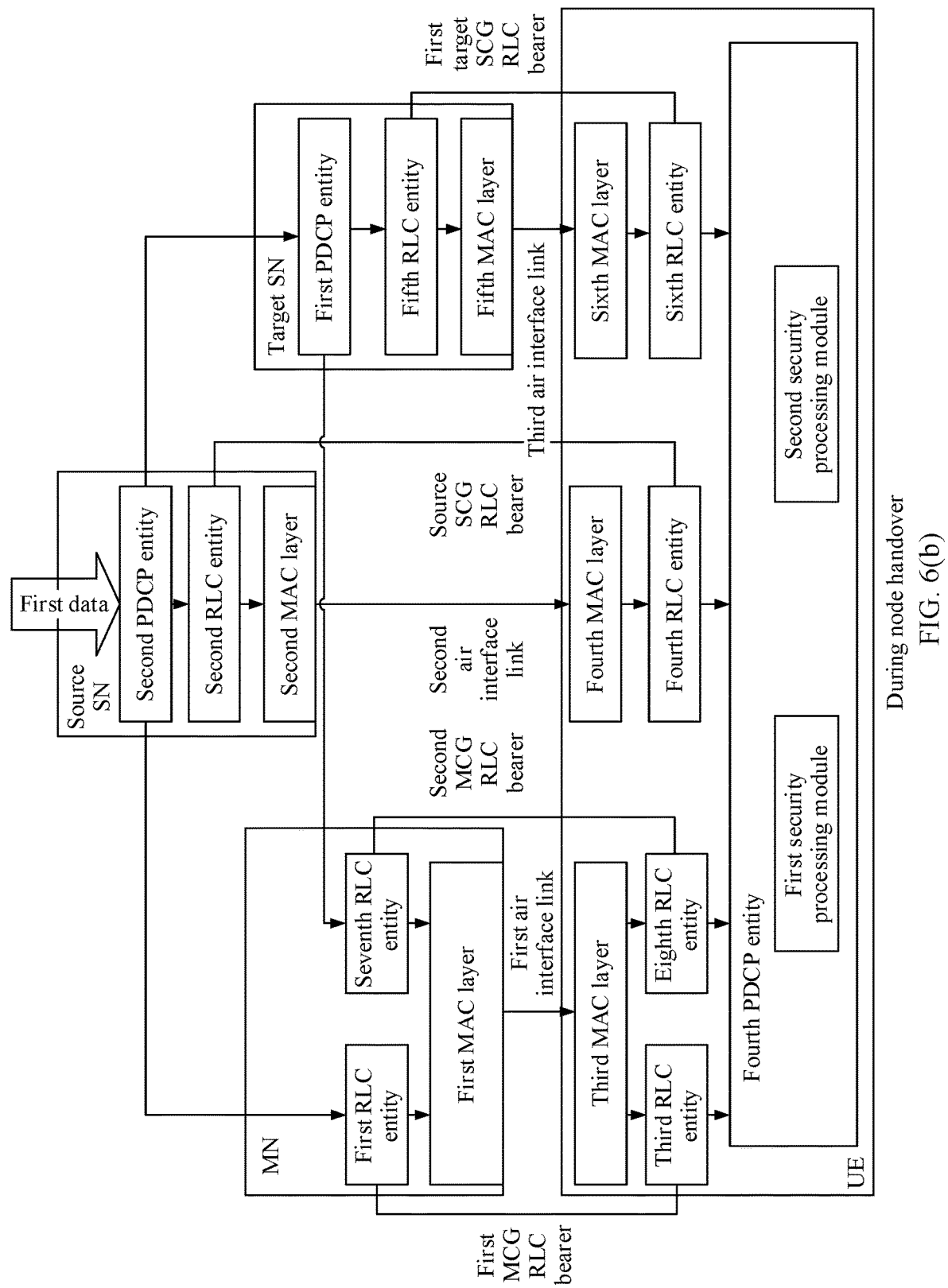
FIG. 6(b) During node handover

During node handover

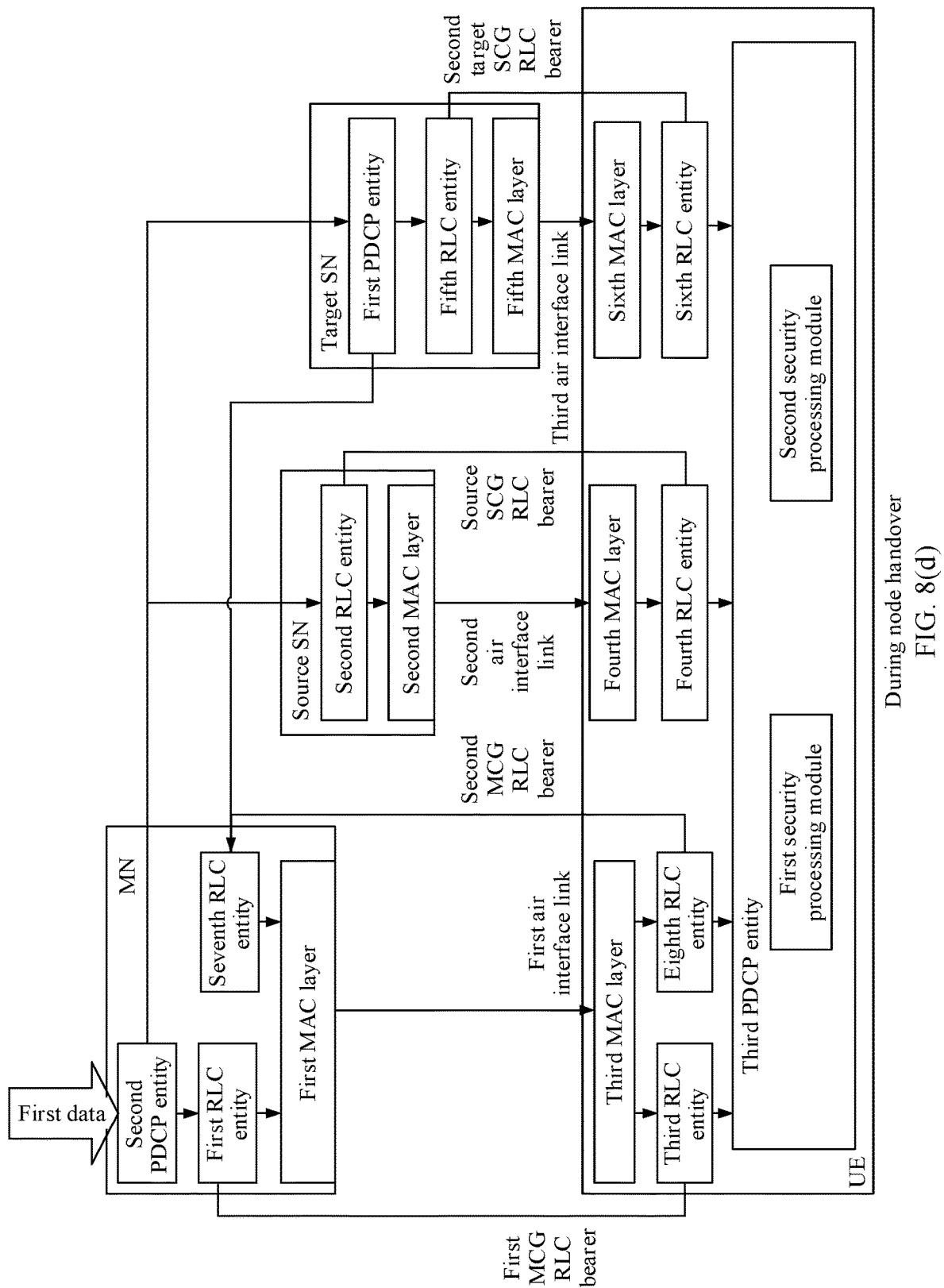
FIG. 8(d) During node handover

NODE HANDOVER METHOD AND APPARATUS

CROSS-REFERENCE TO RELATED APPLICATIONS

This application is a continuation of International Patent Application No. PCT/CN2021/085968, filed on Apr. 8, 2021, which claims priority to Chinese Application No. 202010306629.4, filed on Apr. 17, 2020. The disclosures of the aforementioned applications are hereby incorporated by reference in their entireties.

TECHNICAL FIELD

This application relates to the field of wireless communication, and in particular, to a node handover method and an apparatus.

BACKGROUND

With continuous development of science and technologies, new internet services such as self driving, autonomous driving, and virtual reality are constantly emerging. This also imposes an increasingly high requirement on a wireless communication technology. In a current communication system, to ensure communication quality of a terminal device during movement, serving cell handover is implemented for the terminal device based on a signal strength change between the terminal device and a network device or a load balancing requirement on a network side. To be specific, the terminal device is indicated to be handed over from a currently connected network device (namely, a source node) to a new network device (namely, a target node). In a conventional node handover manner, after receiving a handover indication, the terminal device disconnects from the source node, and then starts to access the target node. As a result, data transmission of the terminal device is interrupted, and delays of some ongoing services are increased.

In a conventional technology, to resolve a problem of the data transmission interruption in a process of the node handover, a simultaneous connection handover solution is proposed. To be specific, after receiving the handover indication, the terminal device does not immediately disconnect from the source node until the terminal device completes random access to the target node. In this way, in a period of time in the process of the handover, the terminal device performs data transmission with both the source node and the target node, so that uninterrupted data transmission is ensured. A multi-radio access technology dual connectivity (MR-DC) technology is proposed to improve spectral efficiency and load balancing by using macro-micro networking and provide a higher data transmission rate for the terminal device. To be specific, one user equipment (UE) may use radio resources scheduled by two nodes. The two nodes are connected to each other via a non-ideal backhaul on an X2 interface. One node is used as a master node (MN), and the other node is referred to as a secondary node (SN). However, the foregoing simultaneous connection handover method is applicable only to a scenario in which the terminal device works in single connectivity mode. In addition, with continuous diversification of communication services, more and more application scenarios in which the terminal device works in dual connectivity mode are to emerge. Therefore, how to avoid data transmission interruption in a process of node handover in dual connectivity mode has become one of urgent problems to be resolved.

SUMMARY

This application provides a node handover method and a communication apparatus. According to the method provided in this application, a problem that data transmission of a terminal device in dual connectivity mode is interrupted in a process of node handover can be resolved, uninterrupted node handover in dual connectivity mode can be implemented, a communication delay of the terminal device is reduced, and user experience of the terminal device is improved.

According to a first aspect, an embodiment of this application provides a node handover method. The method is applicable to a scenario in which a secondary node is handed over and the secondary node is an anchor. The method includes: A master node determines to perform uninterrupted node handover on a terminal device. The master node sends first handover information to a source secondary node. The source secondary node receives the first handover information, and determines to perform uninterrupted node handover on the terminal device. The master node sends third handover information to a target secondary node. The target secondary node receives the third handover information, and determines to perform uninterrupted node handover on the terminal device. The master node sends the third handover information to the terminal device. The terminal device receives the third handover information, and determines to perform uninterrupted node handover. The source secondary node receives first data sent from a core network via a first radio bearer. The source secondary node continues, in a process of the node handover, to perform first processing on the first data to obtain second data, and sends the second data to the terminal device. The terminal device receives and processes the second data. The first processing includes sequence number assignment and performing data encryption and/or integrity protection based on a first key. The source secondary node performs second processing on the first data to obtain third data in the process of the node handover, and sends the third data to the target secondary node. The target secondary node receives the third data, and sends fourth data to the terminal device. The second processing includes the sequence number assignment; and the fourth data is data obtained by performing third processing on the third data by the target secondary node, where the third processing includes performing data encryption and/or integrity protection based on a second key. Alternatively, the fourth data is data obtained by performing third processing on the third data by the master node and sent to the target secondary node by the master node, where the third processing includes performing data encryption and/or integrity protection based on a third key.

In this embodiment of this application, in the process of the node handover, the source secondary node transmits, to the terminal device via both the source secondary node and the target secondary node, the first data that is to be sent to the terminal device by using the first radio bearer, and the first data is correctly received by the terminal device, so that interruption that is due to the node handover and that is of transmission of the first data between the core network and the terminal device does not occur, a problem such as a data transmission delay caused for the terminal device by data transmission interruption caused by the node handover is resolved, applicability and practicability of the node handover method are improved, and user experience of the terminal device is also improved.

With reference to the first aspect, in an embodiment, the source secondary node receives handover complete indication information, where the handover complete indication information indicates that the terminal device successfully accesses the target secondary node. The source secondary node stops data transmission that is between the source secondary node and the terminal device and that is based on the first radio bearer.

With reference to the first aspect, in an embodiment, the source secondary node sends the second data to the terminal device by using a source secondary cell group (SCG) radio link control (RLC) bearer and/or a first master cell group (MCG) RLC bearer. The terminal device receives the second data by using the source secondary cell group (SCG) RLC bearer and/or the first MCG RLC bearer.

With reference to the first aspect, in an embodiment, the terminal device performs data decryption and/or integrity protection verification on the second data based on the first key associated with the source secondary node.

With reference to the first aspect, in an embodiment, the second handover information further indicates the terminal device to stop receiving the second data by using the source SCG RLC bearer and receive the second data by using the first MCG RLC bearer. In the process of the node handover, the second data may be sent to the terminal device by preferentially using the source SCG RLC bearer or the first MCG RLC bearer. In this way, the terminal device does not need to maintain both the source SCG RLC bearer and the first MCG RLC bearer, so that a device capability of the terminal device can be saved.

With reference to the first aspect, in an embodiment, the target secondary node sends the fourth data to the terminal device by using a first target SCG RLC bearer and/or a second MCG RLC bearer. The terminal device receives the fourth data by using the first target SCG RLC bearer and/or the second MCG RLC bearer. Herein, in the process of the node handover, the first data received by the source secondary node from the core network is sent to the terminal device via both the source secondary node and the target secondary node. In this way, it can be ensured that the interruption that is due to the node handover and that is of the data transmission between the core network and the terminal device does not occur, so that a communication delay of the terminal device can be reduced.

With reference to the first aspect, in an embodiment, the second handover information includes first bearer configuration information and/or second bearer configuration information. The terminal device establishes the first target SCG RLC bearer based on the first bearer configuration information, and/or the terminal device establishes the second MCG RLC bearer based on the second bearer configuration information.

With reference to the first aspect, the second handover information further includes first security information, and the first security information indicates the second key associated with the target secondary node. The terminal device performs data decryption and/or integrity protection verification on the fourth data based on the second key.

With reference to the first aspect, in an embodiment, before the fourth data is sent to the terminal device via the target secondary node, the source secondary node sends the third data to the master node. The master node receives the third data, and performs third processing on the third data to obtain fifth data. The master node sends the fourth data to the target secondary node. The fourth data is a part or all of the fifth data. Herein, an example case in which an anchor location changes in the process of the node handover is considered. However, it is also ensured that the first data received by the source secondary node from the core network can be sent to the terminal device via both the source secondary node and the target secondary node. In this way, it can be ensured that the interruption that is due to the node handover and that is of the data transmission between the core network and the terminal device does not occur, so that the communication delay of the terminal device can be reduced.

With reference to the first aspect, in an embodiment, the target secondary node sends the fourth data to the terminal device by using a second target SCG RLC bearer. The terminal device receives the fourth data by using the second target SCG RLC bearer.

With reference to the first aspect, in an embodiment, the target secondary node sends sixth data to the terminal device by using a third MCG RLC bearer. The sixth data is a part or all of the fifth data. The terminal device receives the sixth data by using the third MCG RLC bearer.

With reference to the first aspect, in an embodiment, the second handover information includes third bearer configuration information and/or fourth bearer configuration information. The terminal device establishes the third MCG RLC bearer based on the third bearer configuration information, and/or the terminal device establishes the second target SCG RLC bearer based on the fourth bearer configuration information.

With reference to the first aspect, in an embodiment, the second handover information includes second security information, and the second security information indicates the third key associated with the master node. The terminal device performs data decryption and/or integrity protection verification on the fourth data and/or the sixth data based on the third key.

With reference to the first aspect, in an embodiment, the second data, the fourth data, or the sixth data is associated with the first radio bearer, and the first radio bearer is a radio bearer between the source secondary node and the terminal device.

With reference to the first aspect, in an embodiment, the terminal device receives the handover complete indication information, where the handover complete indication information is from the master node or the target secondary node. The terminal device stops receiving data that is on the first radio bearer and that is sent by the source secondary node.

With reference to the first aspect, in an embodiment, the target secondary node performs data encryption and/or integrity protection on the third data based on the second key, to obtain the fourth data.

With reference to the first aspect, in an embodiment, the target secondary node determines that the terminal device successfully accesses the target secondary node, and sends the handover complete indication information to the master node and/or the terminal device.

With reference to the first aspect, in an embodiment, the target secondary node sends handover response information for the third handover information. The master node receives the handover response information sent by the target secondary node. The handover response information includes the first security information, the first security information indicates the second key, and the second key is used by the terminal device to perform data decryption and/or integrity protection verification on the fourth data.

With reference to the first aspect, in an embodiment, the master node establishes the second MCG RLC bearer.

With reference to the first aspect, in an embodiment, the master node performs data encryption and/or integrity protection on the third data based on the third key, to obtain the fifth data.

With reference to the first aspect, in an embodiment, the master node establishes the third MCG RLC bearer.

With reference to the first aspect, in an embodiment, the master node receives the handover complete indication information sent by the target secondary node, and sends the handover complete indication information to the source secondary node, where the handover complete indication information indicates that the terminal device successfully accesses the target secondary node.

According to a second aspect, an embodiment of this application provides a node handover method. The method is applicable to a scenario in which a secondary node is handed over and a master node is an anchor. The method includes: The master node determines to perform uninterrupted node handover on a terminal device. The master node sends first handover information to a source secondary node. The source secondary node receives the first handover information, and determines to perform uninterrupted node handover on the terminal device. The master node sends third handover information to a target secondary node. The target secondary node receives the third handover information, and determines to perform uninterrupted node handover on the terminal device. The master node sends second handover information to the terminal device. The terminal device receives the second handover information, and determines to perform uninterrupted node handover.

The master node receives first data sent from a core network via a first radio bearer. The master node continues, in a process of the node handover, to perform first processing on the first data to obtain second data, and sends the second data to the terminal device. The terminal device receives and processes the second data. The first processing includes sequence number assignment and performing data encryption and/or integrity protection based on a first key. The master node performs first processing or second processing on the first data to obtain third data in the process of the node handover, and sends the third data to the target secondary node. The target secondary node receives the third data, and sends the third data or fourth data to the terminal device. The second processing includes the sequence number assignment; and the fourth data is data obtained by performing third processing on the third data by the target secondary node, where the third processing includes performing data encryption and/or integrity protection based on a second key.

In an embodiment of this application, in the process of the node handover, the master node transmits, to the terminal device via both the source secondary node and the target secondary node, the first data that is to be sent to the terminal device by using the first radio bearer, and the first data is correctly received by the terminal device, so that interruption that is due to the node handover and that is of transmission of the first data between the core network and the terminal device does not occur, a problem such as a data transmission delay caused for the terminal device by data transmission interruption caused by the node handover is resolved, applicability and practicability of the node handover method are improved, and user experience of the terminal device is also improved.

With reference to the second aspect, in an embodiment, the source secondary node receives handover complete indication information, where the handover complete indication information indicates that the terminal device successfully accesses the target secondary node. The source secondary node stops data transmission that is between the source secondary node and the terminal device and that is based on an SCG RLC bearer associated with the first radio bearer.

With reference to the second aspect, in an embodiment, the master node sends the second data to the terminal device by using a source SCG RLC bearer and/or a first MCG RLC bearer. The terminal device receives the second data by using the source secondary cell group SCG RLC bearer and/or the first MCG RLC bearer.

With reference to the second aspect, in an embodiment, the terminal device performs data decryption and/or integrity protection verification on the second data based on the first key associated with the master node.

With reference to the second aspect, in an embodiment, the second handover information further indicates the terminal device to stop receiving the second data by using the source SCG RLC bearer and receive the second data by using the first MCG RLC bearer. In the process of the node handover, the second data may be sent to the terminal device by preferentially using the source secondary cell SCG group RLC bearer or the first MCG RLC bearer. In this way, the terminal device does not need to maintain both the source secondary cell SCG group RLC bearer and the first MCG RLC bearer, so that a device capability of the terminal device can be saved.

With reference to the second aspect, in an embodiment, the target secondary node sends the third data to the terminal device by using a first target SCG RLC bearer, and the terminal device receives the third data by using the first target SCG RLC bearer. The target secondary node sends the fourth data to the terminal device by using a second target SCG RLC bearer and/or a second MCG RLC bearer, and the terminal device receives the fourth data by using the second target SCG RLC bearer and/or the second MCG RLC bearer. Herein, in the process of the node handover, the first data received by the source secondary node from the core network is sent to the terminal device via both the source secondary node and the target secondary node. In this way, it can be ensured that the interruption that is due to the node handover and that is of the data transmission between the core network and the terminal device does not occur, so that a communication delay of the terminal device can be reduced.

With reference to the second aspect, in an embodiment, the second handover information includes first bearer configuration information. The terminal device establishes the first target SCG RLC bearer based on the first bearer configuration information.

With reference to the second aspect, in an embodiment, the second handover information includes second bearer configuration information and/or third bearer configuration information. The terminal device establishes the second target SCG RLC bearer based on the second bearer configuration information, and/or the terminal device establishes the second MCG RLC bearer based on the third bearer configuration information.

With reference to the second aspect, the second handover information further includes second security information, and the second security information indicates the second key associated with the target secondary node. The terminal device performs data decryption and/or integrity protection verification on the fourth data based on the second key.

With reference to the second aspect, in an embodiment, the master node sends the third data to the target secondary node. The target secondary node receives the third data, and performs third processing on the third data to obtain the fourth data. The target secondary node sends the fourth data to the terminal device. Herein, an example case in which an anchor location changes in the process of the node handover is considered. However, it is also ensured that the first data received by the source secondary node from the core network can be sent to the terminal device via both the source secondary node and the target secondary node. In this way, it can be ensured that the interruption that is due to the node handover and that is of the data transmission between the core network and the terminal device does not occur, so that the communication delay of the terminal device can be reduced.

With reference to the second aspect, in an embodiment, the second data or the fourth data is associated with the first radio bearer, and the first radio bearer is a radio bearer between the master node and the terminal device.

With reference to the second aspect, in an embodiment, the terminal device receives the handover complete indication information, where the handover complete indication information is from the master node or the target secondary node. The terminal device stops receiving data that is on the first radio bearer and that is sent by the master node.

With reference to the second aspect, in an embodiment, the target secondary node determines that the terminal device successfully accesses the target secondary node, and sends the handover complete indication information to the master node.

With reference to the second aspect, in an embodiment, the target secondary node sends handover response information for the third handover information. The master node receives the handover response information sent by the target secondary node. The handover response information includes the second security information, the second security information indicates the second key, and the second key is used by the terminal device to perform data decryption and/or integrity protection verification on the fourth data.

With reference to the second aspect, in an embodiment, the master node establishes the second MCG RLC bearer.

With reference to the second aspect, in an embodiment, the master node receives the handover complete indication information sent by the target secondary node, and sends the handover complete indication information to the source secondary node or the terminal device, where the handover complete indication information indicates that the terminal device successfully accesses the target secondary node.

According to a third aspect, an embodiment of this application provides a node handover method. The method is applicable to a scenario in which a master node is handed over and the master node is an anchor. The method includes: A source master node determines to perform uninterrupted node handover on a terminal device. The source master node sends first handover information to a secondary node. The secondary node receives the first handover information, and determines to perform uninterrupted node handover on the terminal device. The source master node sends third handover information to a target master node. The target master node receives the third handover information, and determines to perform uninterrupted node handover on the terminal device. The source master node sends second handover information to the terminal device. The terminal device receives the second handover information, and determines to perform uninterrupted node handover. The source master node receives first data sent from a core network via a first radio bearer. The source master node continues, in a process of the node handover, to perform first processing on the first data to obtain second data, and sends the second data to the terminal device. The terminal device receives and processes the second data. The first processing includes sequence number assignment and performing data encryption and/or integrity protection based on a first key. The source master node performs second processing on the first data to obtain third data in the process of the node handover, and sends the third data to the target master node. The target master node receives the third data, and sends fourth data to the terminal device. The second processing includes the sequence number assignment; and the fourth data is data obtained by performing third processing on the third data by the target master node, where the third processing includes performing data encryption and/or integrity protection based on a second key.

In an embodiment of this application, in the process of the node handover, the source master node transmits, to the terminal device via both the source master node and a target secondary node, the first data that is to be sent to the terminal device by using the first radio bearer, and the first data is correctly received by the terminal device, so that interruption that is due to the node handover and that is of transmission of the first data between the core network and the terminal device does not occur, a problem such as a data transmission delay caused for the terminal device by data transmission interruption caused by the node handover is resolved, applicability and practicability of the node handover method are improved, and user experience of the terminal device is also improved.

With reference to the third aspect, in an embodiment, the source master node receives handover complete indication information, where the handover complete indication information indicates that the terminal device successfully accesses the target secondary node. The source master node stops data transmission that is between the source master node and the terminal device and that is based on the first radio bearer.

With reference to the third aspect, in an embodiment, the secondary node receives the handover complete indication information, where the handover complete indication information indicates that the terminal device successfully accesses the target secondary node. The secondary node stops data transmission that is between the secondary node and the terminal device and that is based on an SCG RLC bearer associated with the first radio bearer.

With reference to the third aspect, in an embodiment, the source master node sends the second data to the terminal device by using a first SCG RLC bearer and/or a source MCG RLC bearer. The terminal device receives the second data by using the first SCG RLC bearer and/or the source MCG RLC bearer.

With reference to the third aspect, in an embodiment, the terminal device performs data decryption and/or integrity protection verification on the second data based on the first key associated with the source master node.

With reference to the third aspect, in an embodiment, the second handover information further indicates the terminal device to stop receiving the second data by using the source MCG RLC bearer and receive the second data by using the first SCG RLC bearer. In the process of the node handover, the second data may be sent to the terminal device by preferentially using the first SCG RLC bearer or the source MCG RLC bearer. In this way, the terminal device does not need to maintain both the first SCG RLC bearer and the source MCG RLC bearer, so that a device capability of the terminal device can be saved.

With reference to the third aspect, in an embodiment, the target master node sends the fourth data to the terminal device by using a target MCG RLC bearer and/or a second SCG RLC bearer. The terminal device receives the fourth data by using the target MCG RLC bearer and/or the second SCG RLC bearer. Herein, in the process of the node handover, the first data received by the source secondary node from the core network is sent to the terminal device via both the source secondary node and the target secondary node. In this way, it can be ensured that the interruption that is due to the node handover and that is of the data transmission between the core network and the terminal device does not occur, so that a communication delay of the terminal device can be reduced.

With reference to the third aspect, in an embodiment, the second handover information includes first bearer configuration information and/or second bearer configuration information. The terminal device establishes the target MCG RLC bearer based on the first bearer configuration information, and/or the terminal device establishes the second SCG RLC bearer based on the second bearer configuration information.

With reference to the third aspect, the second handover information further includes second security information, and the second security information indicates the second key associated with the target master node. The terminal device performs data decryption and/or integrity protection verification on the fourth data based on the second key.

With reference to the third aspect, in an embodiment, the second handover information includes first bearer configuration information and/or second bearer configuration information. The terminal device establishes the target MCG RLC bearer based on the first bearer configuration information, and/or the terminal device establishes the second SCG RLC bearer based on the second bearer configuration information.

With reference to the third aspect, in an embodiment, the second data or the fourth data is associated with the first radio bearer, and the first radio bearer is a radio bearer between the source master node and the terminal device.

With reference to the third aspect, in an embodiment, the terminal device receives the handover complete indication information, where the handover complete indication information is from the source master node or the target master node. The terminal device stops receiving data that is on the first radio bearer and that is sent by the source master node.

With reference to the third aspect, in an embodiment, the target master node performs data encryption and/or integrity protection on the third data based on the second key, to obtain the fourth data.

With reference to the third aspect, in an embodiment, the target master node determines that the terminal device successfully accesses the target master node, and sends the handover complete indication information to the source master node.

With reference to the third aspect, in an embodiment, the target master node sends handover response information for the third handover information. The source master node receives the handover response information sent by the target master node. The handover response information includes the second security information, the second security information indicates the second key, and the second key is used by the terminal device to perform data decryption and/or integrity protection verification on the fourth data.

With reference to the third aspect, in an embodiment, the secondary node establishes the second SCG RLC bearer.

According to a fourth aspect, an embodiment of this application provides a node handover method. The method is applicable to a scenario in which both a master node and a secondary node are handed over and a source master node is an anchor. The method includes: The source master node determines to perform uninterrupted node handover on a terminal device. The source master node sends first handover information to a source secondary node. The source secondary node receives the first handover information, and determines to perform uninterrupted node handover on the terminal device. The source master node sends third handover information to a target master node. The target master node receives the third handover information, and determines to perform uninterrupted node handover on the terminal device. The source master node sends second handover information to the terminal device. The terminal device receives the second handover information, and determines to perform uninterrupted node handover. The source master node receives first data sent from a core network via a first radio bearer. The source master node continues, in a process of the node handover, to perform first processing on the first data to obtain second data, and sends the second data to the terminal device. The terminal device receives and processes the second data. The first processing includes sequence number assignment and performing data encryption and/or integrity protection based on a first key. The source master node performs second processing on the first data to obtain third data in the process of the node handover, and sends the third data to the target master node. The target master node receives the third data, and sends fourth data to the terminal device. The second processing includes the sequence number assignment; and the fourth data is data obtained by performing third processing on the third data by the target master node, where the third processing includes performing data encryption and/or integrity protection based on a second key.

In an embodiment of this application, in the process of the node handover, the source master node transmits, to the terminal device via the source master node and the target master node and/or a target secondary node, the first data that is to be sent to the terminal device by using the first radio bearer, and the first data is correctly received by the terminal device, so that interruption that is due to the node handover and that is of transmission of the first data between the core network and the terminal device does not occur, a problem such as a data transmission delay caused for the terminal device by data transmission interruption caused by the node handover is resolved, applicability and practicability of the node handover method are improved, and user experience of the terminal device is also improved.

With reference to the fourth aspect, in an embodiment, the source master node receives handover complete indication information, where the handover complete indication information indicates that the terminal device successfully accesses the target secondary node. The source master node stops data transmission that is between the source master node and the terminal device and that is based on the first radio bearer.

With reference to the fourth aspect, in an embodiment, the source secondary node receives the handover complete indication information, where the handover complete indication information indicates that the terminal device successfully accesses the target secondary node. The source secondary node stops data transmission that is between the source secondary node and the terminal device and that is based on an SCG RLC bearer associated with the first radio bearer.

With reference to the fourth aspect, in an embodiment, the source master node sends the second data to the terminal device by using a source SCG RLC bearer and/or a source MCG RLC bearer. The terminal device receives the second data by using the source SCG RLC bearer and/or the source MCG RLC bearer.

With reference to the fourth aspect, in an embodiment, the terminal device performs data decryption and/or integrity protection verification on the second data based on the first key associated with the source master node.

With reference to the fourth aspect, in an embodiment, the second handover information further indicates the terminal device to stop receiving the second data by using the source MCG RLC bearer and receive the second data by using the source SCG RLC bearer. In the process of the node handover, the second data may be transmitted by preferentially using the source SCG RLC bearer or the source MCG RLC bearer. In this way, the terminal device does not need to maintain both the source SCG RLC bearer and the source MCG RLC bearer, so that a device capability of the terminal device can be saved.

With reference to the fourth aspect, in an embodiment, the target master node sends the fourth data to the terminal device by using a target MCG RLC bearer and/or a target SCG RLC bearer. The terminal device receives the fourth data by using the target MCG RLC bearer and/or the target SCG RLC bearer. Herein, in the process of the node handover, the first data received by the source master node from the core network is sent to the terminal device via the source secondary node and the target master node and/or the target secondary node. In this way, it can be ensured that the interruption that is due to the node handover and that is of the data transmission between the core network and the terminal device does not occur, so that a communication delay of the terminal device can be reduced.

With reference to the fourth aspect, in an embodiment, the second handover information includes first bearer configuration information and/or fourth bearer configuration information. The terminal device establishes the target MCG RLC bearer based on the first bearer configuration information, and/or the terminal device establishes the target SCG RLC bearer based on the fourth bearer configuration information.

With reference to the fourth aspect, the second handover information further includes second security information, and the second security information indicates the second key associated with the target master node. The terminal device performs data decryption and/or integrity protection verification on the fourth data based on the second key.

With reference to the fourth aspect, in an embodiment, the second data or the fourth data is associated with the first radio bearer, and the first radio bearer is a radio bearer between the source master node and the terminal device.

With reference to the fourth aspect, in an embodiment, the terminal device receives the handover complete indication information, where the handover complete indication information is from the source master node or the target master node. The terminal device stops receiving data that is sent by the source master node based on the first radio bearer.

With reference to the fourth aspect, in an embodiment, the target master node performs data encryption and/or integrity protection on the third data based on the second key, to obtain the fourth data.

With reference to the fourth aspect, in an embodiment, the target master node determines that the terminal device successfully accesses the target master node, and sends the handover complete indication information to the source master node.

With reference to the fourth aspect, in an embodiment, the target master node sends handover response information for the third handover information. The source master node receives the handover response information sent by the target master node. The handover response information includes the second security information.

With reference to the fourth aspect, in an embodiment, the source master node receives the handover complete indication information sent by the target master node, and sends the handover complete indication information to the source secondary node or the terminal device, where the handover complete indication information indicates that the terminal device successfully accesses the target secondary node.

According to a fifth aspect, an embodiment of this application provides a communication apparatus. The communication apparatus may be the terminal device in the first aspect, the second aspect, the third aspect, or the fourth aspect, or may be an element, for example, a chip, or a module inside the terminal device. The communication apparatus includes a unit configured to perform a part or all of the node handover method corresponding to the terminal device in the first aspect, the second aspect, the third aspect, or the fourth aspect, and therefore can also implement the beneficial effects (or the advantages) of the node handover method provided in the first aspect, the second aspect, or the fourth aspect.

According to a sixth aspect, an embodiment of this application provides a communication apparatus. The communication apparatus may be the source secondary node in the first aspect, the second aspect, or the fourth aspect, or may be an element, for example, a chip, or a module inside the source secondary node. The communication apparatus includes a unit configured to perform a part or all of the node handover method corresponding to the source secondary node in the first aspect, the second aspect, or the fourth aspect, and therefore can also implement the beneficial effects (or the advantages) of the node handover method provided in the first aspect, the second aspect, or the fourth aspect.

According to a seventh aspect, an embodiment of this application provides a communication apparatus. The communication apparatus may be the target secondary node in the first aspect, the second aspect, or the fourth aspect, or may be an element, for example, a chip, or a module inside the target secondary node. The communication apparatus includes a unit configured to perform a part or all of the node handover method corresponding to the target secondary node in the first aspect, the second aspect, or the fourth aspect, and therefore can also implement the beneficial effects (or the advantages) of the node handover method provided in the first aspect, the second aspect, or the fourth aspect.

According to an eighth aspect, an embodiment of this application provides a communication apparatus. The communication apparatus may be the source master node in the third aspect or the fourth aspect, or may be an element, for example, a chip, or a module inside the source master node. The communication apparatus includes a unit configured to perform a part or all of the node handover method corresponding to the source master node in the third aspect or the fourth aspect, and therefore can also implement the beneficial effects (or the advantages) of the node handover method provided in the third aspect or the fourth aspect.

According to a ninth aspect, an embodiment of this application provides a communication apparatus. The communication apparatus may be the target master node in the third aspect or the fourth aspect, or may be an element, for example, a chip, or a module inside the target master node. The communication apparatus includes a unit configured to perform a part or all of the node handover method corresponding to the target master node in the third aspect or the fourth aspect, and therefore can also implement the beneficial effects (or the advantages) of the node handover method provided in the third aspect or the fourth aspect.

According to a tenth aspect, an embodiment of this application provides a communication apparatus. The communication apparatus may be the master node in the first aspect, the second aspect, or the fourth aspect, or may be an element, for example, a chip, or a module inside the master node. The communication apparatus includes a unit configured to perform a part or all of the node handover method corresponding to the master node in the first aspect, the second aspect, or the fourth aspect, and therefore can also implement the beneficial effects (or the advantages) of the node handover method provided in the first aspect or the second aspect.

According to an eleventh aspect, an embodiment of this application provides a communication apparatus. The communication apparatus may be the secondary node in the third aspect, or may be an element, for example, a chip, or a module inside the secondary node. The communication apparatus includes a unit configured to perform a part or all of the node handover method corresponding to the secondary node in the third aspect, and therefore can also implement the beneficial effects (or the advantages) of the node handover method provided in the third aspect.

According to a twelfth aspect, an embodiment of this application provides a communication apparatus. The communication apparatus may be a terminal device. The communication apparatus includes at least one memory and a processor. The processor is configured to invoke code stored in the memory, to perform a part or all of the node handover method corresponding to the terminal device in the first aspect, the second aspect, the third aspect, or the fourth aspect.

According to a thirteenth aspect, an embodiment of this application provides a communication apparatus. The communication apparatus may be a source secondary node. The communication apparatus includes at least one memory and a processor. The processor is configured to invoke code stored in the memory, to perform a part or all of the node handover method corresponding to the source secondary node in the first aspect, the second aspect, or the fourth aspect.

According to a fourteenth aspect, an embodiment of this application provides a communication apparatus. The communication apparatus may be a target secondary node. The communication apparatus includes at least one memory and a processor. The processor is configured to invoke code stored in the memory, to perform a part or all of the node handover method corresponding to the target secondary node in the first aspect, the second aspect, or the fourth aspect.

According to a fifteenth aspect, an embodiment of this application provides a communication apparatus. The communication apparatus may be a source master node. The communication apparatus includes at least one memory and a processor. The processor is configured to invoke code stored in the memory, to perform a part or all of the node handover method corresponding to the source master node in the third aspect or the fourth aspect.

According to a sixteenth aspect, an embodiment of this application provides a communication apparatus. The communication apparatus may be a target master node. The communication apparatus includes at least one memory and a processor. The processor is configured to invoke code stored in the memory, to perform a part or all of the node handover method corresponding to the target master node in the third aspect or the fourth aspect.

According to a seventeenth aspect, an embodiment of this application provides a communication apparatus. The communication apparatus may be a master node. The communication apparatus includes at least one memory and a processor. The processor is configured to invoke code stored in the memory, to perform a part or all of the node handover method corresponding to the master node in the first aspect or the second aspect.

According to an eighteenth aspect, an embodiment of this application provides a communication apparatus. The communication apparatus may be a secondary node. The communication apparatus includes at least one memory and a processor. The processor is configured to invoke code stored in the memory, to perform a part or all of the node handover method corresponding to the secondary node in the third aspect.

According to a nineteenth aspect, an embodiment of this application provides a communication apparatus. The communication apparatus may be a terminal device. The communication apparatus includes at least one processor and an interface circuit. The interface circuit is configured to receive code instructions, and transmit the code instructions to the processor. The processor is configured to run the code instructions to implement a part or all of the node handover method corresponding to the terminal device in the first aspect, the second aspect, the third aspect, or the fourth aspect.

According to a twentieth aspect, an embodiment of this application provides a communication apparatus. The communication apparatus may be a source secondary node. The communication apparatus includes at least one processor and an interface circuit. The interface circuit is configured to receive code instructions, and transmit the code instructions to the processor. The processor is configured to run a part or all of the node handover method corresponding to the source secondary node in the first aspect, the second aspect, or the fourth aspect.

According to a twenty-first aspect, an embodiment of this application provides a communication apparatus. The communication apparatus may be a target secondary node. The communication apparatus includes at least one processor and an interface circuit. The interface circuit is configured to receive code instructions, and transmit the code instructions to the processor. The processor is configured to run a part or all of the node handover method corresponding to the target secondary node in the first aspect, the second aspect, or the fourth aspect.

According to a twenty-second aspect, an embodiment of this application provides a communication apparatus. The communication apparatus may be a source master node. The communication apparatus includes at least one processor and an interface circuit. The interface circuit is configured to receive code instructions, and transmit the code instructions to the processor. The processor is configured to run a part or all of the node handover method corresponding to the source master node in the third aspect or the fourth aspect.

According to a twenty-third aspect, an embodiment of this application provides a communication apparatus. The communication apparatus may be a target master node. The communication apparatus includes at least one processor and an interface circuit. The interface circuit is configured to receive code instructions, and transmit the code instructions to the processor. The processor is configured to run a part or all of the node handover method corresponding to the target master node in the third aspect or the fourth aspect.

According to a twenty-fourth aspect, an embodiment of this application provides a communication apparatus. The communication apparatus may be a master node. The communication apparatus includes at least one processor and an interface circuit. The interface circuit is configured to receive code instructions, and transmit the code instructions to the processor. The processor is configured to run a part or all of the node handover method corresponding to the master node in the first aspect or the second aspect.

According to a twenty-fifth aspect, an embodiment of this application provides a communication apparatus. The communication apparatus may be a secondary node. The communication apparatus includes at least one processor and an interface circuit. The interface circuit is configured to receive code instructions, and transmit the code instructions to the processor. The processor is configured to run a part or all of the node handover method corresponding to the secondary node in the third aspect.

According to a twenty-sixth aspect, an embodiment of this application provides a computer-readable storage medium. The computer-readable storage medium stores instructions. When the instructions are run on a computer, a part or all of the node handover method corresponding to the terminal device in the first aspect, the second aspect, the third aspect, or the fourth aspect is implemented.

According to a twenty-seventh aspect, an embodiment of this application provides a computer-readable storage medium. The computer-readable storage medium stores instructions. When the instructions are run on a computer, a part or all of the node handover method corresponding to the source secondary node in the first aspect, the second aspect, or the fourth aspect is implemented.

According to a twenty-eighth aspect, an embodiment of this application provides a computer-readable storage medium. The computer-readable storage medium stores instructions. When the instructions are run on a computer, a part or all of the node handover method corresponding to the target secondary node in the first aspect, the second aspect, or the fourth aspect is implemented.

According to a twenty-ninth aspect, an embodiment of this application provides a computer-readable storage medium. The computer-readable storage medium stores instructions. When the instructions are run on a computer, a part or all of the node handover method corresponding to the source master node in the third aspect or the fourth aspect is implemented.

According to a thirtieth aspect, an embodiment of this application provides a computer-readable storage medium. The computer-readable storage medium stores instructions. When the instructions are run on a computer, a part or all of the node handover method corresponding to the target master node in the third aspect or the fourth aspect is implemented.

According to a thirty-first aspect, an embodiment of this application provides a computer-readable storage medium. The computer-readable storage medium stores instructions. When the instructions are run on a computer, running of a part or all of the node handover method corresponding to the master node in the first aspect or the second aspect is implemented.

According to a thirty-second aspect, an embodiment of this application provides a computer-readable storage medium. The computer-readable storage medium stores instructions. When the instructions are run on a computer, a part or all of the node handover method corresponding to the secondary node in the third aspect is implemented.

According to a thirty-third aspect, an embodiment of this application provides a computer program product including instructions. When the computer program product runs on a computer, the computer is enabled to perform the node handover method provided in the first aspect, and can also implement the beneficial effects of the node handover method provided in the first aspect.

According to a thirty-fourth aspect, an embodiment of this application provides a computer program product including instructions. When the computer program product runs on a computer, the computer is enabled to perform the node handover method provided in the second aspect, and can also implement the beneficial effects of the node handover method provided in the second aspect.

According to a thirty-fifth aspect, an embodiment of this application provides a computer program product including instructions. When the computer program product runs on a computer, the computer is enabled to perform the node handover method provided in the second aspect, and can also implement the beneficial effects of the node handover method provided in the second aspect.

According to a thirty-sixth aspect, an embodiment of this application provides a computer program product including instructions. When the computer program product runs on a computer, the computer is enabled to perform the node handover method provided in the second aspect, and can also implement the beneficial effects of the node handover method provided in the second aspect.

According to a thirty-seventh aspect, an embodiment of this application provides a communication system. The communication system includes at least one terminal device, at least one source secondary node, at least one target secondary node, and at least one master node in the first aspect or the second aspect, at least one terminal device, at least one source master node, at least one target master node, and at least one secondary node in the third aspect, or at least one terminal device, at least one source master node, at least one source secondary node, at least one target master node, and at least one target secondary node in the fourth aspect.

According to the method provided in embodiments of this application, in the process of the node handover, the source secondary node transmits, to the terminal device via both the source secondary node and the target secondary node, the first data that is to be sent to the terminal device by using the first radio bearer, and the first data is correctly received by the terminal device, so that the interruption that is due to the node handover and that is of the transmission of the first data between the core network and the terminal device does not occur, the problem such as the data transmission delay caused for the terminal device by the data transmission interruption caused by the node handover is resolved, applicability and practicability of the node handover method are improved, and user experience of the terminal device is also improved.

BRIEF DESCRIPTION OF DRAWINGS

FIG. 6(b) is a schematic diagram of another protocol stack architecture according to an embodiment of this application;

FIG. 8(d) is a schematic diagram of another protocol stack architecture according to an embodiment of this application;

DESCRIPTION OF EMBODIMENTS

Figure 1:
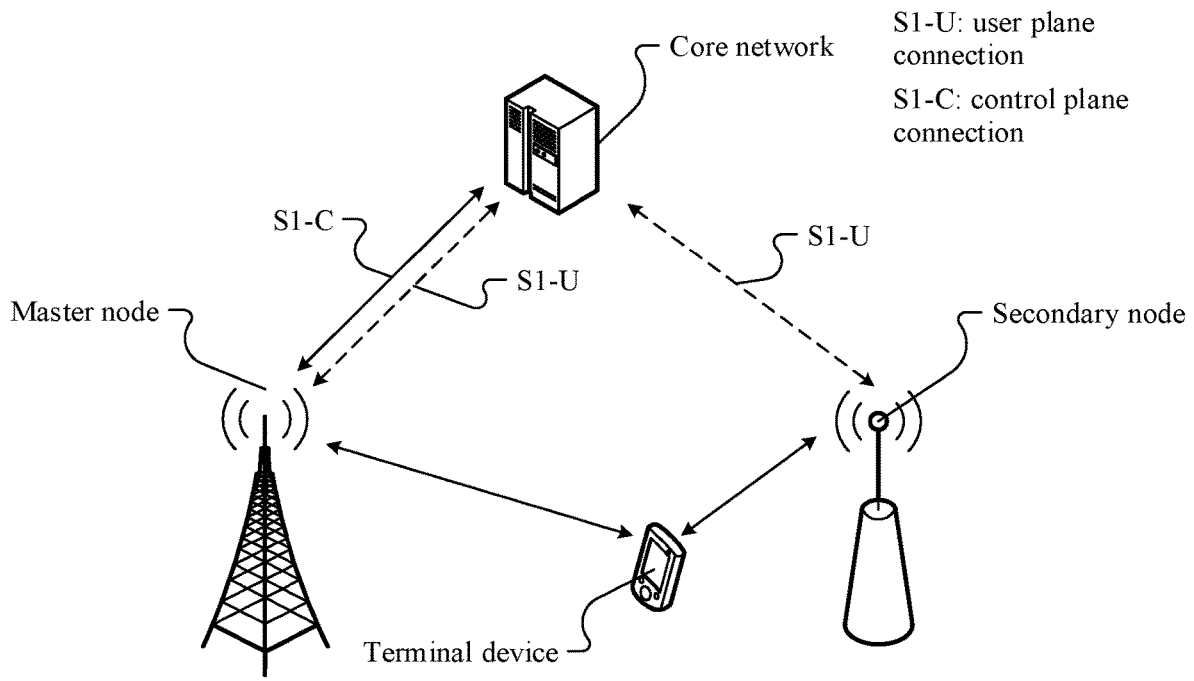
FIG. 1 is a schematic diagram of a dual connectivity scenario according to an embodiment of this application.

The following describes technical solutions in this application with reference to accompanying drawings.

The technical solutions in embodiments of this application are applicable to a 5G system (also referred to as a new radio or NR system) or a long term evolution (LTE) system that supports establishment of dual connectivity with the 5G system, and is further applicable to another wireless communication system for which various radio access technologies are used and that can establish dual connectivity with the 5G system, for example, a system for which an access technology such as code division multiple access (CDMA), frequency division multiple access (FDMA), time division multiple access (TDMA), orthogonal frequency division multiple access (OFDMA), single-carrier frequency division multiple access (SC-FDMA), or multiple input multiple output (MIMO) is used, and a future communication system. This is not limited herein.

A terminal device in embodiments of this application may be various types of devices that provide a user with voice and/or data connectivity, for example, may be a handheld device having a wireless connection function or a processing device connected to a wireless modem. The terminal device may communicate with a core network through an access network (for example, a radio access network (RAN)), and exchange a voice and/or data with the RAN. The terminal device may be a user equipment (UE), a wireless terminal, a mobile terminal, a subscriber unit, a subscriber station, a mobile station, a mobile, a remote station, an access point (AP), a remote terminal, an access terminal, a user terminal, a user agent, a user device, or the like. For example, the terminal device may include a mobile phone (or referred to as a "cellular" phone), a computer having a mobile terminal, a portable, pocket-sized, handheld, computer built-in, or in-vehicle mobile apparatus, or a wearable intelligent device, for example, a device such as a personal communications service (PCS) phone, a cordless telephone set, a session initiation protocol (SIP) phone, a wireless local loop (WLL) station, a personal digital assistant (PDA), a smart band, or a smart watch. The terminal device further includes a limited device, for example, a device having low power consumption, a device having a limited storage capability, or a device having a limited computing capability. For example, the terminal device includes an information sensing device such as a barcode, radio frequency identification (RFID), a sensor, a global positioning system (GPS), or a laser scanner.

An access network device in embodiments of this application may be a base station defined in the 3rd generation partnership project (3GPP), for example, may be a base station device, namely, an evolved NodeB (eNB/eNodeB), in an LTE system, or may be an access network side device, including a gNB, a transmission/reception point (TRP), and the like, in an NR system. The access network device may include a central unit (CU) and a distributed unit (DU). The CU may also be referred to as a control unit. A protocol layer of the base station may be split by using a CU-DU structure. Functions of some protocol layers are centrally controlled by the CU, and functions of some or all of remaining protocol layers are distributed in the DU, and the CU centrally controls the DU. For example, a radio resource control (radio resource control, RRC) layer, a service data adaptation protocol (SDAP) layer, and a packet data convergence protocol (PDCP) layer may be deployed in the CU, remaining protocol layers, namely, a remaining radio link control (RLC) layer, a media access control (MAC) layer, and a physical layer, are deployed in the DU. The CU and the DU are connected to each other through an F1 interface. The CU indicates that the gNB is connected to the core network through an NG interface. In some embodiments, the CU may alternatively use a structure in which a control plane entity is separated from a user plane (UP) entity, and one control plane entity manages a plurality of user plane entities. In an example, one gNB may have one gNB-CU-CP, a plurality of gNB-CU-UPs, and a plurality of gNB-DUs. The gNB-CU-CP is connected to the plurality of gNB-CU-UPs through an E1 interface, the gNB-CU-CP may be connected to the plurality of gNB-DUs through an F1-C interface, and one gNB-DU may be connected to the plurality of gNB-CU-UPs through an F1-U interface.

In addition, when the eNB accesses an NR core network which is also referred to as a next generation core (NGC) or a 5G core network (5GC), the LTE eNB may also be referred to as an eLTE eNB. Specifically, the eLTE eNB is an LTE base station device evolved based on the LTE eNB, and may be directly connected to the 5G CN. The eLTE eNB also belongs to a base station device in NR. An access network device 101 or an access network device 102 may alternatively be a wireless terminal (WT), for example, an access point (AP) or an access controller (AC), or another network device that has a capability of communicating with the terminal and the core network, for example, a relay device, a vehicle-mounted device, or an intelligent wearable device. A type of the network device is not limited in embodiments of this application.

To facilitate understanding of embodiments of this application, the following briefly describes a plurality of concepts in embodiments of this application.

1. Dual Connectivity (DC) Technology and DC Architecture

In an existing wireless communication system, a dual connectivity technology is newly proposed to provide a higher data transmission rate for a terminal device and improve spectral efficiency and load balancing by using macro-micro networking. A terminal device supporting dual connectivity may simultaneously establish communication connections to two network devices (which may also be referred to as nodes, and descriptions are uniformly provided by using the nodes hereinafter), so that the two nodes provide a data transmission service. FIG. 1 is a schematic diagram of a dual connectivity scenario according to an embodiment of this application. As shown in FIG. 1, a terminal device simultaneously establishes communication connections to two nodes. One of the two nodes is referred to as a master node (MN), and the other one of the two nodes is referred to as a secondary node (SN). There is a control plane connection between the master node and a core network (CN), and there may further be a user plane connection between the master node and the core network. There may be a user plane connection between the SN and the core network, or there may be no user plane connection between the SN and the core network. Herein, S1-U refers to a user plane connection, and S1-C refers to a control plane connection. During actual application, the user plane connection between the master node and the core network and the user plane connection between the secondary node and the core network may coexist, or only either of them may exist. When there is no user plane connection between the secondary node and the core network, data of the terminal device may be offloaded by the master node to the secondary node at a packet data convergence protocol (PDCP) layer. When there is no user plane connection between the master node and the core network, the data of the terminal device may be offloaded by the secondary node to the master node at a PDCP layer.

During actual application, the following several typical architectures may be used for the dual connectivity technology.

Figure 2A:
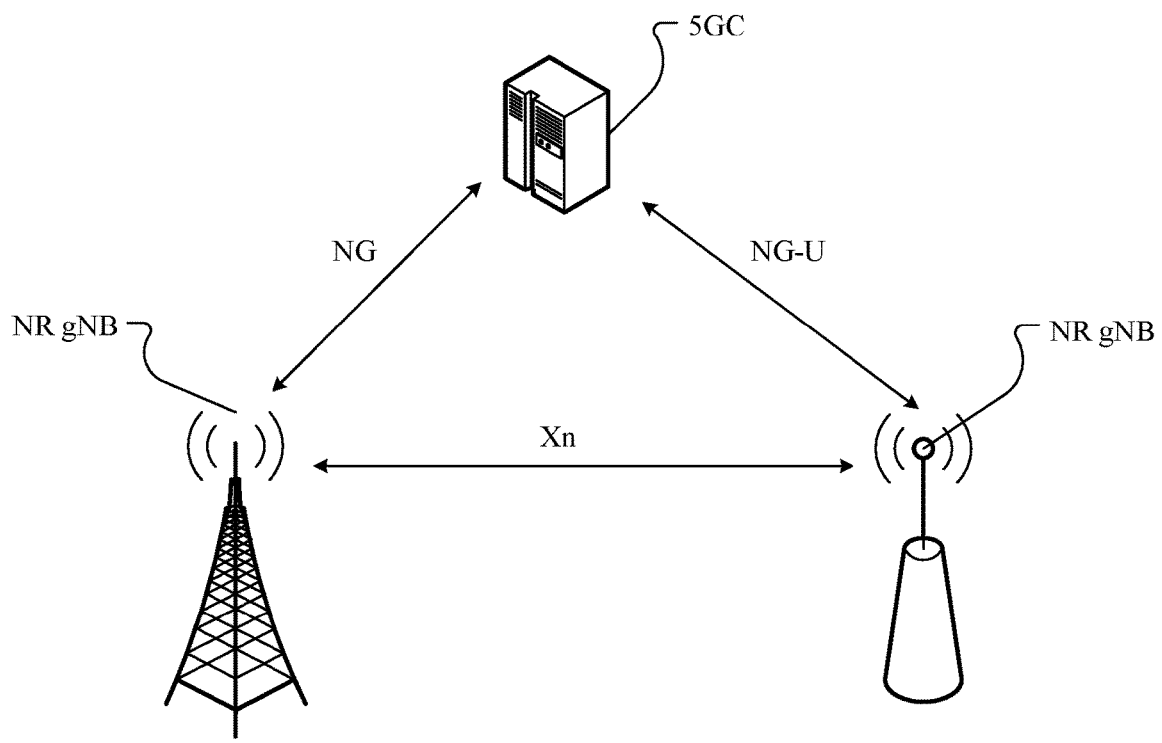
FIG. 2(a) is a schematic diagram of an architecture for implementing dual connectivity according to an embodiment of this application.

(1) The dual connectivity may be implemented between intra-RAT access network devices. FIG. 2(a) is a schematic diagram of an architecture for implementing dual connectivity according to an embodiment of this application. As shown in FIG. 2(a), the architecture further carries an NR-NR DC architecture. In an NR standalone scenario, both a master node and a secondary node are NR gNBs, and there is an Xn interface between the master node and the secondary node. There is an NG interface and at least a control plane connection between the master node and an NGC, and there may further be a user plane connection between the master node and the NGC. There is an NG-U interface between the secondary node and a 5GC. That is, there may be only a user plane connection between the secondary node and the 5GC. Herein, the NGC may include function entities such as an access and mobility management function (core AMF) network element and a user plane function (UPF) network element.

(2) The dual connectivity may alternatively be implemented between inter-RAT access network devices, and may be referred to as multi-RAT DC (MR-DC). Herein, different radio access technologies (RAT) are used for a master node and a secondary node. For example, the dual connectivity may be implemented in an LTE-NR joint networking scenario, and is referred to as LTE-NR dual connectivity, so that the terminal device can simultaneously obtain radio resources from LTE and NR air interfaces for data transmission, thereby obtaining a gain in a transmission rate.

Figure 2B:
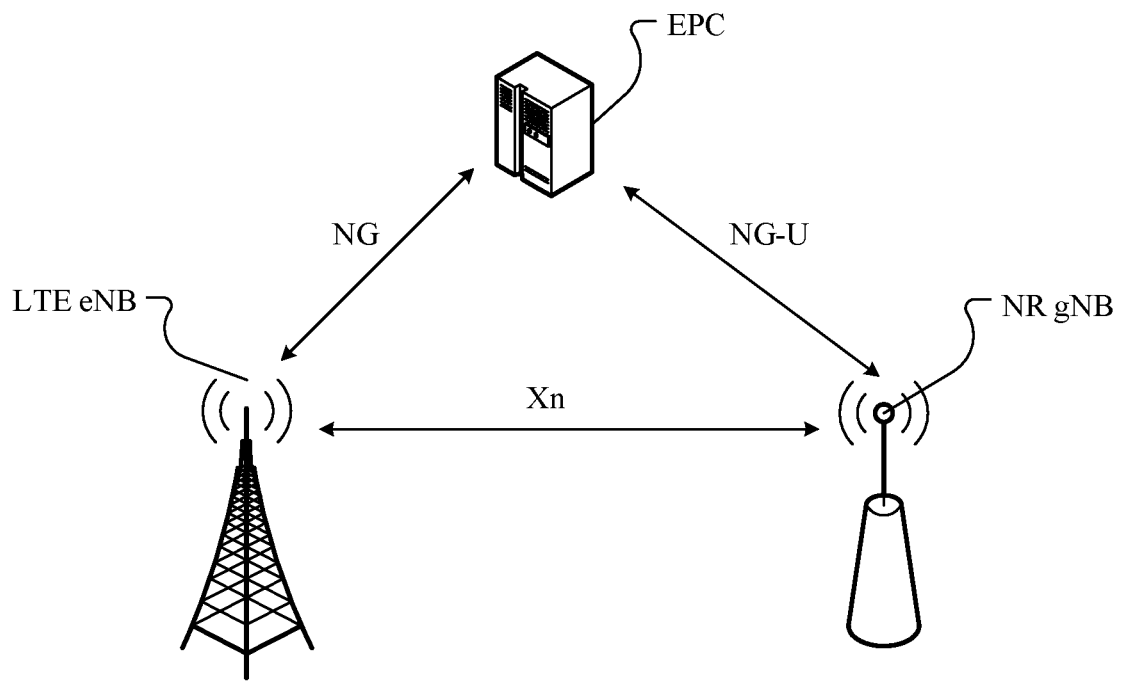
FIG. 2(b) is a schematic diagram of another architecture for implementing dual connectivity according to an embodiment of this application.

In some embodiments, the MR-DC may include the following three architectures. FIG. 2(b) is a schematic diagram of another architecture for implementing dual connectivity according to an embodiment of this application. This architecture is also referred to as an EN-DC architecture. As shown in FIG. 2(b), an LTE eNB is used as a master node, and an NR gNB is used as a secondary node. There is an X2 interface between the LTE eNB and the NR gNB. There is an S1 interface (including an S1-U interface and/or an S1-C interface) and at least a control plane connection between the LTE eNB and an evolved packet core (EPC) of an LTE system, and there may further be a user plane connection between the LTE eNB and the evolved packet core of the LTE system. There is an S1-U interface between the NR gNB and the EPC. That is, there may be only a user plane connection between the NR gNB and the EPC. In the scenario shown in FIG. 2(b), the LTE eNB is used as an anchor in the dual connectivity, and the LTE eNB accesses an LTE core network.

Figure 2C:
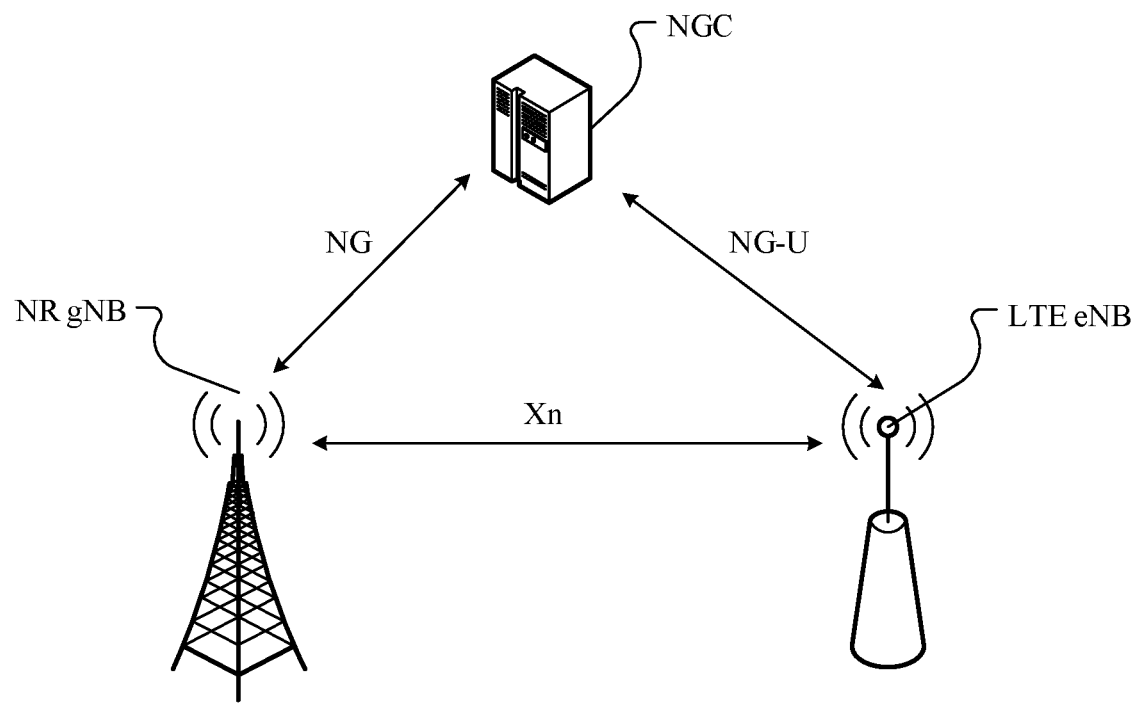
FIG. 2(c) is a schematic diagram of another architecture for implementing dual connectivity according to an embodiment of this application.

FIG. 2(c) is a schematic diagram of another architecture for implementing dual connectivity according to an embodiment of this application. The architecture is also referred to as an NE-DC architecture. A difference between FIG. 2(c) and FIG. 2(b) lies in that an NR gNB is used as an anchor, the NR gNB accesses an NGC, the NR gNB is used as a master node, there is an NG interface between the NR gNB and the NGC, and the NR gNB may establish a control plane connection and a user plane connection for a terminal device. An LTE eNB is used as a secondary node, there is an NG-U interface between the LTE eNB and the NGC, and the LTE eNB establishes only a user plane connection for the terminal device.

Figure 2D:
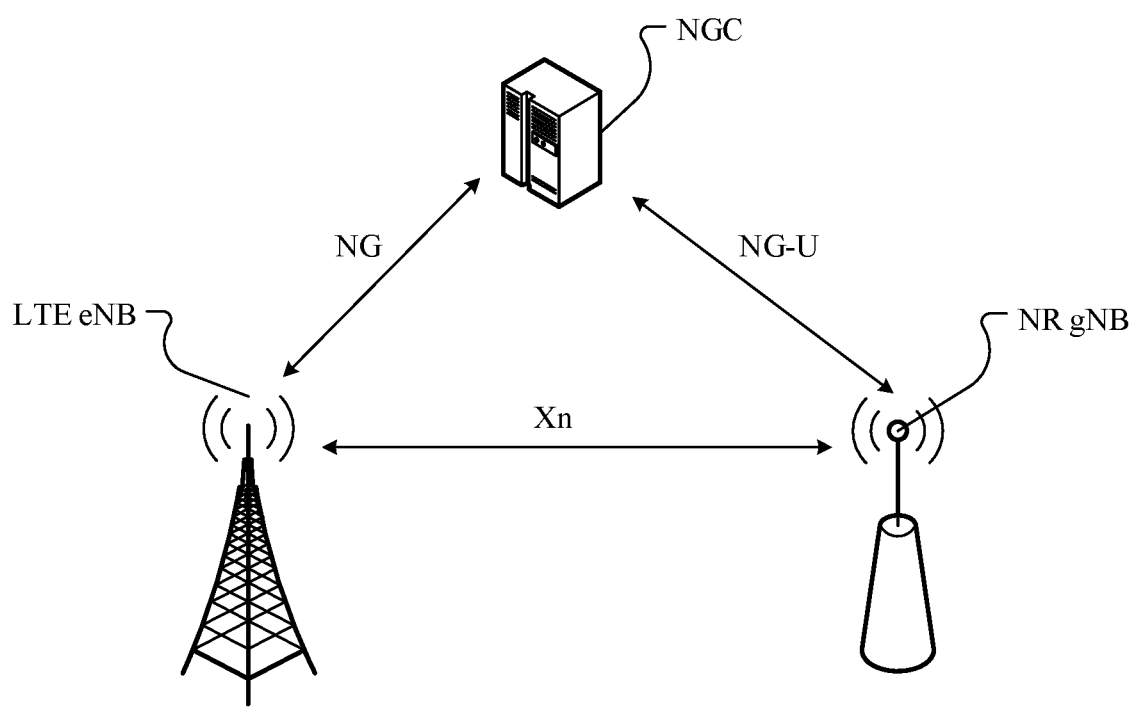
FIG. 2(d) is a schematic diagram of another architecture for implementing dual connectivity according to an embodiment of this application.

FIG. 2(d) is a schematic diagram of another architecture for implementing dual connectivity according to an embodiment of this application. The architecture may also be referred to as an NGEN-DC architecture. In FIG. 2(b), an LTE eNB is also used as an anchor, and a difference lies in that the LTE eNB accesses an NGC. To be specific, the LTE eNB is used as a master node, there is an NG interface between the LTE eNB and the NGC, and the LTE eNB may establish a control plane connection and a user plane connection for a terminal device. An NR gNB is used as a secondary node, there is an NG-U interface between the NR gNB and the NGC, and the NR gNB establishes only a user plane connection for the terminal device.

In addition to the DC architectures shown in FIG. 2(a) to FIG. 2(d), the dual connectivity technology may alternatively be implemented by using another DC architecture such as an LTE DC architecture (where both a master node and a secondary node are LTE base stations, and a core network is an EPC/5GC).

In the four scenarios shown in FIG. 2(a) to FIG. 2(d), no user plane connection may alternatively be established between the secondary node and the core network, but data is transmitted via the master node. For example, in a downlink direction, data of the terminal device first arrives at the master node from the core network, and the master node offloads the data of the terminal device to the secondary node at a PDCP layer. Herein, a form of the offloaded data may be, for example, a PDCP protocol data unit (PDU). When there is no user plane connection between the master node and the core network but there is a user plane connection between the secondary node and the core network, data of the terminal device may alternatively be first transmitted by the core network to the secondary node, and then be offloaded by the secondary node to the master node.

2. Radio Bearers and Classification Thereof

Simply speaking, a radio bearer is aggregate of radio logical resources in a wireless communication system, and may provide a user with a data connection capability from a terminal device to a terrestrial radio access network (or a core network). Based on types of carried information, radio bearers may be classified into two types: a signaling radio bearer (SRB) and a data radio bearer (DRB). The radio bearer in embodiments of this application is mainly the data radio bearer. The following briefly describes various types of the data radio bearer.

In dual connectivity, a data radio bearer established between a terminal device and an access network side may be independently provided by a master node or a secondary node, or may be provided by both the master node and the secondary node. A bearer provided by the master node is referred to as a master cell group bearer (MCG bearer). Herein, an MCG includes a cell managed by at least one master node and configured to provide an air interface transmission resource for the terminal device. A bearer provided by the secondary node is referred to as a secondary cell group bearer (SCG bearer). Herein, an SCG includes a cell managed by at least one secondary node and configured to provide an air interface transmission resource for the terminal device. In addition, a bearer provided by both the master node and the secondary node is referred to as a split bearer.

Figure 3:
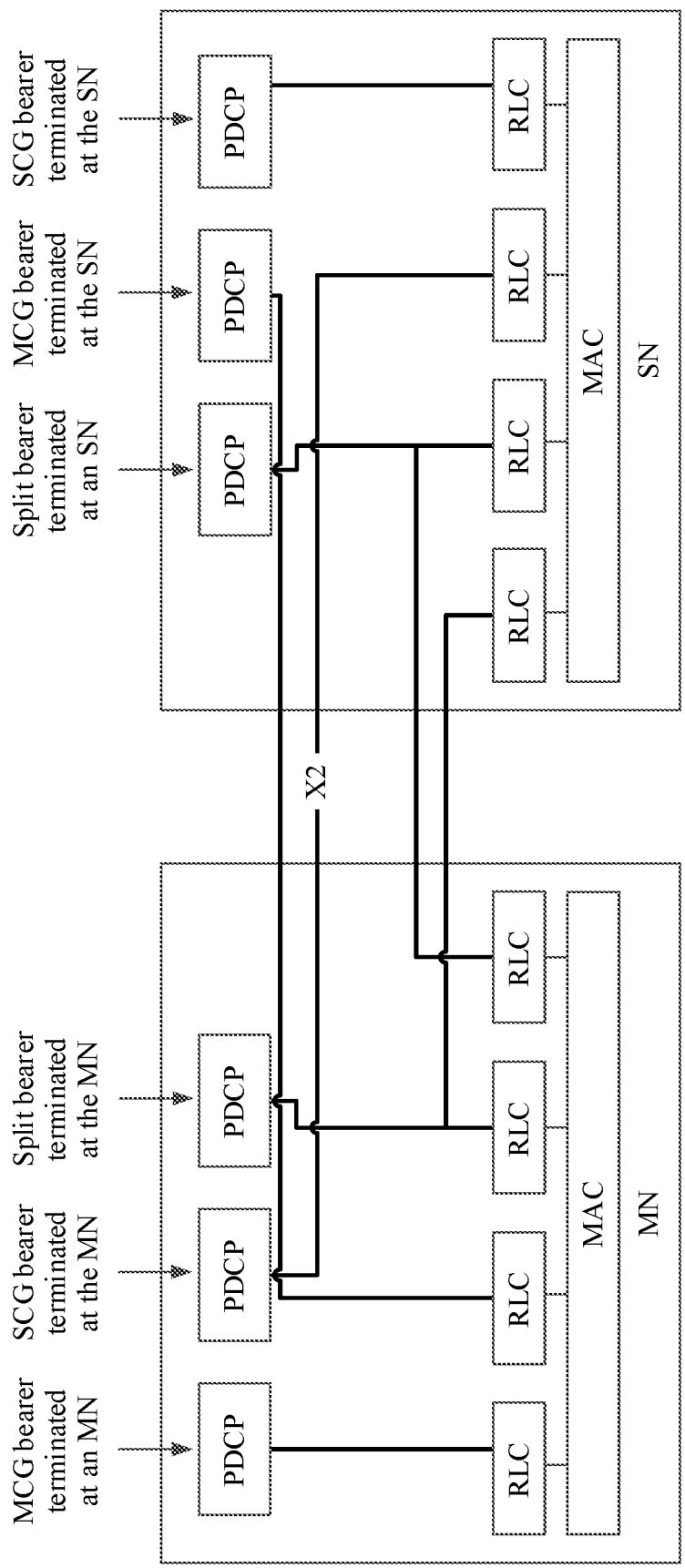
FIG. 3 is a schematic diagram of a plurality of bearer types in a DC architecture according to an embodiment of this application.

The following provides descriptions with reference to FIG. 3. FIG. 3 is a schematic diagram of a plurality of bearer types in a DC architecture according to an embodiment of this application. As shown in FIG. 3, when a bearer is provided only by a master node, that is, when a data flow flows only from a core network to the MN, the bearer is an MCG bearer. When a bearer is provided only by an SN, that is, when a data flow flows only from the core network to the SN, the bearer is an SCG bearer. When a bearer is provided by both the MN and the SN, that is, when a data flow is split at the MN or the SN, the bearer is a split bearer. For differentiation, the bearer split may be referred to as an MCG split bearer when the data flow is split at the MN, and the bearer split may be referred to as an SCG split bearer when the data flow is split at the SN. It can be learned from FIG. 3 that each bearer type has corresponding PDCP layer processing and RLC layer processing. For example, the SCG bearer/SCG split bearer corresponds to an SCG RLC bearer and an SN terminated PDCP bearer. Depending on whether a PDCP entity is established on the MN or the SN, bearers in DC may be further classified into the following several types: an MN terminated MCG bearer, an MN terminated SCG bearer, an MN terminated split bearer, an SN terminated MCG bearer, an SN terminated SCG bearer, and an SN terminated split bearer. An MN terminated bearer means that the PDCP entity is established on the MN, and a user plane connection to the core network is terminated at the MN. That is, the MN is used as an anchor. An SN terminated bearer means that the PDCP entity is established on the SN, and a user plane connection to the core network is terminated at the SN. That is, the SN is used as an anchor. It may be understood that whether a bearer is terminated at the MN or the SN indicates whether data transmission with the core network is performed by using the MN or the SN, and an air interface transmission resource is provided by an MCG or an SCG. For example, if the MN terminated SCG bearer is used, after being processed by a PDCP layer of the MN, all downlink data delivered by the core network is forwarded to an RLC layer and a MAC layer of the SN for further processing, and is sent to a terminal by using the SCG. Correspondingly, after being processed by the MAC layer and the RLC layer of the SN, all uplink data sent by the terminal device is forwarded to the PDCP layer of the MN for processing, and is sent to a core network device through an interface between the MN and the core network. If the MN terminated split bearer is used, after downlink data delivered by the core network is processed by using a PDCP layer of the MN, a part of the data is forwarded to the SN, and is sent to a terminal by using the SCG, and a remaining part is still sent by the MN to the terminal by using the MCG. Correspondingly, a part of uplink data sent by the terminal device is sent to the MN by using the MCG, and the other part of the uplink data is sent to the SN by using the SCG. The two parts of data are aggregated at a PDCP layer of the MN for processing, and are sent to a core network device through an interface between the MN and the core network.

Figure 4A:
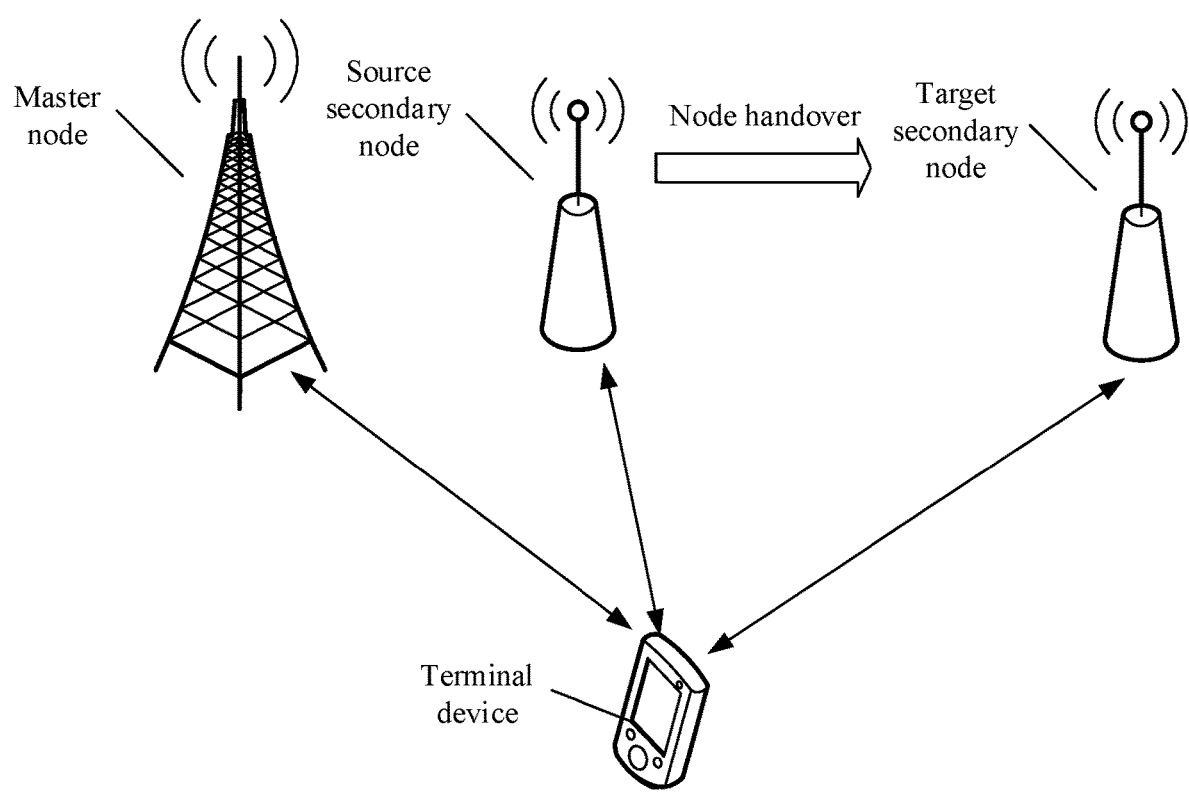
FIG. 4(a) is a schematic diagram of an architecture of a communication system according to an embodiment of this application.

FIG. 4(a) is a schematic diagram of an architecture of a communication system according to an embodiment of this application. It can be learned from FIG. 4(a) that the communication system includes a master node, a source secondary node, a target secondary node, and a terminal device. The communication system is applicable to a scenario in which the terminal device is handed over from establishing dual connectivity communication with the master node and the source secondary node to establishing dual connectivity communication with the master node and the target secondary node. In other words, the communication system is applicable to a scenario in which a secondary node of the terminal device is handed over.

Figure 4B:
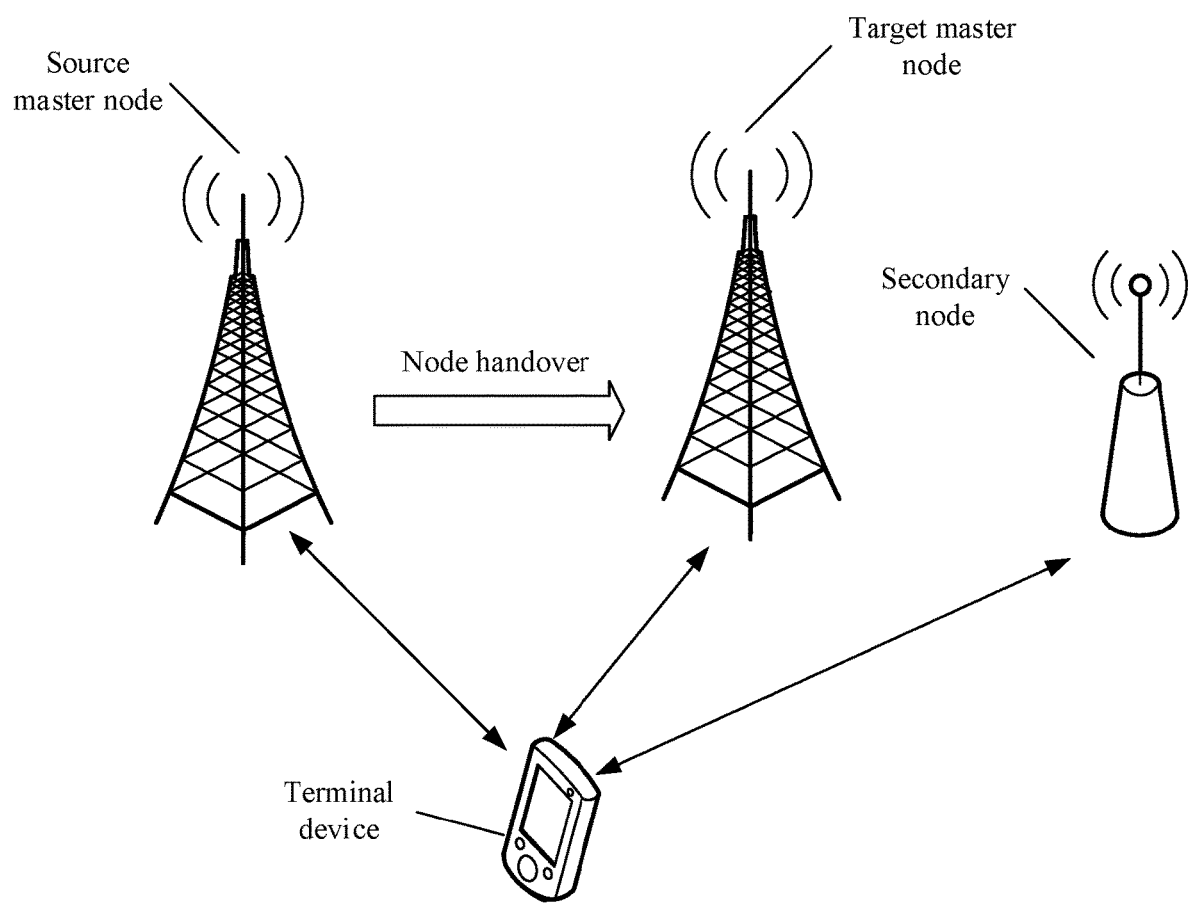
FIG. 4(b) is a schematic diagram of an architecture of another communication system according to an embodiment of this application.

Alternatively, FIG. 4(b) is a schematic diagram of an architecture of another communication system according to an embodiment of this application. It can be learned from FIG. 4(b) that the communication system mainly includes a source master node, a target master node, a secondary node, and a terminal device. The communication system is applicable to a scenario in which the terminal device is handed over from establishing dual connectivity communication with the source master node and the secondary node to establishing dual connectivity communication with the target master node and the secondary node. In other words, the communication system is applicable to a scenario in which a master node of the terminal device is handed over.

Figure 4C:
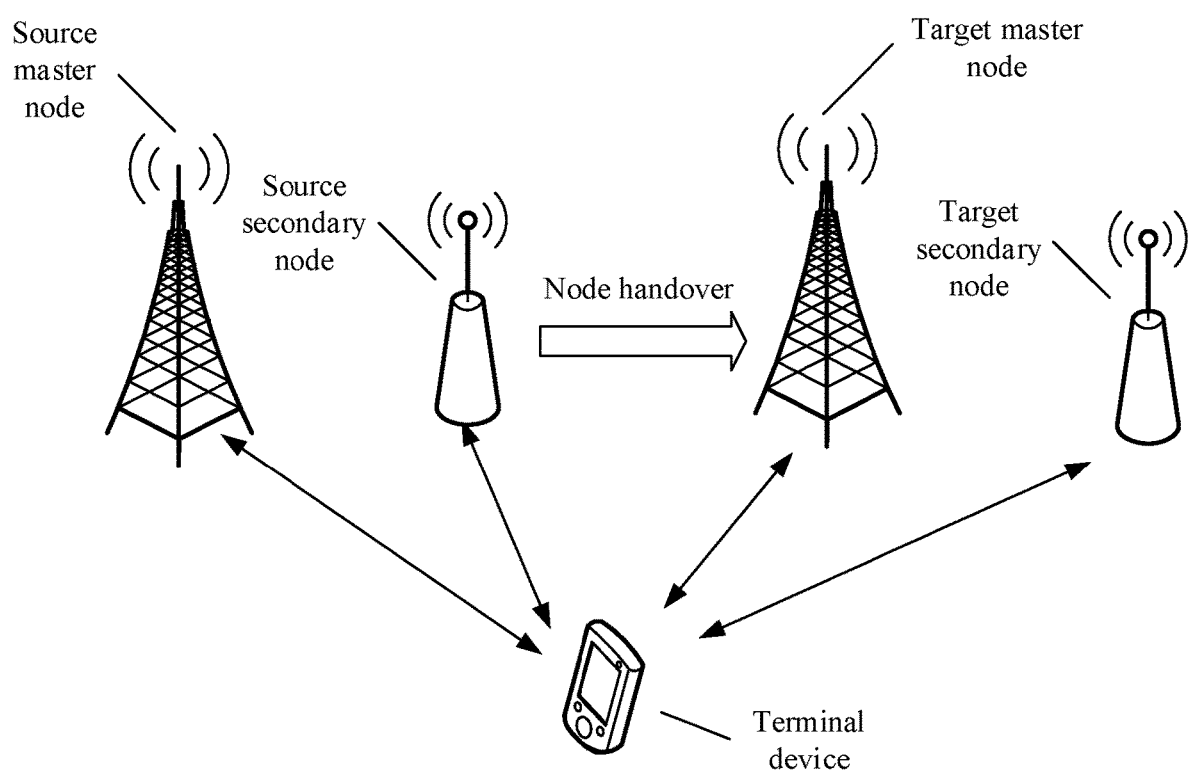
FIG. 4(c) is a schematic diagram of an architecture of another communication system according to an embodiment of this application.

Alternatively, FIG. 4(c) is a schematic diagram of an architecture of another communication system according to an embodiment of this application. It can be learned from FIG. 4(c) that the communication system mainly includes a source master node, a source secondary node, a target master node, a target secondary node, and a terminal device. The communication system is applicable to a scenario in which the terminal device is handed over from establishing dual connectivity communication with the source master node and the source secondary node to establishing dual connectivity communication with the target master node and the target secondary node. In other words, the communication system is applicable to a scenario in which both a master node and a secondary node of the terminal device are handed over.

In the communication scenario shown in FIG. 4(a), FIG. 4(b), or FIG. 4(c), in a process of node (including the secondary node and/or the master node) handover, the terminal device first disconnects a wireless connection to a source node, then initiates random access to a target node, and implements data exchange with the core network by using the target node after completing the random access. Therefore, in the process of the node handover, data transmission performed by the terminal device with the core network by using the node that is to be handed over is interrupted. As a result, delays of some ongoing services increase. However, a simultaneous connection handover method proposed in a conventional technology is applicable only to a scenario in which the terminal device works in single connectivity mode, and is not applicable to a scenario in which the terminal device works in dual connectivity mode. Therefore, how to overcome data transmission interruption in a process of node handover in dual connectivity mode has become one of urgent problems to be resolved.

Therefore, a main technical problem to be resolved in embodiments of this application is how to overcome the data transmission interruption in the process of the node handover in dual connectivity mode, to implement uninterrupted node handover.

Embodiment 1

Figure 5A:
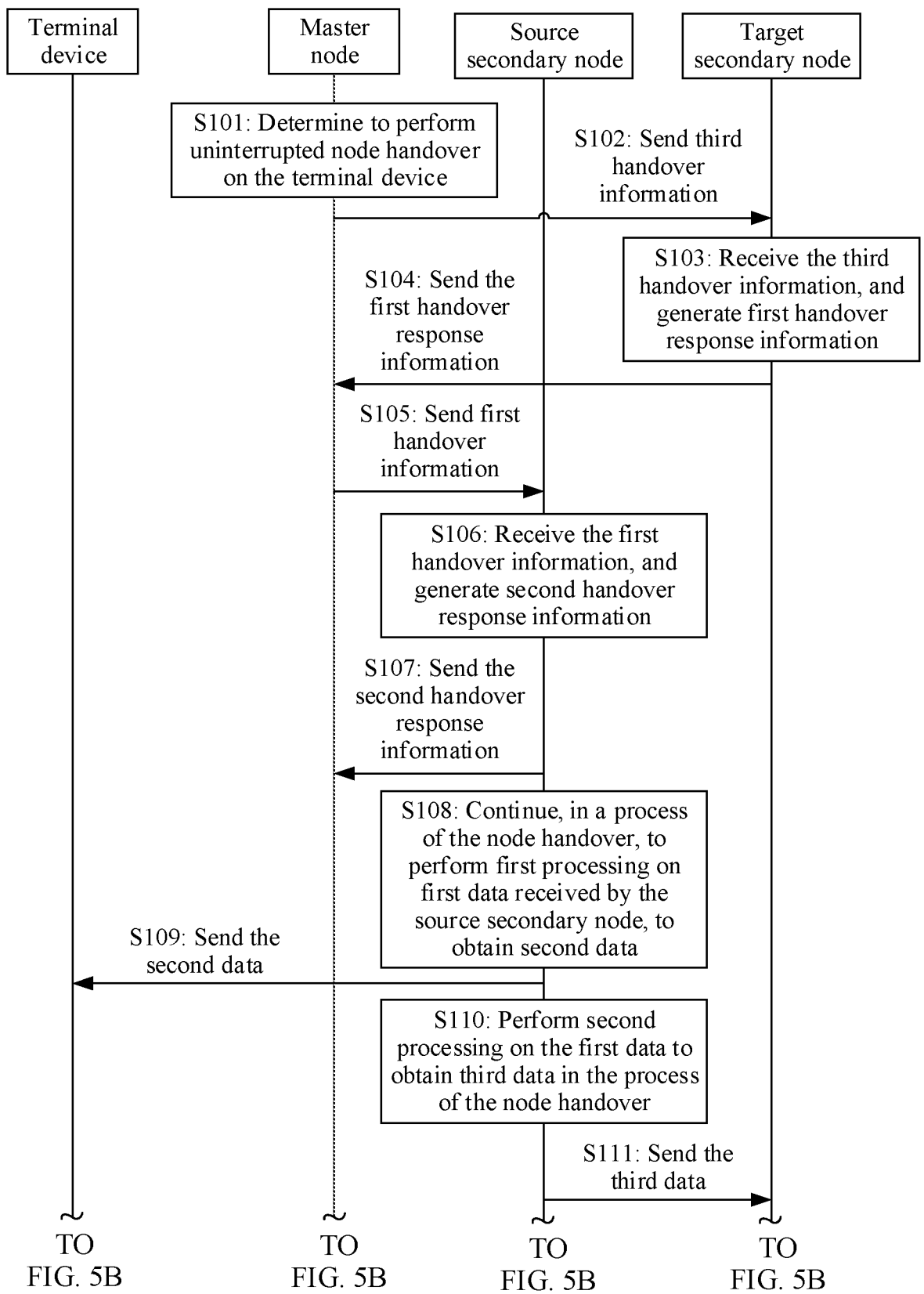
FIG. 5A and FIG. 5B are a schematic flowchart of a node handover method according to an embodiment of this application.
Figure 5B:
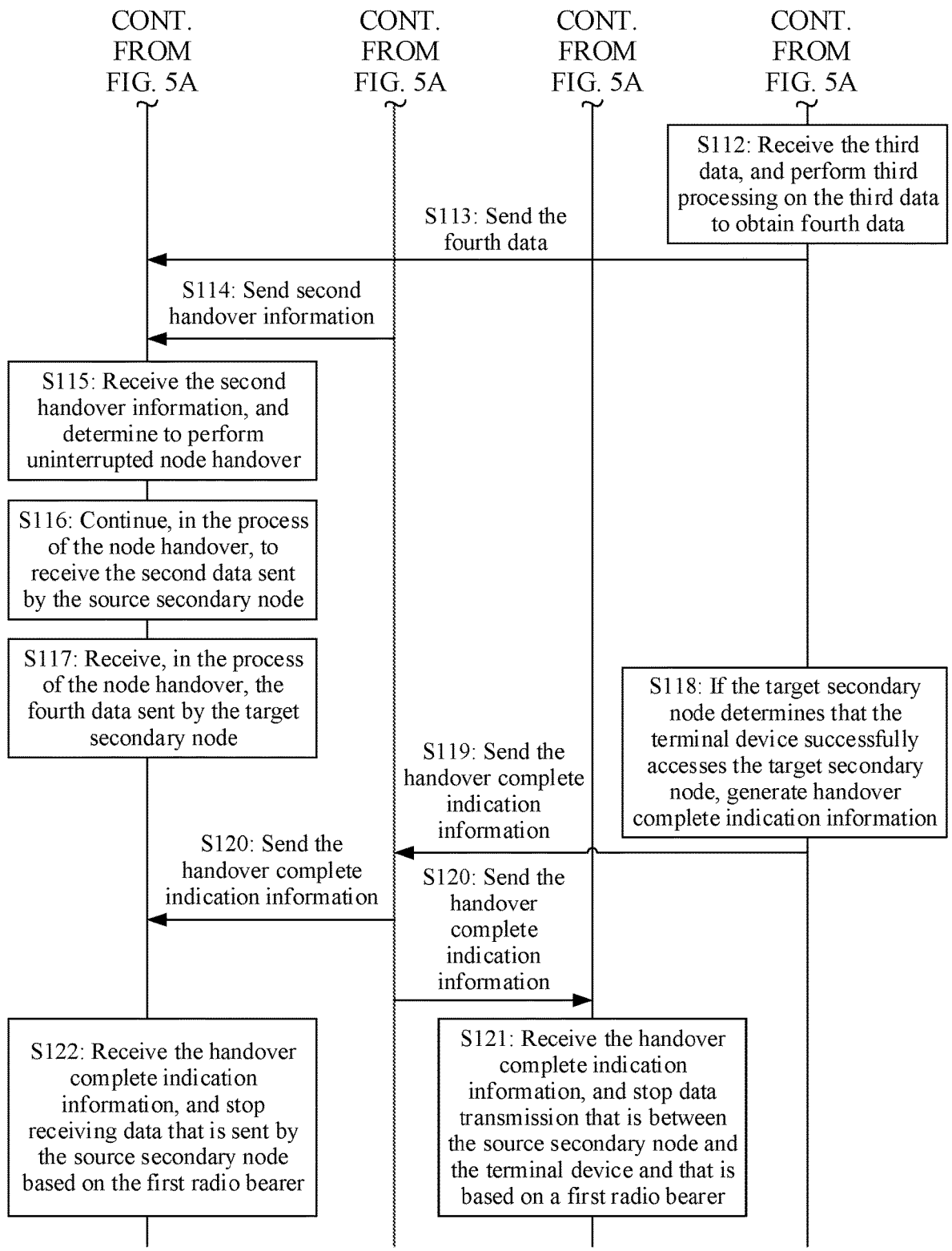

FIG. 5A and FIG. 5B are a schematic flowchart of a node handover method according to an embodiment of this application. The node handover method is applicable to the communication system shown in FIG. 4(a). The node handover method is applicable to the various architectures for implementing dual connectivity shown in FIG. 2(a) to FIG. 2(d). In this embodiment, the EN-DC architecture in FIG. 2(b) is used as an example for description. In a scenario to which the node handover method provided in this embodiment is applicable, a node that is to be handed over is a secondary node (where to be specific, a source secondary node is handed over to a target secondary node). A user plane connection between an access network device and a core network is terminated at the source secondary node before the handover, and the user plane connection between the access network device and the core network is terminated at the target secondary node or a master node after the handover. In addition, the node handover method provided in this embodiment is applicable to uplink or downlink data transmission between a terminal device and a core network device. In this embodiment, a case in which the core network sends downlink data to the terminal device is used as an example for description. As shown in FIG. 5A and FIG. 5B, the method includes the following operations.

S101: The master node determines to perform uninterrupted node handover on the terminal device.

In some embodiments, when the master node determines, based on a load balancing requirement, that the terminal device is to be handed over from a current serving cell to a new serving cell (where for ease of understanding and differentiation, the new serving cell is replaced with a target serving cell for description below), and the master node determines that the current serving cell of the terminal device is a secondary cell managed by the source secondary node and that the target serving cell is a secondary cell managed by the target secondary node, the master node may determine that the terminal device is to hand over the secondary node. Alternatively, when the master node receives a signal quality measurement result reported by the terminal device, and determines, based on the signal quality measurement result, that signal quality between the terminal device and the target secondary node is better than signal quality between the terminal device and the source secondary node, the master node determines that the terminal device is to perform node handover. Alternatively, the terminal device may report a signal quality measurement result detected by the terminal device to the source secondary node; the source secondary node may send a node handover request to the master node when receiving the signal quality measurement result and determining that signal quality between the source secondary node and the terminal device is lower than signal quality between the terminal device and the target secondary node, where the node handover request herein may include a node identifier of the source secondary node and a node identifier of the target secondary node; and after receiving the node handover request, the master node may determine that the terminal device is to perform node handover.

Further, after determining that the terminal device is to perform node handover, the master node may obtain preset non-interruption indication information, and determine, based on the non-interruption indication information, one or more radio bearers for which uninterrupted node handover is to be performed (where for ease of differentiation, the bearer is replaced with a target radio bearer for description below). Herein, the non-interruption indication information indicates one or more services. The one or more services are executed between the terminal device and the core network, and each have a high service delay requirement. In other words, in a process of the node handover, data transmission (including uplink or downlink data transmission) corresponding to the one or more services should not be interrupted. After obtaining the non-interruption indication information, the master node may select, from a plurality of radio bearers established between the source secondary node and the terminal device, one or more radio bearers for providing a data transmission service for the foregoing one or more services, and determine the one or more radio bearers as the one or more target radio bearers for which uninterrupted handover is to be performed. Herein, the target radio bearer may be a data radio bearer (DRB), an evolved radio access bearer (E-RAB), a protocol data unit (PDU) session, a quality of service (QoS) flow, or the like. This is not specifically limited in this application. In this embodiment, bearer mapping is not changed in the process of the node handover. In other words, in the EN-DC architecture, mapping between the E-RAB and the DRB remains unchanged, and a target secondary node side inherits a DRB ID (data radio bearer identifier) on a source secondary node side. In an NR-NR DC architecture and an NE-DC architecture, mapping between the QOS flow and the DRB also remains unchanged, and the target secondary node also inherits the DRB ID on the source secondary node side.

It should be noted that, for all of the one or more target radio bearers, all processes of implementing uninterrupted node handover are basically the same. Therefore, the following uses a first radio bearer included in the one or more target radio bearers as an example to describe the process of the uninterrupted node handover in detail.

S102: The master node sends third handover information to the target secondary node.

In some embodiments, after determining to perform uninterrupted node handover for the first radio bearer, the master node may send the third handover information to the target secondary node. Herein, the third handover information indicates the target secondary node to perform uninterrupted node handover.

In some embodiments, the third handover information may include non-interruption indication information, bearer identification information of the first radio bearer (where for ease of understanding and differentiation, the bearer identification information is replaced with first bearer identification information for description below), and node identification information of the source secondary node (where for ease of understanding and differentiation, the node identification information is replaced with first node identification information for description below). Herein, the non-interruption indication information indicates that the third handover information requests the target secondary node to perform uninterrupted node handover. In some embodiments, the non-interruption indication information may explicitly exist in the third handover information. For example, the non-interruption indication information may be an indication bit included in the third handover information. When a value of the indication bit is 1, the third handover information requests the target secondary node to perform uninterrupted node handover. Alternatively, the non-interruption indication information may implicitly exist in the third handover information. The bearer identification information of the first radio bearer indicates to the target secondary node that the target secondary node is to perform uninterrupted node handover for the first radio bearer. The first node identification information indicates that the node that is to be handed over is the source secondary node.

In some embodiments, the third handover information may further include bearer type related information and/or data forwarding indication information. Herein, the bearer type related information indicates a bearer type of the first radio bearer. During actual application, the bearer type of the first radio bearer may include an SN terminated bearer. Alternatively, more specifically, the bearer type of the first radio bearer may include an SN terminated MCG bearer, an SN terminated SCG bearer, or an SN terminated split bearer. Further, the third handover information may further include anchor change indication information. The anchor change indication information indicates whether the user plane connection to the core network is to change, after the node handover, from being terminated at the SN to being terminated at the MN. In some embodiments, the anchor change indication information may be an indication bit in the third handover information. When a value of the indication bit is 1, it indicates that the user plane connection to the core network changes, after the node handover, from being terminated at the SN to being terminated at the MN. If a value of the indication bit is 0, it indicates that the user plane connection to the core network is still terminated at the SN after the node handover. The data forwarding indication information indicates that the source secondary node or the master node is to forward data to the target secondary node, to request the target secondary node to provide a corresponding data forwarding address.

If the master node determines, before sending the third handover information, that an SN terminated bearer used by the target secondary node to send data to the terminal device in the process of the handover is associated with an MCG RLC bearer (where that is, the target secondary node sends the data to the terminal device by using an SN terminated MCG bearer or an SN terminated split bearer), the third handover information may further include a data forwarding address (where for ease of differentiation, the data forwarding address is replaced with a fourth data forwarding address for description below). The fourth data forwarding address is a data forwarding address provided by the master node, and is used by the target secondary node to forward data to the master node in the process of the node handover subsequently.

S103: The target secondary node receives the third handover information, and generates first handover response information.

In some embodiments, after receiving the third handover information, the target secondary node may parse the third handover information. If the target secondary node determines that the third handover information includes the non-interruption indication information, the first bearer identification information, and the first node identification information, the target secondary node may determine that the target secondary node is to perform uninterrupted node handover, and the uninterrupted node handover is for the first radio bearer.

The following describes, with reference to two different scenarios in which an anchor location remains unchanged and changes in the process of the handover, response information generated by the target secondary node for the third handover information (where for ease of description and differentiation, the response information is replaced with the first handover response information for description below). Hereinafter, change of the anchor location due to the handover does not occur in Scenario 1, and the change of the anchor location due to the handover occurs in Scenario 2.

Scenario 1:

If the target secondary node determines that the anchor change indication information in the third handover information indicates that the anchor location remains unchanged in the process of the node handover, the target secondary node may generate the first handover response information after determining to perform uninterrupted node handover on the terminal device, and send the first handover response information to the master node. The first handover response information provides configuration information that is related to the target secondary node and that is required for the node handover, and indicates that the target secondary node responds to a node handover request of the master node. Specifically, the first handover response information may include node configuration information of the target secondary node (where the node configuration information is replaced with first node configuration information for description below). The first node configuration information may include information such as configuration information of a PDCP entity corresponding to the target secondary node (where for ease of differentiation, the PDCP entity is replaced with a first PDCP entity for description below), configuration information of the service data adaptation protocol (SDAP) corresponding to the target secondary node, configuration information of a secondary cell group radio link control (RLC) bearer corresponding to the target secondary node (where the configuration information is replaced with first bearer configuration information for description below), first security information corresponding to the target secondary node, a random access resource of the target secondary node (where the random access resource is replaced with a first random access resource for description below), and secondary cell group configuration information of the target secondary node. Herein, it should be noted that the first PDCP entity and the SCG RLC bearer that corresponds to the target secondary node may have been established by the target secondary node before the node handover, or may be newly established by the target secondary node after the target secondary node determines to perform uninterrupted node handover. This is not specifically limited in this application. The first security information indicates a key used when the target secondary node performs data security processing by using the first PDCP entity (where for ease of differentiation, the key is replaced with a second key for description below).

Further, when the target secondary node determines that the third handover information includes the data forwarding indication information, the first handover response information generated by the target secondary node may further include data forwarding related information of the target secondary node (where for ease of differentiation, the data forwarding related information is replaced with first data forwarding related information for description below). Herein, the first data forwarding related information is used by the source secondary node or the core network to forward data to the target secondary node. In some embodiments, the first data forwarding related information may include a first data forwarding address provided by the target secondary node. The first data forwarding address is used by the source secondary node to forward data to the target secondary node in the process of the node handover subsequently. It should be noted that, in the process of the node handover, each radio bearer (namely, the foregoing target radio bearer) for which uninterrupted node handover is to be performed corresponds to one first data forwarding address separately. The first data forwarding related information may further include a second data forwarding address. Herein, one second data forwarding address corresponds to one PDU session. After the node handover is completed, the second data forwarding address may be used by the core network to send a downlink data packet to the target secondary node. Certainly, it may be understood that the second data forwarding address may alternatively be sent by the target secondary node to the master node after the node handover is completed. This is not specifically limited in this application.

Scenario 2:

If the target secondary node determines that the anchor change indication information in the third handover information indicates that the anchor location changes in the process of the handover (where to be specific, being terminated at the SN before the handover changes to being terminated at the MN), after the target secondary node determines to perform uninterrupted node handover on the terminal device, the target secondary node may alternatively generate the first handover response information, and send the first handover response information to the master node. The first handover response information provides configuration information that is related to the target secondary node and that is required for the handover, and indicates that the target secondary node responds to a node handover request of the master node. Specifically, the first handover response information may include second node configuration information of the target secondary node. The second node configuration information may include information such as configuration information of SDAP corresponding to the target secondary node, configuration information of an SCG RLC bearer corresponding to the target secondary node (where the configuration information is replaced with fourth bearer configuration information for description below), a first random access resource provided by the target secondary node, and secondary cell group configuration information of the target secondary node.

Further, when the target secondary node determines that the third handover information includes the data forwarding indication information, the first handover response information generated by the target secondary node may further include a third data forwarding address provided by the target secondary node. The third data forwarding address is used by the master node to forward data to the target secondary node in the process of the node handover. It should be noted that, in the process of the node handover, each radio bearer (namely, the foregoing target radio bearer) for which uninterrupted node handover is to be performed corresponds to one third data forwarding address separately.

S104: The target secondary node sends the first handover response information to the master node.

S105: The master node sends first handover information to the source secondary node.

In some embodiments, after receiving the first handover response information, the master node may generate the first handover information, and send the first handover information to the source secondary node. The first handover information indicates the source secondary node to perform uninterrupted node handover.

In some embodiments, the first handover information may include the non-interruption indication information, the first bearer identification information, and node identification information of the target secondary node (where for ease of differentiation, the node identification information is replaced with second node identification information for description below). Herein, the non-interruption indication information indicates that the first handover information requests the source secondary node to perform uninterrupted node handover. Similarly, the non-interruption indication information may explicitly exist in the first handover information, or may implicitly exist in the first handover information. This is not specifically limited in this application. The first bearer identification information notifies the source secondary node that the source secondary node is to perform uninterrupted node handover for the first radio bearer. The second node identification information notifies the source secondary node that the source secondary node is to be replaced with the target secondary node.

Further, the first handover information may further include second data forwarding related information, where the second data forwarding related information is used by the source secondary node to forward data to the master node or the target secondary node in the process of the node handover. In Scenario 1 above, the second data forwarding related information includes the first data forwarding address. In Scenario 2 above, the second data forwarding related information may include a fifth data forwarding address provided by the master node, and the fifth data forwarding address is used by the source secondary node to forward data to the master node in the process of the node handover.

In some embodiments, the first handover information may further include the bearer type related information. The bearer type related information indicates the bearer type of the first radio bearer. For example content, refer to the foregoing content of the bearer type related information in operation S102. Details are not described herein again.

S106: The source secondary node receives the first handover information, and generates second handover response information.

In some embodiments, after receiving the first handover information, the source secondary node may parse the first handover information. If the source secondary node determines that the first handover information includes the non-interruption indication information, the first bearer identification information, and the second node identification information, the source secondary node may determine that the source secondary node is to perform uninterrupted node handover on the terminal device, and the uninterrupted node handover is for the first radio bearer.

Further, after determining to perform uninterrupted node handover on the terminal device, the source secondary node may generate response information for the second handover information (where for ease of differentiation, the response information is replaced with the second handover response information for description below). The second handover response information notifies the master node that the source secondary node has received the first handover information and can perform uninterrupted node handover on the terminal device.

S107: The source secondary node sends the second handover response information to the master node.

In some embodiments, the source secondary node sends the second handover response information to the master node. After receiving the second handover response information, the master node may determine that the source secondary node has correctly received the second handover response information.

S108: The source secondary node continues, in the process of the node handover, to perform first processing on first data received by the source secondary node, to obtain second data.

In some embodiments, after determining to perform uninterrupted node handover on the terminal device, the source secondary node may continue to receive downlink data sent by the core network (where for ease of understanding and differentiation, the downlink data is replaced with the first data for description below). Then, the source secondary node may perform first processing on the first data to obtain the second data.

In some embodiments, the source secondary node first performs first processing on the received first data by using a PDCP entity associated with the source secondary node (where for ease of differentiation, the PDCP entity is replaced with a second PDCP entity for description below), to obtain the second data. Herein, the first processing mainly includes sequence number assignment and performing data encryption and/or integrity protection based on a first key associated with the second PDCP entity. In other words, the source secondary node first performs sequence number assignment on the first data by using the second PDCP entity, to obtain numbered first data. Then, the source secondary node may perform header compression on the numbered first data by using the second PDCP entity, and then perform data encryption and/or integrity protection on header compressed first data based on the first key. Finally, the source secondary node may perform processing such as PDCP header addition on data encrypted and/or integrity protected first data by using the second PDCP entity, to obtain the second data.

S109: The source secondary node sends the second data to the terminal device.

In some embodiments, after obtaining the second data through processing, the source secondary node may send the second data to the terminal device by using an SCG RLC bearer associated with the source secondary node (where for ease of differentiation, the SCG RLC bearer is replaced with a source SCG RLC bearer for description below). Alternatively, the source secondary node may send the second data to the terminal device by using an MCG RLC bearer that is on the master node and that is associated with the source secondary node (where for ease of differentiation, the MCG RLC bearer is replaced with a first MCG RLC bearer for description below). Alternatively, the source secondary node may send the second data to the terminal device by using both a source SCG RLC bearer and a first MCG RLC bearer.

In some embodiments, if the source secondary node originally sends the data to the terminal device by using the source SCG RLC bearer and the first MCG RLC bearer before the node handover (where that is, the type of the first radio bearer is specifically the SN terminated split bearer), the first handover information sent by the master node to the source secondary node may further include a first capability saving identifier. If the source secondary node extracts the first capability saving identifier from the first handover information, the source secondary node may send the second data to the terminal device by using only the source SCG RLC bearer or the first MCG RLC bearer in the process of the node handover. Alternatively, the source master node may actively send the second data to the terminal device by using only the first MCG RLC bearer or the source SCG RLC bearer in the process of the node handover. It should be noted that, in the process of the node handover, if the source master node sends the second data to the terminal device by using only the first MCG bearer, the source master node may retain only the second PDCP entity to continue to work, and release or delete the source SCG RLC bearer. It should be further additionally noted that, when the source master node actively sends the second data to the terminal device by using only the first MCG RLC bearer or the source SCG RLC bearer, the source secondary node may alternatively send a second capability saving identifier to the master node, to notify the master node that the source secondary node is to send the second data to the terminal device by using only the first MCG RLC bearer or the source SCG RLC bearer. In this case, the second capability saving identifier may be included in the second handover response information.

Herein, in the process of the node handover, the source secondary node sends the second data to the terminal device by using only the source SCG RLC bearer or the first MCG RLC bearer, so that the terminal device may maintain only the source SCG RLC bearer or the first MCG RLC bearer in the process of the node handover, and does not need to maintain both the source SCG RLC bearer and the first MCG RLC bearer. In this way, a requirement on a device capability of the terminal device is reduced, and applicability of the node handover method can be improved.

S110: The source secondary node performs second processing on the first data to obtain third data in the process of the node handover.

In some embodiments, after determining to perform uninterrupted node handover on the terminal device, the source secondary node may further perform second processing on the received first data to obtain the third data. Herein, the foregoing second processing mainly includes the sequence number assignment. In other words, after receiving the first data, the source secondary node may number the first data by using the second PDCP entity, to obtain the third data. Certainly, it may be understood that the first data refers to data received by the source secondary node from the core network, and may include a plurality of data packets. The source secondary node may process a part of the plurality of data packets to obtain the second data, send the second data to the terminal device, then process the other part of the plurality of data packets to obtain the third data, and forward the third data to the target secondary node. Alternatively, the source secondary node may simultaneously process the plurality of data packets to obtain the second data and the third data, then send the second data to the terminal device, and forward the third data to the target secondary node.

S111: The source secondary node forwards the third data to the target secondary node.

In some embodiments, in Scenario 1 above, after obtaining the third data through processing, the source secondary node may forward the third data to the target secondary node by using the first data forwarding address.

S112: The target secondary node receives the third data, and performs third processing on the third data to obtain fourth data.

In some embodiments, after receiving the third data forwarded by the source secondary node, the target secondary node may perform third processing on the third data to obtain the fourth data. Herein, the third processing mainly includes performing data encryption and/or integrity protection based on the second key corresponding to the first PDCP entity. During actual application, the target secondary node may perform header compression on the third data, then perform data encryption and/or integrity protection on header compressed third data based on the second key, and finally perform processing such as PDCP header addition on data encrypted and/or integrity protected third data, to obtain the fourth data.

S113: The target secondary node sends the fourth data to the terminal device.

In some embodiments, after obtaining the fourth data through processing, the target secondary node may send the fourth data to the terminal device by using an SCG RLC bearer associated with the target secondary node (where for ease of understanding and differentiation, the SCG RLC bearer is replaced with a first target SCG RLC bearer for description below). Alternatively, the target secondary node may send the fourth data to the terminal device by using an MCG RLC bearer that is on the master node and that is associated with the target secondary node (where for ease of differentiation, the MCG RLC bearer is replaced with a second MCG RLC bearer for description below). Alternatively, the target secondary node may send the fourth data to the terminal device by using both a first target SCG RLC bearer and a second MCG RLC bearer. Herein, before the fourth data is sent to the terminal device, the master node may newly establish the second MCG RLC bearer. Alternatively, the master node may select an idle MCG RLC bearer from MCG RLC bearers that the master node has established, and determine the idle MCG RLC bearer as the second MCG RLC bearer associated with the target secondary node. The target secondary node may alternatively establish the first target SCG RLC bearer; or select an idle SCG RLC bearer from SCG RLC bearers that the target secondary node has established, and determine the idle SCG RLC bearer as the first target SCG RLC bearer.

It should be noted herein that, if the type of the first radio bearer is the SN terminated split bearer, the target secondary node may not completely inherit the type of the first radio bearer when saving the capability of the terminal device is considered. To be specific, in the process of the node handover, the target secondary node may preferentially send the fourth data to the terminal device by using the first target SCG RLC bearer or the second MCG RLC bearer. In the process of the node handover, the target secondary node sends the fourth data to the terminal device by using only the first target SCG RLC bearer or the second MCG RLC bearer, so that the terminal device may maintain only the first target SCG RLC bearer or the second MCG RLC bearer in the process of the node handover, and does not need to maintain both the first target SCG RLC bearer and the second MCG RLC bearer. In this way, the requirement on the device capability of the terminal device can be further reduced.

It should be added that, in Scenario 2 above, operation S111 to operation S113 may be replaced with the following operation S1001 to operation S1003.

S1001: The source secondary node sends the third data to the master node.

In some embodiments, after obtaining the third data through processing, the source secondary node may forward the third data to the master node by using the fifth data forwarding address.

S1002: The master node processes the third data to obtain fifth data.

In some embodiments, after receiving the third data sent by the source secondary node, the master node may perform processing (where the processing is replaced with fourth processing for description below) on the third data by using a PDCP entity associated with the master node (where for ease of differentiation, the PDCP entity is replaced with a third PDCP entity for description below), to obtain the fifth data. Herein, the fourth processing mainly includes performing data encryption and/or integrity protection based on a third key corresponding to the third PDCP entity. During actual application, the master node may first perform header compression on the third data, then perform data encryption and/or integrity protection on header compressed third data based on the third key, and finally perform processing such as PDCP header addition on data encrypted and/or integrity protected third data, to obtain the fifth data.

S1003: The master node sends the fifth data to the terminal device.

In some embodiments, after obtaining the fifth data through processing, the master node may send the fifth data to the terminal device by using an MCG RLC bearer associated with the master node (namely, an MCG RLC bearer corresponding to the third PDCP entity) (where for ease of differentiation, the MCG RLC bearer is replaced with a third MCG RLC bearer for description below). Alternatively, the master node may send the fifth data to the target secondary node, and then send the fifth data to the terminal device by using an SCG RLC bearer that is on the target secondary node and that corresponds to the third PDCP entity (where for ease of differentiation, the SCG RLC bearer is replaced with a second target SCG RLC bearer for description below). It should be noted that, in Scenario 2, fourth data is data obtained by performing fourth processing on the third data by the master node and sent to the target secondary node by the master node. Therefore, the fifth data sent by the master node to the target secondary node is the fourth data. Alternatively, the master node may first split the fifth data into fourth data and sixth data other than the fourth data. Then, the master node may send the sixth data to the terminal device by using the third MCG RLC bearer, and send the fourth data to the target secondary node. Then, the target secondary node sends the fourth data to the terminal device by using a second target SCG RLC bearer.

It should be added that, before the master node sends the fifth data to the terminal device, the master node may establish the third MCG RLC bearer. Alternatively, the master node may select an idle MCG RLC bearer from MCG RLC bearers that the master node has established, and determine the idle MCG RLC bearer as the third MCG RLC bearer associated with the target secondary node. Similarly, the target secondary node may alternatively establish the second target SCG RLC bearer; or select an idle SCG RLC bearer from SCG RLC bearers that the target secondary node has established, and determine the idle SCG RLC bearer as the second target SCG RLC bearer.

Preferably, to save the capability of the terminal device, the master node may send the fifth data to the terminal device by using only the second target SCG RLC bearer or the third MCG RLC bearer in the process of the node handover. Herein, in the process of the node handover, the master node sends the fifth data to the terminal device by using only the second target SCG RLC bearer or the third MCG RLC bearer, so that the terminal device may maintain only the second target SCG RLC bearer or the third MCG RLC bearer in the process of the node handover, and does not need to maintain both the second target SCG RLC bearer and the third MCG RLC bearer. In this way, the requirement on the device capability of the terminal device can be reduced.

S114: The master node sends second handover information to the terminal device.

In some embodiments, after determining to perform uninterrupted node handover on the terminal device, the master node may further send the second handover information to the terminal device. The following describes example content of the second handover information in detail with reference to Scenario 1 and Scenario 2 above.

Scenario 1:

In some embodiments, the second handover information includes one or more of the first node configuration information, third node configuration information of the master node, the non-interruption indication information, and the bearer identification information of the first radio bearer. The non-interruption indication information and the bearer identification information of the first radio bearer request the terminal device to perform uninterrupted node handover for the first radio bearer. The first node configuration information is used by the terminal device to perform corresponding configuration, so that the terminal device can receive the fourth data from the target secondary node by using the first target SCG RLC bearer in the process of the node handover. The third node configuration information is used by the terminal device to perform corresponding configuration, so that the terminal device can receive the fourth data from the target secondary node by using the second MCG RLC bearer. Specifically, the third node configuration information may include configuration information of SDAP corresponding to the master node and second bearer configuration information, and the second bearer configuration information is used by the terminal device to establish the second MCG RLC bearer.

In some embodiments, the second handover information may further include bearer type indication information, and the bearer type indication information indicates a bearer type of a radio bearer used when the target secondary node sends the fourth data to the terminal device. For example, when the bearer type indicated by the bearer type indication information is the SN terminated SCG bearer, it indicates that the target secondary node sends the fourth data to the terminal device by using only the first target SCG RLC bearer. When the bearer type indicated by the bearer type indication information is the SN terminated MCG bearer, it indicates that the target secondary node sends the fourth data to the terminal device by using only the second MCG RLC bearer. When the bearer type indicated by the bearer type indication information is the SN terminated split bearer, it indicates that the target secondary node sends the fourth data to the terminal device by using the first target SCG RLC bearer and the second MCG RLC bearer. It may be understood that the bearer type indication information may explicitly exist in the second handover information, or may implicitly exist in the second handover information. This is not specifically limited in this application.

It should be noted that, during actual application, the bearer type indication information may preferentially indicate that the target secondary node sends the fourth data to the terminal device by using the SN terminated SCG bearer or the SN terminated MCG bearer. In this way, the terminal device may receive the fourth data by using only the first target SCG RLC bearer or the second MCG RLC bearer. In this way, in a process of receiving the fourth data, the terminal device may maintain only the first target SCG RLC bearer or the second MCG RLC bearer, so that the requirement on the device capability of the terminal device can be reduced, and applicability of the node handover method can be improved.

Scenario 2:

In some embodiments, the second handover information includes one or more of the second node configuration information of the target secondary node, fourth node configuration information of the master node, the non-interruption indication information, and the first bearer identification information. The non-interruption indication information and the bearer identification information of the first radio bearer notify the terminal device to perform uninterrupted node handover for the first radio bearer. The second node configuration information is used by the terminal device to perform corresponding configuration, so that the terminal device can receive the fourth data from the target secondary node by using the second target SCG RLC bearer. The fourth node configuration information is used by the terminal device to perform corresponding configuration, so that the terminal device can receive the fifth data or the sixth data from the master node by using the third MCG RLC bearer. Specifically, the fourth node configuration information may include configuration information of PDCP corresponding to the master node (namely, configuration information of the third PDCP entity), configuration information of SDAP corresponding to the master node, second security information, and third bearer configuration information (namely, configuration information of an MCG RLC bearer associated with the secondary node). The second security information indicates the third key corresponding to the third PDCP entity.

In some embodiments, the second handover information may alternatively include the bearer type indication information, and the bearer type indication information indicates a bearer type of a radio bearer used when the master node sends the fifth data to the terminal device. For example, when the bearer type indicated by the bearer type indication information is an MN terminated SCG bearer, it indicates that the master node sends the fifth data (which is equivalent to the fourth data in this case) to the terminal device by using only the second target SCG RLC bearer. When the bearer type indicated by the bearer type indication information is an MN terminated MCG bearer, it indicates that the target secondary node sends the fifth data to the terminal device by using only the third MCG RLC bearer. When the bearer type indicated by the bearer type indication information is the SN terminated split bearer, it indicates that the master node sends the fifth data (where the fifth data includes the fourth data and the sixth data in this case) to the terminal device by using the second target SCG RLC bearer and the third MCG RLC bearer. It may be understood that the bearer type indication information may alternatively explicitly exist in the second handover information, or may implicitly exist in the second handover information. This is not specifically limited in this application.

It should be noted that the bearer type indication information may preferentially indicate that the master node sends the fourth data to the terminal device by using the MN terminated SCG bearer or the MN terminated MCG bearer. In this way, the terminal device may receive the fourth data by using only the second target SCG RLC bearer or the third MCG RLC bearer. In this way, in a process of receiving the fourth data, the terminal device may maintain only the second target SCG RLC bearer or the third MCG RLC bearer, so that the requirement on the device capability of the terminal device can be reduced, and applicability of the node handover method can be improved.

In addition, in Scenario 1 or Scenario 2 above, on a premise that the source secondary node sends the second data to the terminal device by using the source SCG RLC bearer and the first MCG RLC bearer (where that is, the source secondary node sends the second data to the terminal device by using the SN terminated split bearer), the second handover information may alternatively include a third capability saving identifier. The third capability saving identifier notifies the terminal device that the terminal device may receive the second data from the source secondary node by using only the source SCG RLC bearer or the first MCG RLC bearer. During actual application, whether the terminal device is to receive the second data from the source secondary node by using only the source SCG RLC bearer or by using only the first MCG RLC bearer may be indicated by the master node by using the third capability saving identifier, or may be preconfigured in a communication protocol between the terminal device and the source secondary node. This is not specifically limited in this application.

S115: The terminal device receives the second handover information, and determines to perform uninterrupted node handover.

In some embodiments, the terminal device may receive the second handover information sent by the master node, and determine, based on the second handover information, to perform uninterrupted node handover for the first radio bearer.

With reference to Scenario 1 and Scenario 2 above, the following describes in detail some operations performed after the terminal device determines to perform uninterrupted node handover.

Scenario 1:

After the terminal device receives the second handover information, if the terminal device determines that the second handover information includes the non-interruption indication information and the bearer identification information of the first radio bearer, the terminal device may determine that the second handover information requests the terminal device to perform uninterrupted node handover for the first radio bearer. Then, if the terminal device extracts the first node configuration information from the second handover information, the terminal device may perform corresponding configuration based on the first node configuration information. Specifically, the terminal device may establish, based on the configuration information that is of the first PDCP entity and that is included in the first node configuration information, a PDCP entity corresponding to the target secondary node (where for ease of differentiation, the PDCP entity is replaced with a fourth PDCP entity for description below), and the fourth PDCP entity corresponds to a first security processing module. The first security processing module is configured to perform data decryption and/or security protection verification based on the second key indicated by the first security information. The terminal device may alternatively perform SDAP configuration based on the configuration information that is of SDAP corresponding to the target node and that is included in the first node configuration information. The terminal device may alternatively establish the first target SCG RLC bearer based on the first bearer configuration information included in the first node configuration information. If the terminal device further extracts the third node configuration information from the second handover information, the terminal device may perform corresponding SDAP configuration based on the configuration information that is of SDAP corresponding to the master node and that is included in the third node configuration information. The terminal device may alternatively establish the second MCG RLC bearer based on the second bearer configuration information included in the third node configuration information.

In some embodiments, if the terminal device extracts the bearer type indication information from the second handover information, the terminal device may determine, based on the bearer type indication information, whether the terminal device is to receive, by using only the first target SCG bearer or the second MCG RLC bearer, the fourth data sent by the target secondary node or is to receive, by using both the first target SCG bearer and the second MCG RLC bearer, the fourth data sent by the target secondary node. Therefore, the terminal device may establish only the first target SCG bearer when determining to receive the fourth data by using only the first target SCG bearer. Alternatively, the terminal device establishes both the second MCG RLC bearer and the first target SCG bearer when determining that the terminal device is to receive the fourth data by using only the second MCG RLC bearer or by using both the first target SCG bearer and the second MCG RLC bearer.

Scenario 2:

After the terminal device receives the second handover information, if the terminal device determines that the second handover information includes the non-interruption indication information and the bearer identification information of the first radio bearer, the terminal device may determine that the second handover information requests the terminal device to perform uninterrupted node handover for the first radio bearer. Then, if the terminal device extracts the second node configuration information from the second handover information, the terminal device may perform corresponding configuration based on the second node configuration information. Specifically, the terminal device may perform SDAP configuration based on the configuration information that is of SDAP corresponding to the target node and that is included in the second node configuration information. The terminal device may alternatively establish the second target SCG RLC bearer based on the fourth bearer configuration information included in the second node configuration information. Then, if the terminal device extracts the fourth node configuration information from the second handover information, the terminal device may establish, based on the configuration information that is of the third PDCP entity and that is included in the fourth node configuration information, a PDCP entity corresponding to the master node. Herein, because a PDCP entity on a terminal device side is public for any cell, the PDCP entity corresponding to the master node and the foregoing fourth PDCP entity may be a same PDCP entity. In this case, the fourth PDCP entity newly establishes a third security processing module, and the third security processing module is configured to perform data decryption and/or security protection verification based on the third key indicated by the second security information. The terminal device may alternatively perform corresponding SDAP configuration based on the configuration information that is of SDAP corresponding to the master node and that is included in the fourth node configuration information. The terminal device may alternatively establish the third MCG RLC bearer based on the third bearer configuration information included in the fourth node configuration information.

In some embodiments, if the terminal device extracts the bearer type indication information from the second handover information, the terminal device may determine, based on the bearer type indication information, whether the terminal device is to receive, by using only the second target SCG bearer or the third MCG RLC bearer, the fourth data sent by the target secondary node or is to receive, by using both the first target SCG bearer and the second MCG RLC bearer, the fourth data sent by the target secondary node. Therefore, the terminal device may establish only the first target SCG bearer when determining to receive the fourth data by using only the first target SCG bearer. Alternatively, the terminal device establishes both the second MCG RLC bearer and the first target SCG bearer when determining that the terminal device is to receive the fourth data by using only the second MCG RLC bearer or by using both the first target SCG bearer and the second MCG RLC bearer.

Further, if the terminal device extracts the third capability saving identifier from the second handover information, the terminal device determines that the terminal device may receive, by using only the source SCG RLC bearer or the first MCG RLC bearer, the second data sent by the source secondary node. Specifically, the terminal device may delete or release the source SCG RLC bearer or the first MCG RLC bearer. How the terminal device deletes the source SCG RLC bearer or the first MCG RLC bearer may be specified by the second handover information, or may be specified in advance in the communication protocol between the terminal device and the source secondary node. For example, the communication protocol between the terminal device and the source secondary node may specify that the terminal device automatically releases the source SCG RLC bearer or the first MCG RLC bearer. Further, the terminal device may further stop operations at a MAC layer and a PHY layer that correspond to the master node or a source node. Similarly, how the terminal device stops the operations at the MAC layer and the PHY layer that correspond to the master node or the source node may be specified by the second handover information, or may be specified in advance in the communication protocol between the terminal device and the source secondary node. This is not specifically limited in this application.

Regardless of Scenario 1 or Scenario 2 above, the terminal device may also generate the configuration response information for the second handover information after completing corresponding configuration based on the second handover information. The configuration response information indicates that the terminal device has completed configuration of resources, for example, a protocol entity and a radio bearer, related to the target secondary node and/or the master node. In some embodiments, after receiving the configuration response information, the master node may forward the configuration response information to the target secondary node, to notify the target secondary node that the terminal device has completed corresponding configuration.

S116: The terminal device continues, in the process of the node handover, to receive the second data sent by the source secondary node.

In some embodiments, in the process of the node handover, the terminal device may continue to receive, by using the source SCG RLC bearer and/or the first MCG RLC bearer, the second data sent by the source secondary node.

After receiving the second data, the terminal device may first perform a PDCP header removal operation on the second data by using the fourth PDCP entity, and transmit PDCP header removed second data to a second security processing module included in the fourth PDCP entity. The second security processing module may perform data decryption and/or integrity protection verification on the second data by using the first key, to obtain seventh data. Then, the terminal device may perform duplicate detection on the seventh data by using the fourth PDCP entity, and remove duplicate data. Finally, the terminal device may deliver duplicate detected seventh data in order.

S117: The terminal device receives, in the process of the node handover, the fourth data sent by the target secondary node.

In some embodiments, after determining to perform uninterrupted node handover, the terminal device may initiate a random access request to the target secondary node based on the first random access resource included in the second handover information. In some embodiments, the terminal device may access the target secondary node in a manner such as contention-based random access (CBRA), contention-free random access (CFRA), two-step random access (RA), or random access-less (RA-less). After determining, based on a status such as current network load, to allow access of the terminal device, the target secondary node may send a random access response to the terminal device, and further complete an access operation of the terminal device. The following briefly describes, with reference to Scenario 1 and Scenario 2 above, a process in which the terminal device receives and processes the fourth data.

Scenario 1:

After receiving the access response and determining that the terminal device successfully accesses the target secondary node, the terminal device may receive, by using the first target SCG RLC bearer and/or the second MCG RLC bearer, the fourth data sent by the target secondary node. Then, the terminal device may perform a PDCP header removal operation on the fourth data by using the fourth PDCP entity, and transmit PDCP header removed fourth data to the first security processing module in the fourth PDCP entity. The first security processing module may perform data decryption and/or security protection verification on the fourth data by using the second key, to obtain eighth data. Then, the terminal device may perform duplicate detection on the eighth data by using the fourth PDCP entity, and remove duplicate data. Finally, the terminal device may deliver duplicate detected eighth data in order.

Scenario 2:

After receiving the access response and determining that the terminal device successfully accesses the target secondary node, the terminal device may receive, by using the second target SCG RLC bearer, the fourth data sent by the target secondary node, and the terminal device may also receive, by using the third MCG RLC bearer, the sixth data sent by the master node. Herein, the fourth data and the sixth data each are a part or all of the fifth data. After receiving the fourth data, the terminal device may process the fourth data by using the fourth PDCP entity. For an example processing process, refer to the process in which the terminal device processes the fourth data based on the fourth PDCP entity in Scenario 1. Details are not described herein again. In addition, the terminal device may also perform, by using the fourth PDCP entity, a PDCP header removal operation on the sixth data received by the terminal device. Then, the terminal device may transmit PDCP header removed fourth data and sixth data to the third security processing module in the fourth PDCP entity. The third security processing module may perform data decryption and/or security protection verification on the PDCP header removed fourth data and sixth data by using the third key, to obtain ninth data. Then, the terminal device may perform duplicate detection on the ninth data by using the fourth PDCP entity, and remove duplicate data. Finally, the terminal device may deliver duplicate detected ninth data to a higher layer in order.

In some embodiments, regardless of Scenario 1 or Scenario 2 above, if the terminal device does not correctly receive some data packets in the fourth data sent by the target secondary node, the terminal device may send a PDCP status report to the source secondary node or the master node, to notify the source secondary node or the master node that the terminal device does not correctly receive the data packets, so that the source secondary node or the master node is triggered to resend the data packets to the terminal device.

S118: If the target secondary node determines that the terminal device successfully accesses the target secondary node, the target secondary node generates handover complete indication information.

In some embodiments, if the target secondary node determines that the terminal device has successfully accessed the target secondary node, and the terminal device correctly receives the fourth data, the target secondary node may generate the handover complete indication information. The handover complete indication information indicates that the uninterrupted node handover for the first radio bearer has been completed.

S119: The target secondary node sends the handover complete indication information to the master node.

In some embodiments, after generating the handover complete indication information, the target secondary node may send the handover complete indication information to the master node and the terminal device, to indicate the master node to release the source secondary node.

S120: The master node receives the handover complete indication information, and forwards the handover complete indication information to the source secondary node and the terminal device.

In some embodiments, after receiving the handover complete indication information, the master node may release the source secondary node. Specifically, the master node may release or delete a configuration used or a resource occupied to establish dual connectivity with the source secondary node.

Further, the handover complete indication information may be forwarded to the source secondary node and the terminal device, to notify the source secondary node and the terminal device that the uninterrupted node handover for the first radio bearer has been completed.

S121: The source secondary node receives the handover complete indication information, and stops data transmission that is between the source secondary node and the terminal device and that is based on the first radio bearer.

In some embodiments, after receiving the handover complete indication information, the source secondary node may determine that the uninterrupted node handover for the first radio bearer has been completed. Then, the source secondary node may stop the data transmission that is between the source secondary node and the terminal device and that is based on the first radio bearer. It should be noted that, if there is still buffered data when the source secondary node determines that the uninterrupted node handover for the first radio bearer has been completed, the source secondary node may continue to send the data to the terminal device, and does not stop data transmission between the source secondary node and the terminal device until sending of the last data packet is completed.

Further, the source secondary node may further feed back the first receiving response information to the master node, to notify the master node that the source secondary node has correctly received the handover complete indication information.

S122: The terminal device receives the handover complete indication information, and stops receiving data that is sent by the source secondary node based on the first radio bearer.

In some embodiments, after receiving the handover complete indication information, the terminal device may determine that the uninterrupted node handover for the first radio bearer has been completed, and may stop receiving the data from the source secondary node. Further, the terminal device releases an air interface link between the terminal device and the source secondary node. Specifically, the terminal device may release or delete the source SCG RLC bearer between the terminal device and the source secondary node, the PDCP entity (namely, the second PDCP entity) corresponding to the source secondary node, and an MCG RLC bearer (for example, the first MCG RLC bearer) associated with the PDCP entity.

In some embodiments, after receiving the handover complete indication information, the terminal device may further feed back the second receiving response information to the master node, to notify the master node that the terminal device has correctly received the handover complete indication information.

Further, the master node may further send the path switching information to the core network. The path switching information notifies the core network that a receiver of the downlink data of the core network may be handed over from the source secondary node to the target secondary node or the master node. Herein, the path switching information may include a sixth data forwarding address provided by the master node or the second data forwarding address. The second data forwarding address is used by the core network to send the downlink data to the target secondary node. The sixth data forwarding address is used by the core network to send the downlink data to the master node.

After receiving the path switching information, the core network may send the transmission termination information to the source secondary node, and stop sending new downlink data to the source secondary node. Then, the core network may start, by using the second data forwarding address, to send the new downlink data to the target secondary node, or send the new downlink data to the master node by using the sixth data forwarding address.

The following briefly describes an entire process of node handover from a perspective of a data flow with reference to different protocol architectures in Scenario 1 or Scenario 2 above.

Figure 6A:
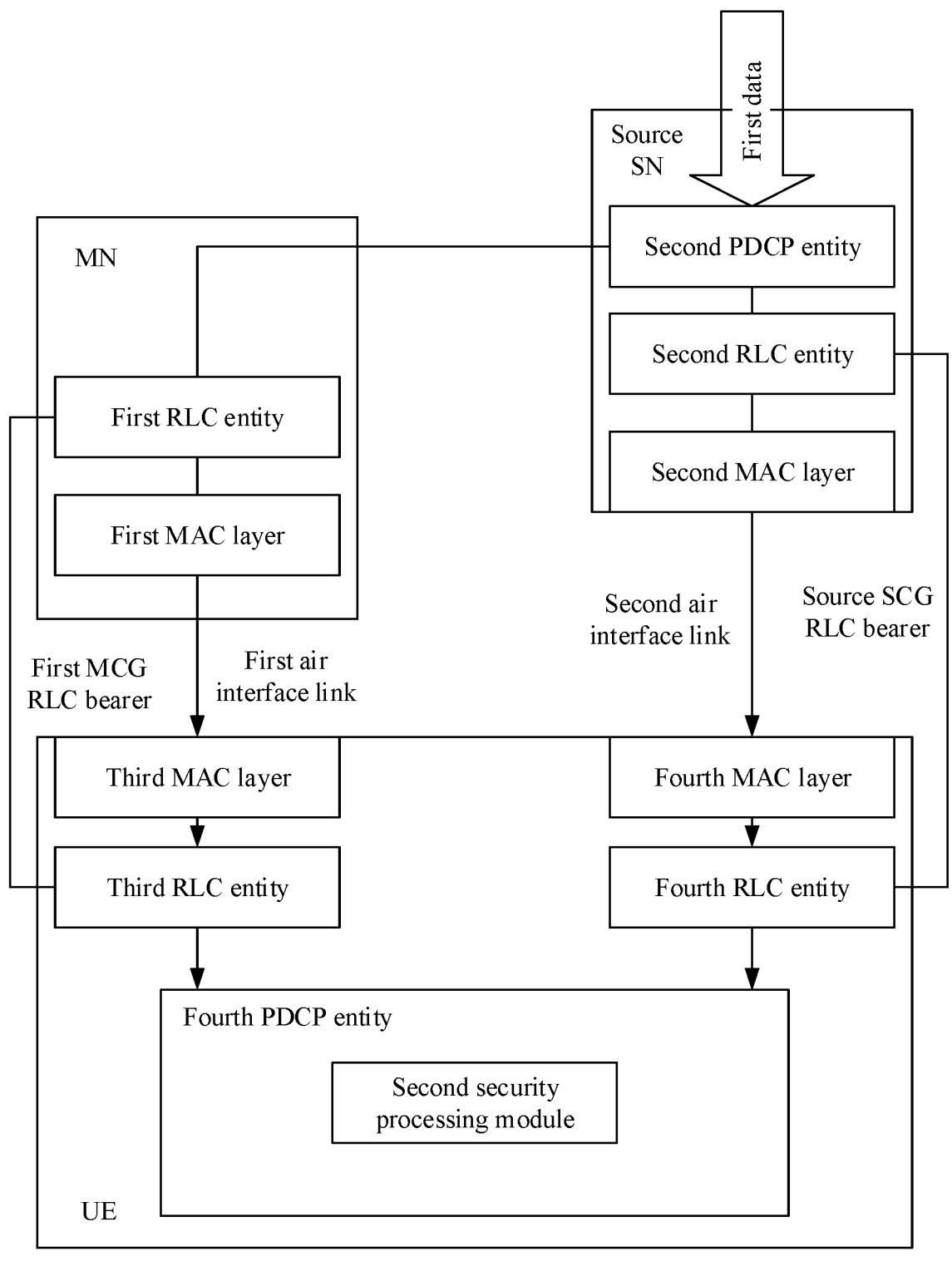
FIG. 6(a) is a schematic diagram of a protocol stack architecture according to an embodiment of this application.

FIG. 6(a) is a schematic diagram of a protocol stack architecture according to an embodiment of this application. The protocol stack architecture is a protocol stack architecture corresponding to an entire communication system before node handover, and the protocol stack architecture is applicable to Scenario 1 or Scenario 2. As shown in FIG. 6(a), before the node handover, after receiving first data from a core network, a source secondary node may perform processing such as sequence number arrangement, header compression, data encryption, security protection, and header addition on the first data by using a second PDCP entity established by the source secondary node, to obtain second data. Then, when the source secondary node sends the second data to a terminal device by using a first MCG RLC bearer, the source secondary node may first send the second data to a first RLC entity of a master node. The master node first processes the second data by using the first RLC entity, and sends processed second data to a first MAC layer of the master node. Then, the master node processes, by using the first MAC layer and a PHY layer of the master node, a protocol data unit (PDU) output by the first RLC entity, and sends, to the terminal device through a first air interface link between the master node and the terminal device, data obtained through processing performed by using the first MAC layer and the PHY layer of the master node. The terminal device performs, by using a PHY layer, a third MAC layer, and a third RLC entity that are of the terminal device, a series of processing on the data received by the terminal device on the first air interface link, and transmits processed data to a fourth PDCP entity. Then, the terminal device may first remove, by using the fourth PDCP entity, a PDCP header from a PDU output by the third RLC entity, and then perform data decryption and security protection verification on PDCP header removed data by using a second security processing module (included in the fourth PDCP entity) corresponding to the source secondary node, to obtain seventh data. Then, the terminal device performs duplicate detection on the seventh data, and delivers duplicate detected seventh data in order.

Alternatively, when the source secondary node sends the second data to a terminal device by using a source SCG RLC bearer, the source secondary node directly transmits the second data to a second RLC entity established by the source secondary node. Then, the source secondary node processes the second data by using the second RLC entity, and transmits processed second data to a second MAC layer established by the source secondary node. Then, the source secondary node processes, by using the second MAC layer and a PHY layer that is established by the source secondary node, a PDU output by the second RLC entity, and sends, to the terminal device through a second air interface link between the source secondary node and the terminal device, data obtained through processing performed by using the second MAC layer and the PHY layer that is established by the source secondary node. The terminal device performs, by using a PHY layer, a fourth MAC layer, and a fourth RLC entity that are of the terminal device, a series of processing on the data received by the terminal device on the second air interface link, and transmits processed data to a fourth PDCP entity. Then, the terminal device may first remove, by using the fourth PDCP entity, a PDCP header from a PDU output by the fourth RLC entity, and then perform data decryption and security protection verification on PDCP header removed data by using a second security processing module (included in the fourth PDCP entity) corresponding to the source secondary node, to obtain eighth data. Then, the terminal device performs duplicate detection on the eighth data, and delivers duplicate detected data in order.

Alternatively, the source secondary node may implement transmission of the second data between the source secondary node and a terminal device by using both a source SCG RLC bearer and a first MCG RLC bearer. For example processes, respectively refer to the foregoing process of implementing transmission of the second data by using the source SCG RLC bearer and the foregoing process of implementing transmission of the second data by using the first MCG RLC bearer. Details are not described herein again.

Further, FIG. 6(b) is a schematic diagram of another protocol stack architecture according to an embodiment of this application. The protocol stack architecture is a protocol stack architecture corresponding to an entire communication system in a process of node handover, and the protocol stack architecture is applicable to Scenario 1 above. As shown in FIG. 6(b), in the process of the node handover, after continuing to receive first data from a core network, a source secondary node performs processing such as sequence number arrangement, header compression, data encryption, security protection, and header addition on the first data by using a second PDCP entity established by the source secondary node, to obtain second data. Then, the source secondary node and a terminal device may also continue to implement transmission of the second data by using the foregoing source SCG RLC bearer and/or the foregoing first MCG RLC bearer. For an example process, refer to the foregoing descriptions. Details are not described herein again.

In addition, the source secondary node may further perform only sequence number assignment on the received first data by using the second PDCP entity, to obtain third data. Then, the source secondary node may forward the third data to a first PDCP entity of a target secondary node by using a first data forwarding address. The target secondary node may perform processing such as header compression, data encryption, security protection, and header addition on the third data by using the first PDCP entity, to obtain fourth data.

Then, when the target secondary node sends the fourth data to the terminal device by using a second MCG RLC bearer, the target secondary node may first send the fourth data to a seventh RLC entity newly established by a master node. The master node first processes the fourth data by using the seventh RLC entity, and sends processed fourth data to a first MAC layer of the master node. Then, the master node processes, by using the first MAC layer and a PHY layer of the master node, a PDU output by the seventh RLC entity, and sends, to the terminal device through a first air interface link between the master node and the terminal device, data obtained through processing performed by using the first MAC layer and the PHY layer of the master node. The terminal device performs, by using a PHY layer, a third MAC layer, and an eighth RLC entity that are of the terminal device, a series of processing on the data received by the terminal device on the first air interface link, and transmits processed data to a fourth PDCP entity. Then, the terminal device may first remove, by using the fourth PDCP entity, a PDCP header from a PDU output by the third RLC entity, and then perform data decryption and security protection verification on PDCP header removed data by using a first security processing module corresponding to the target secondary node, to obtain ninth data. Then, the terminal device performs duplicate detection on the ninth data, and delivers duplicate detected ninth data in order.

Alternatively, when the target secondary node sends the second data to the terminal device by using a first target SCG RLC bearer, the target secondary node directly transmits the fourth data to a fifth RLC entity established by the target secondary node. Then, the target secondary node processes the fourth data by using the fifth RLC entity, and transmits processed fourth data to a fifth MAC layer established by the fifth RLC entity. Then, the target secondary node processes, by using the fifth MAC layer and a PHY layer that is established by the target secondary node, a PDU output by the fifth RLC entity, and sends, to the terminal device through a third air interface link between the target secondary node and the terminal device, data obtained through processing performed by using the fifth MAC layer and the PHY layer that is established by the target secondary node. The terminal device performs, by using a PHY layer, a fourth MAC layer, and a fourth RLC entity that are of the terminal device, a series of processing on the data received by the terminal device on the third air interface link, and transmits processed data to a fourth PDCP entity. Then, the terminal device may first remove, by using the fourth PDCP entity, a PDCP header from a PDU output by the fourth RLC entity, and then perform data decryption and security protection verification on PDCP header removed data by using a first security processing module corresponding to the target secondary node, to obtain tenth data. Then, the terminal device may perform duplicate detection on the tenth data, and delivers duplicate detected data in order.

Alternatively, the target secondary node may implement transmission of the fourth data between the target secondary node and the terminal device by using both a first target SCG RLC bearer and a second MCG RLC bearer. For example processes, respectively refer to the foregoing process of implementing transmission of the fourth data by using the first target SCG RLC bearer and the foregoing process of implementing transmission of the fourth data by using the second MCG RLC bearer. Details are not described herein again.

Figure 6C:
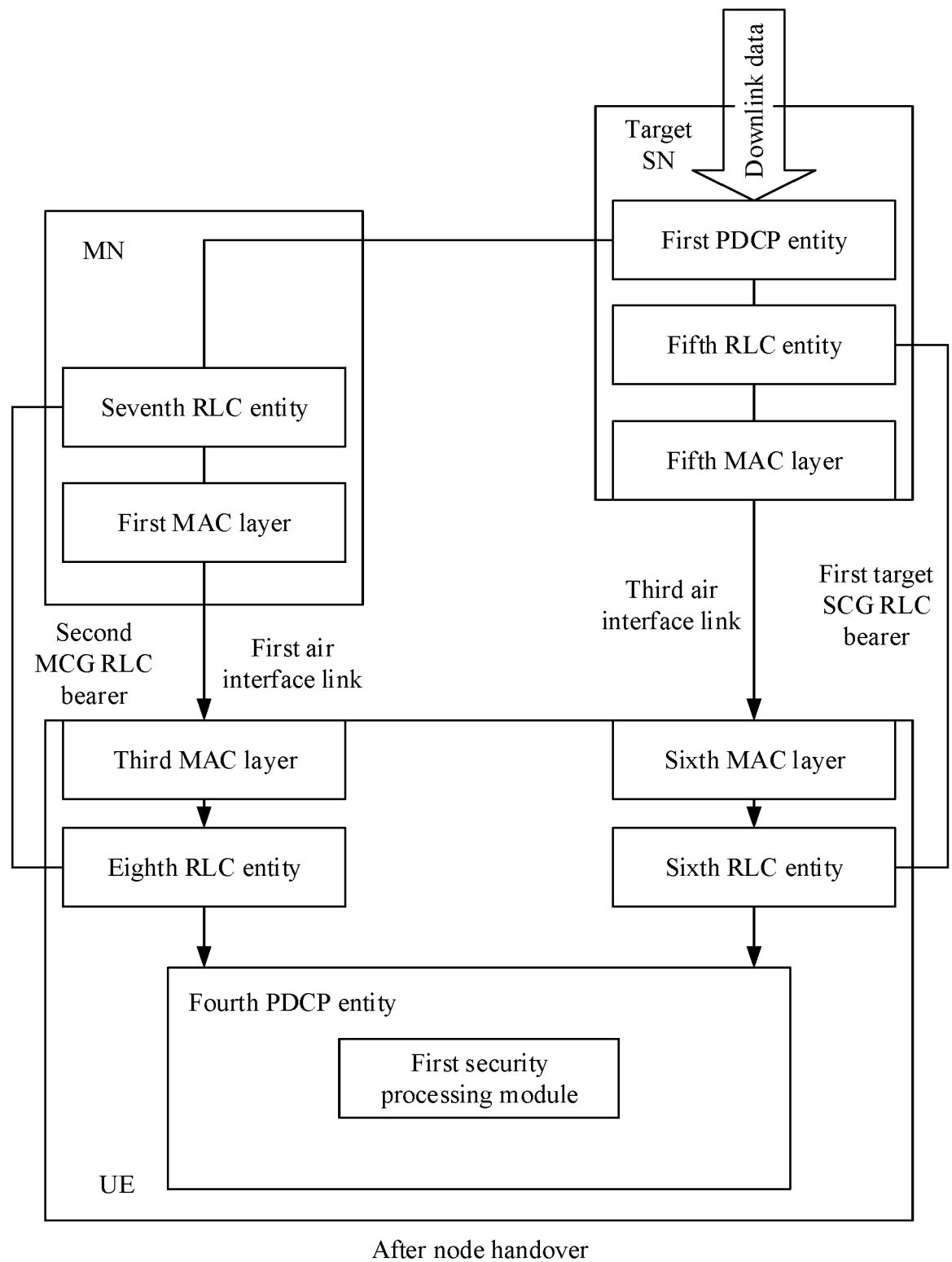
FIG. 6(c) is a schematic diagram of another protocol stack architecture according to an embodiment of this application.

Further, FIG. 6(c) is a schematic diagram of another protocol stack according to an embodiment of this application. The protocol stack architecture is a protocol stack architecture corresponding to an entire communication system after node handover, and the protocol stack architecture is applicable to Scenario 1 above. As shown in FIG. 6(c), after the node handover is completed, a core network sends new downlink data to a target secondary node. After receiving the new downlink data, the target secondary node processes the downlink data, and then sends processed downlink data to a terminal device by using the foregoing second MCG RLC bearer and/or the foregoing first target SCG RLC bearer. For an example process, refer to the foregoing process in which the target secondary node sends the fourth data to the terminal device by using the second MCG RLC bearer and/or the first target SCG RLC bearer. Details are not described herein again. Then, the terminal device may receive the processed downlink data, and further process the processed downlink data. For an example process, refer to the foregoing process in which the terminal device processes the fourth data. Details are not described herein again.

Figure 6D:
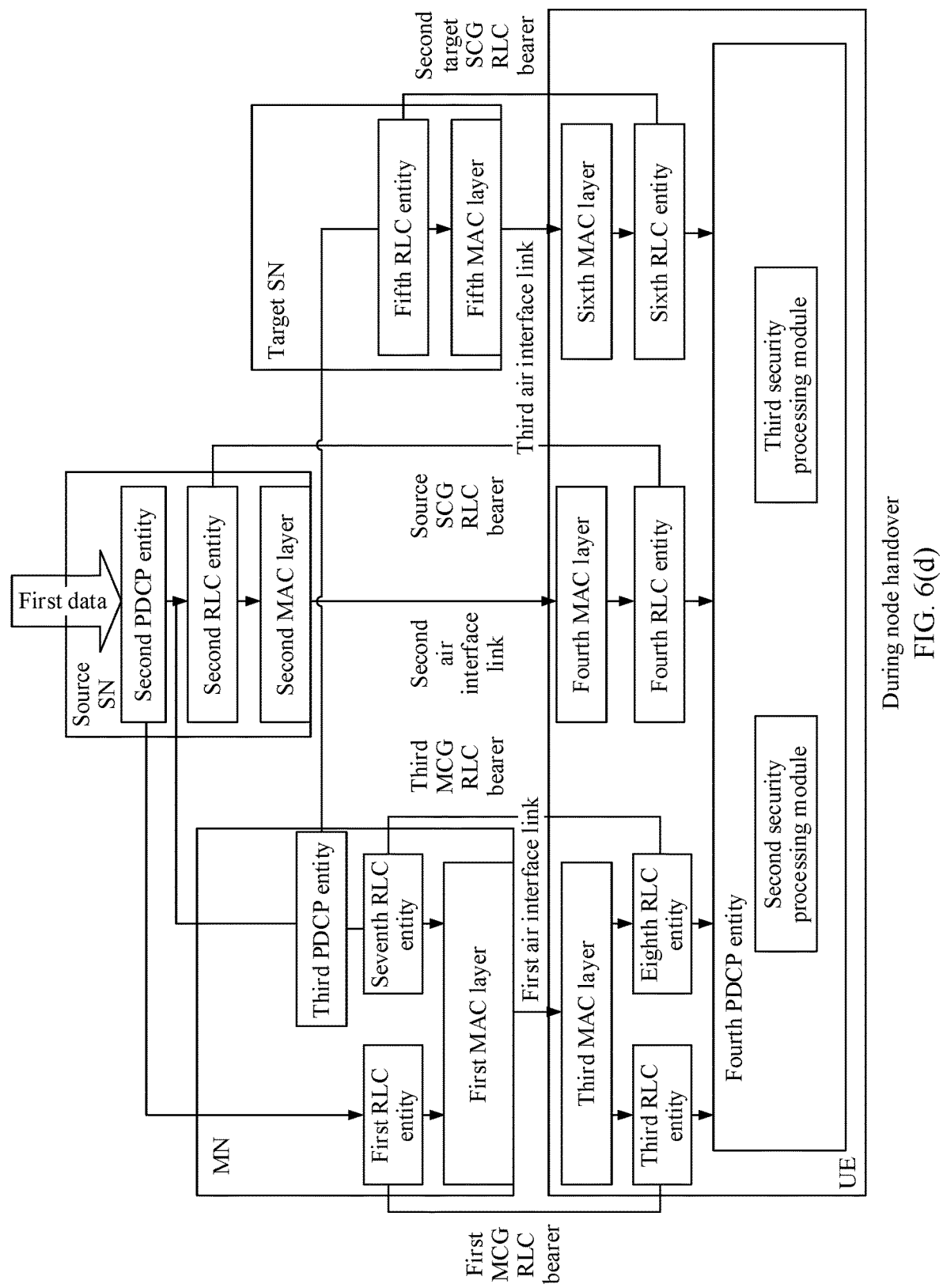
FIG. 6(d) is a schematic diagram of another protocol stack architecture according to an embodiment of this application.

Alternatively, FIG. 6(d) is a schematic diagram of another protocol stack architecture according to an embodiment of this application. The protocol stack architecture is a protocol stack architecture corresponding to an entire communication system in a process of node handover, and the protocol stack architecture is applicable to Scenario 2 above. As shown in FIG. 6(d), in the process of the node handover, after continuing to receive first data from a core network, a source secondary node performs processing such as sequence number arrangement, header compression, data encryption, security protection, and header addition on the first data by using a second PDCP entity established by the source secondary node, to obtain second data. Then, the source secondary node and a terminal device may also continue to implement transmission of the second data by using the foregoing source SCG RLC bearer and/or the foregoing first MCG RLC bearer. For an example process, refer to the foregoing descriptions. Details are not described herein again.

In addition, the source secondary node may further perform only sequence number assignment on the received first data by using the second PDCP entity, to obtain third data. Then, the source secondary node may forward the third data to a third PDCP entity of a master node by using a fifth data forwarding address. The master node may perform processing such as header compression, data encryption, security protection, and header addition on the third data by using the third PDCP entity, to obtain fifth data.

Then, when the master node sends the fifth data to the terminal device by using a second target SCG RLC bearer (where the fifth data in this case is equivalent to the foregoing fourth data, and the fifth data is replaced with the fourth data for description below), the master secondary node may first send the fourth data to a fifth RLC entity of a target secondary node. The target secondary node first processes the fourth data by using the fifth RLC entity, and sends processed fourth data to a fifth MAC layer of the target secondary node. Then, the target secondary node processes, by using the fifth MAC layer and a PHY layer, a PDU output by the fifth RLC entity, and sends, to the terminal device through a third air interface link between the target secondary node and the terminal device, data obtained through processing performed by using the fifth MAC layer and the PHY layer. The terminal device performs, by using a PHY layer, a sixth MAC layer, and a sixth RLC entity that are of the terminal device, a series of processing on the data received by the terminal device on the third air interface link, and transmits processed data to a fourth PDCP entity. Then, the terminal device may first remove, by using the fourth PDCP entity, a PDCP header from a PDU output by the sixth RLC entity, and then perform data decryption and security protection verification on PDCP header removed data by using a third security processing module corresponding to the master node, to obtain eleventh data. Then, the terminal device performs duplicate detection on the eleventh data, and delivers duplicate detected eleventh data in order.

Alternatively, when the master node sends the fifth data to the terminal device by using a third MCG RLC bearer, the master node may first process the fifth data by using a seventh RLC entity, and send processed fifth data to a first MAC layer. Then, the master node processes, by using the first MAC layer and a PHY layer of the master node, a PDU output by the seventh RLC entity, and sends, to the terminal device through a first air interface link between the master node and the terminal device, data obtained through processing performed by using the first MAC layer and the PHY layer of the master node. The terminal device performs, by using a PHY layer, a third MAC layer, and an eighth RLC entity that are of the terminal device, a series of processing on the data received by the terminal device on the first air interface link, and transmits processed data to a fourth PDCP entity. Then, the terminal device may first remove, by using the fourth PDCP entity, a PDCP header from a PDU output by the eighth RLC entity, and then perform data decryption and security protection verification on PDCP header removed data by using a second security processing module (included in the fourth PDCP entity) corresponding to a target secondary node, to obtain twelfth data. Then, the terminal device performs duplicate detection on the twelfth data, and delivers duplicate detected twelfth data in order.

Alternatively, the master node may split the fifth data into fourth data and sixth data, and then respectively implement transmission of the fourth data and the sixth data between a target secondary node and the terminal device by using a second target SCG RLC bearer and a third MCG RLC bearer (where the fifth data herein is split into the fourth data and the sixth data). For example processes, respectively refer to the foregoing process of implementing transmission of the fifth data by using the second target SCG RLC bearer and the foregoing process of implementing transmission of the fifth data by using the second MCG RLC bearer. Details are not described herein again.

Figure 6E:
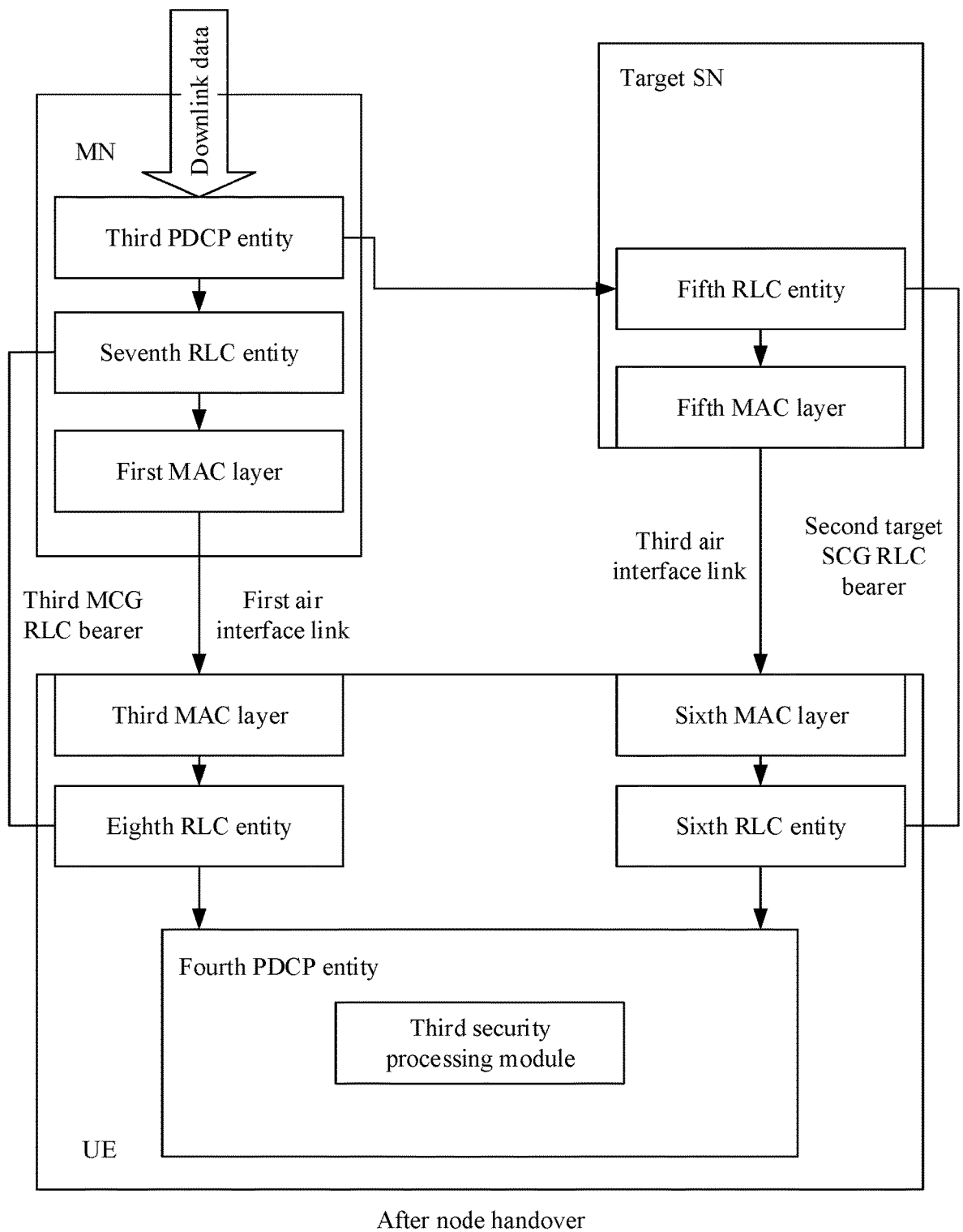
FIG. 6(e) is a schematic diagram of another protocol stack architecture according to an embodiment of this application.

Further, FIG. 6(e) is a schematic diagram of another protocol stack according to an embodiment of this application. The protocol stack architecture is a protocol stack architecture corresponding to an entire communication system after node handover, and the protocol stack architecture is applicable to Scenario 2 above. As shown in FIG. 6(e), after the node handover is completed, a core network sends new downlink data to a master node. After receiving the new downlink data, the master node processes the downlink data, and then sends processed downlink data to a terminal device by using the foregoing third MCG RLC bearer and/or the foregoing second target SCG RLC bearer. For an example process, refer to the foregoing process in which the master node sends the fifth data to the terminal device by using the third MCG RLC bearer and/or the second target SCG RLC bearer. Details are not described herein again. Then, the terminal device may receive the processed downlink data, and further process the processed downlink data. For an example process, refer to the foregoing process in which the terminal device receives and processes the fifth data. Details are not described herein again.

In addition, it should be further noted that, when the source secondary node and the target secondary node are a same node, the foregoing procedure of the node handover is also applicable to scenarios such as handover of a primary secondary cell (PScell) of the terminal device and handover of an anchor location. An operation of data forwarding between the target secondary node and the source secondary node does not need to be considered.

According to the node handover method provided in this embodiment, it is ensured that, in the process of the node handover, the first data that is to be sent to the terminal device by using the first radio bearer originally can be transmitted to the terminal device via both the source secondary node and the target secondary node, and be correctly received by the terminal device, so that interruption that is due to the node handover and that is of transmission of the first data between the core network and the terminal device does not occur, a problem such as a service delay caused by the data transmission interruption caused by the node handover is resolved, applicability and practicability of the node handover method are improved, and user experience of the terminal device is also improved.

Embodiment 2

Figure 7A:
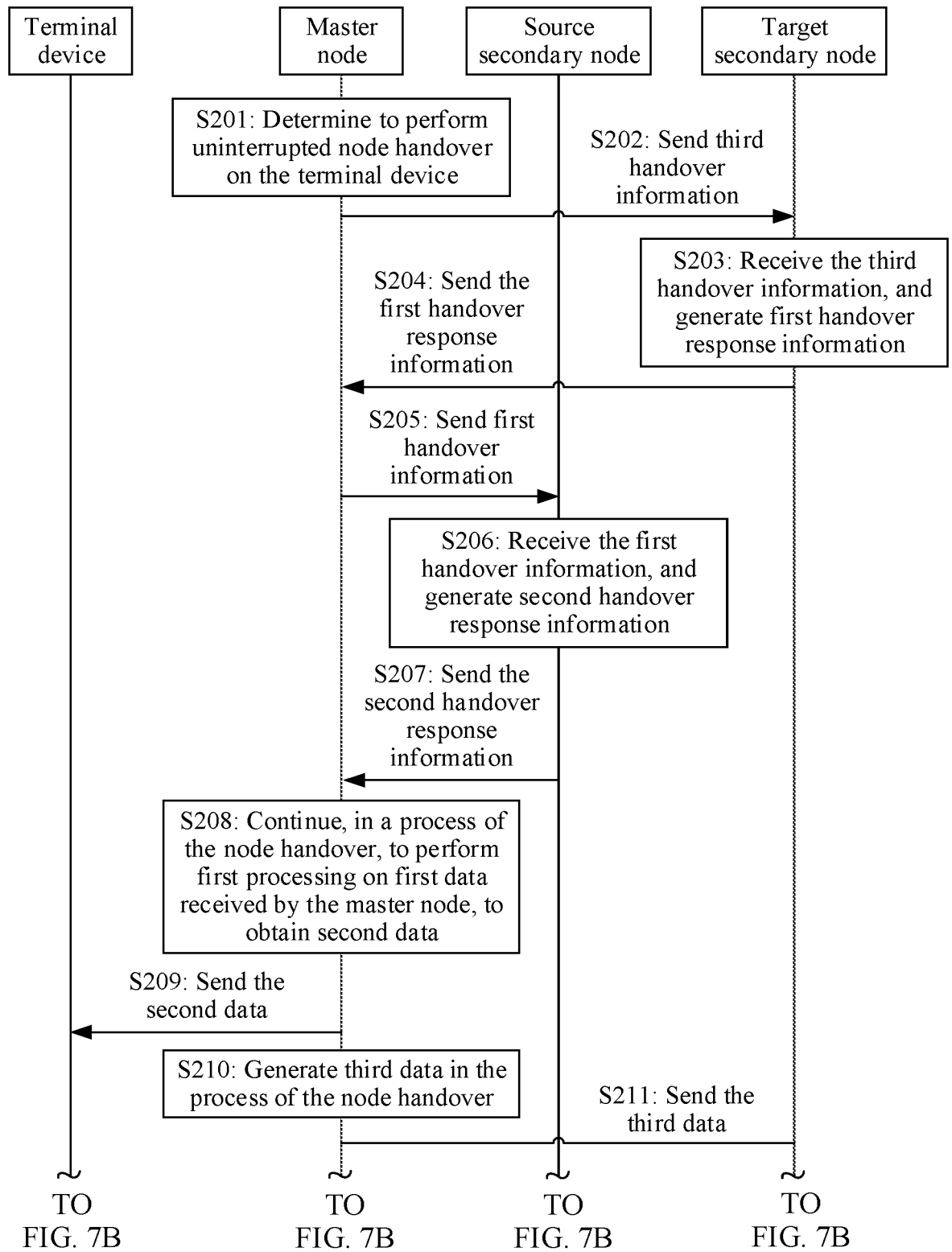
FIG. 7A and FIG. 7B are another schematic flowchart of a node handover method according to an embodiment of this application.
Figure 7B:
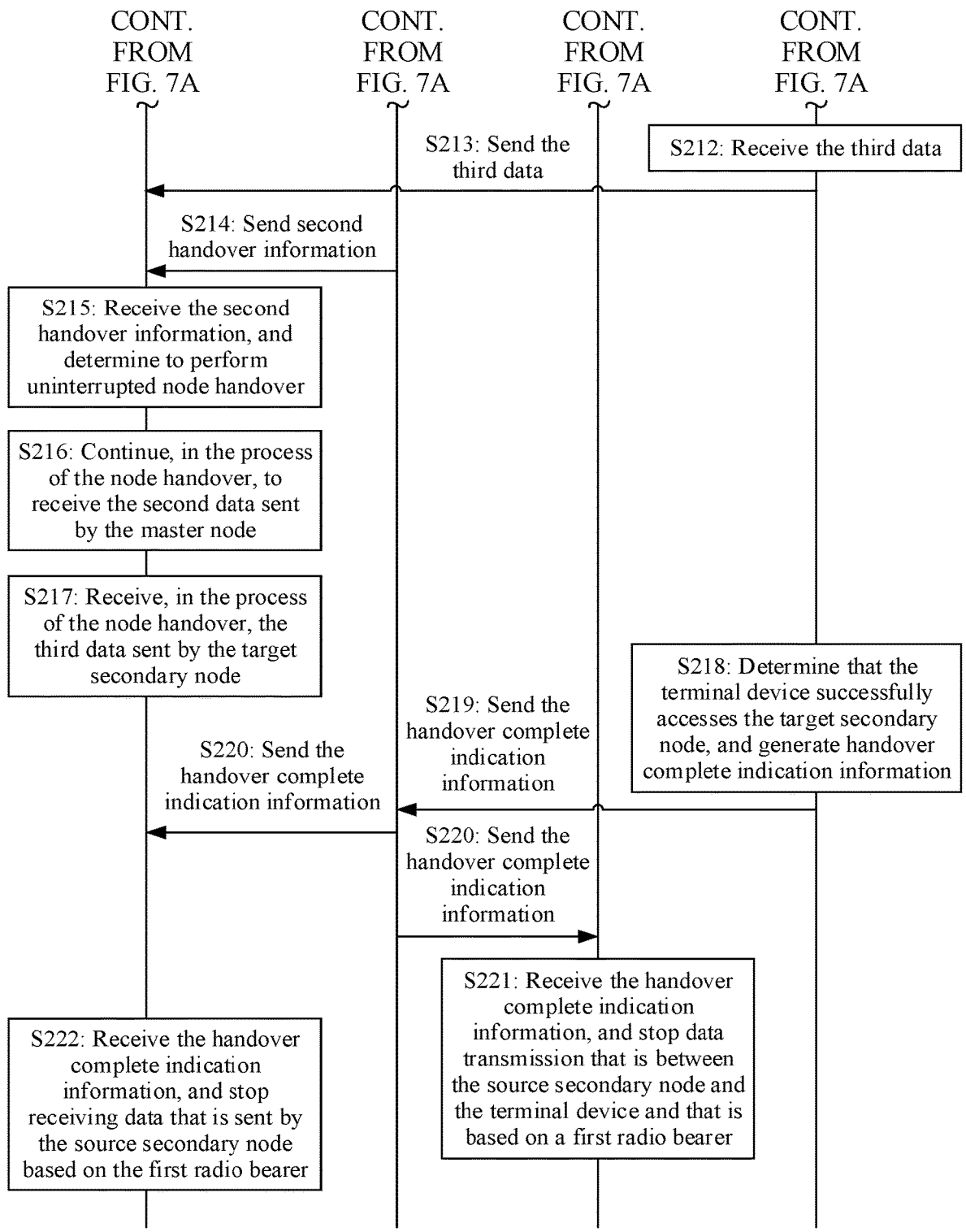

FIG. 7A and FIG. 7B are another schematic flowchart of a node handover method according to an embodiment of this application. The node handover method is applicable to the communication system shown in FIG. 4(a). The node handover method is applicable to the various architectures for implementing dual connectivity shown in FIG. 2(a) to FIG. 2(d). In this embodiment, the EN-DC architecture in FIG. 2(b) is also used as an example for description. A difference between a scenario in this embodiment and the scenario in Embodiment 1 lies in: A user plane connection between an access network device and a core network is terminated at a master node before handover, and the user plane connection between the access network device and the core network is terminated at a target secondary node or the master node after the handover. As shown in FIG. 7A and FIG. 7B, the method includes the following operations.

S201: The master node determines to perform uninterrupted node handover on a terminal device.

In some embodiments, for a process in which the master node determines to perform uninterrupted node handover on the terminal device, refer to the process in which the master node determines to perform uninterrupted node handover on the terminal device in operation S101 in Embodiment 1. Details are not described herein again.

S202: The master node sends third handover information to the target secondary node.

In some embodiments, after determining to perform uninterrupted node handover for a first radio bearer, the master node may send the third handover information to the target secondary node. Herein, the third handover information indicates the target secondary node to perform uninterrupted node handover.

In some embodiments, the third handover information may include non-interruption indication information, first bearer identification information of the first radio bearer, and first node identification information of a source secondary node. Herein, for descriptions of the non-interruption indication information, the first bearer identification information, and the first node identification information, refer to the descriptions of the non-interruption indication information, the first bearer identification information, and the first node identification information in operation S102 in Embodiment 1. Details are not described herein again.

In some embodiments, the third handover information may further include bearer type related information and/or data forwarding indication information. The bearer type related information indicates a bearer type of the first radio bearer. During actual application, the bearer type of the first radio bearer may include an MN terminated bearer. Alternatively, more specifically, bearer types of the first radio bearer may include an MN terminated SCG bearer and an MN terminated split bearer. Further, the third handover information may further include anchor change indication information. The anchor change indication information indicates whether the user plane connection to the core network is to change, after the node handover, from being terminated at the MN to being terminated at an SN. For an example of the anchor change indication information, refer to the example of the anchor change indication information in operation S102 in Embodiment 1. Details are not described herein again. The data forwarding indication information indicates that the master node is to forward data to the target secondary node in a process of the node handover, to request the target secondary node to provide a corresponding data forwarding address.

S203: The target secondary node receives the third handover information, and generates first handover response information.

In some embodiments, after receiving the third handover information, the target secondary node may parse the third handover information. If the target secondary node determines that the third handover information includes the non-interruption indication information, the bearer identification information of the first radio bearer, and the first node identification information of the source secondary node, the target secondary node may determine to perform uninterrupted node handover on the terminal device, and the uninterrupted node handover is for the first radio bearer.

The following describes, with reference to two different scenarios in which an anchor location remains unchanged and changes in the process of the handover, the first handover response information generated by the target secondary node. Hereinafter, change of the anchor location due to the handover does not occur in Scenario 1, and the change of the anchor location due to the handover occurs in Scenario 2.

Scenario 1:

If the target secondary node determines that the anchor change indication information in the third handover information indicates that the anchor location remains unchanged in the process of the node handover, the target secondary node may generate the first handover response information after determining to perform uninterrupted node handover on the terminal device. The first handover response information provides configuration information that is related to the target secondary node and that is required for the handover, and indicates that the target secondary node responds to a node handover request of the master node. Specifically, the first handover response information may include first node configuration information of the target secondary node. The first node configuration information may include information such as configuration information of SDAP corresponding to the target secondary node, configuration information of an SCG RLC bearer corresponding to the target secondary node (where the configuration information is replaced with first bearer configuration information for description below), a first random access resource of the target secondary node, and secondary cell group configuration information of the target secondary node. The first node configuration information is mainly used for a subsequent operation such as establishing, by the terminal device, a radio bearer associated with the target secondary node.

Further, when the target secondary node extracts the data forwarding indication information from the third handover information, the first handover response information generated by the target secondary node may further include first data forwarding related information of the target secondary node. Herein, the first data forwarding related information is used by the master node to forward the data to the target secondary node. In some embodiments, the first data forwarding related information may include a first data forwarding address provided by the target secondary node. It should be noted that, in the process of the node handover, each radio bearer (namely, the foregoing target radio bearer) for which uninterrupted node handover is to be performed corresponds to one first data forwarding address separately. The first data forwarding address is used by the master node to send the data to the target secondary node in the process of the node handover subsequently.

Scenario 2:

When the target secondary node determines that the anchor change indication information in the third handover information indicates that the anchor location changes in the process of the handover (where to be specific, being terminated at the MN changes to being terminated at the target SN), the target secondary node may alternatively generate the first handover response information after determining to perform uninterrupted node handover on the terminal device. Specifically, the first handover response information may include second node configuration information of the target secondary node. A difference between the second node configuration information and the first node configuration information in Scenario 1 lies in that the second node configuration information includes configuration information of a first PDCP entity corresponding to the target secondary node, the configuration information of the SCG RLC bearer corresponding to the target secondary node and associated with the first PDCP entity (where the configuration information is replaced with second bearer configuration information for description below), and second security information corresponding to the first PDCP entity, where the second security information indicates a second key. For other content, refer to the descriptions in Scenario 1 above. Details are not described herein again.

Further, after the target secondary node extracts the data forwarding indication information, second handover response information generated by the target secondary node may further include a first data forwarding address. For details, refer to the descriptions of the first data forwarding address in Scenario 1. Details are not described herein again.

In some embodiments, the second handover response information may further include a second data forwarding address. Herein, one second data forwarding address corresponds to one PDU session. After the node handover is completed, the second data forwarding address is used by the core network to send a downlink data packet to the target secondary node. Certainly, it may be understood that the second data forwarding address may alternatively be sent by the target secondary node to the master node after the node handover is completed. This is not specifically limited in this application.

Herein, it should be further additionally noted that, if whether the anchor location changes is determined by the target secondary node (where in other words, the third handover information includes no anchor change indication information), the first handover response information may include the anchor change indication information indicating whether the anchor location changes. In this way, after receiving the first handover response information and determining that the change of the anchor location due to the node handover occurs, the master node may send a third data forwarding address to the target secondary node, where the third data forwarding address is used by the target secondary node to send, to the master node in the process of the node handover, data processed by the target secondary node. Alternatively, before sending the third handover information to the target secondary node, the master node has determined that the anchor location is to change in the process of the node handover, and the third handover information may further include a third data forwarding address.

S204: The target secondary node sends the first handover response information to the master node.

S205: The master node sends first handover information to the source secondary node.

In some embodiments, after receiving the first handover response information, the master node may generate the first handover information, and send the first handover information to the source secondary node. The first handover information indicates the source secondary node to perform uninterrupted node handover.

In some embodiments, for content of the first handover information, refer to the descriptions in operation S105 in Embodiment 1. A main difference lies in that the first handover information does not include the second data forwarding related information in Embodiment 1.

S206: The source secondary node receives the first handover information, and generates second handover response information.

In some embodiments, for a process in which the source secondary node receives the first handover information and generates the second handover response information, refer to the process in which the source secondary node receives the first handover information and generates the second handover response information in operation S106 in Embodiment 1. Details are not described herein again.

S207: The source secondary node sends the second handover response information to the master node.

S208: The master node continues, in the process of the node handover, to perform first processing on first data received by the master node, to obtain second data.

In some embodiments, after receiving the second handover response information, the master node may continue to receive downlink data sent by the core network (where for ease of understanding and differentiation, the downlink data is replaced with the first data for description below). Then, the source secondary node may perform first processing on the first data to obtain the second data.

In some embodiments, for a process in which the master node performs first processing on the first data to obtain the second data, refer to the process in which the source secondary node performs first processing on the first data to obtain the second data in operation S108 in Embodiment 1. A difference lies in that the master node completes a processing operation by using a second PDCP entity of the master node, including the second PDCP entity performs operation by using the first key)

S209: The master node sends the second data to the terminal device.

In some embodiments, after obtaining the second data through processing, the master node may send the second data to the terminal device by using an MCG RLC bearer associated with the master node (where the MCG RLC bearer is replaced with a first MCG RLC bearer for description below). Alternatively, the master node may send the second data to the terminal device by using an SCG RLC bearer that is on the source secondary node and that is associated with the master node (where for ease of differentiation, the SCG RLC bearer is replaced with a source SCG RLC bearer for description below). Alternatively, the source secondary node may send the second data to the terminal device by using both a source SCG RLC bearer and a first MCG RLC bearer.

In some embodiments, if the master node originally sends data to the terminal device by using the source SCG RLC bearer and the first MCG RLC bearer before the node handover (where that is, the type of the first radio bearer is the MN terminated split bearer), in the process of the node handover, the master node may stop sending the second data to the terminal device by using the first MCG RLC bearer, and send the second data to the terminal device by using only the source SCG RLC bearer. Alternatively, the master node may include a first capability saving identifier in the first handover information, to notify the source secondary node that forwarding the second data to the terminal device by using the source SCG RLC bearer may be stopped after the first capability saving identifier is extracted from the first handover information, so that the master node sends the second data to the terminal device by using only the first MCG RLC bearer. It should be noted that, if the master node determines to send the second data to the terminal device by using only the source SCG RLC bearer in the process of the node handover, only the third PDCP may be retained to continue to work, and all MCG RLC bearers associated with the first radio bearer are released or deleted. In the process of the node handover, the master node sends the second data to the terminal device by using only the source SCG RLC bearer or the first MCG RLC bearer, so that the terminal device may maintain only the source SCG RLC bearer or the first MCG RLC bearer in the process of the node handover, and does not need to maintain both the source SCG RLC bearer and the first MCG RLC bearer. In this way, a requirement on a device capability of the terminal device is reduced, and applicability of the node handover method can be improved.

S210: The master node generates third data in the process of the node handover.

In some embodiments, in Scenario 1 (where to be specific, the anchor location does not change), the master node may determine, as the third data, a part or all of the second data obtained through processing performed by the master node. In other words, the second data and the third data may be the same, or may be different.

S211: The master node sends the third data to the target secondary node.

In some embodiments, after obtaining the third data, the master node may send the third data to the target secondary node by using the first data forwarding address.

S212: The target secondary node receives the third data.

In some embodiments, the target secondary node may receive, by using the first data forwarding address, the third data sent by the master node.

S213: The target secondary node sends the third data to the terminal device.

In some embodiments, after receiving the third data, the target secondary node may send the third data to the terminal device by using the SCG RLC bearer corresponding to the target secondary node (the SCG RLC bearer associated with the master node) (where for ease of understanding and differentiation, the SCG RLC bearer is replaced with a first target SCG RLC bearer for description below). Herein, before sending the third data to the terminal device, the first target SCG RLC bearer has been established on the target secondary node; or the target secondary node selects an idle SCG RLC bearer from SCG RLC bearers that the target secondary node has established, and determines the idle SCG RLC bearer as the first target SCG RLC bearer.

It should be added that, in Scenario 2 above (where to be specific, the anchor location changes), operation S210 to operation S213 may be replaced with operation S2001 to operation S2003.

S2001: The master node performs second processing on the first data to obtain third data.

In some embodiments, after receiving the first data, the master node may perform second processing on the first data by using a third PDCP entity corresponding to the master node, to obtain the third data. In some embodiments, for a process in which the master node performs second processing on the first data by using the third PDCP entity corresponding to the master node, to obtain the third data, refer to the process in which the source secondary node performs second processing on the first data by using the second PDCP entity corresponding to the source secondary node, to obtain the third data in operation S110 in Embodiment 1. Details are not described herein again.

S2002: The master node forwards the third data to the target secondary node.

In some embodiments, after obtaining the third data through processing, the master node may forward the third data to the target secondary node by using the first data forwarding address.

S2003: The target secondary node performs third processing on the third data to obtain fourth data.

In some embodiments, after receiving the third data forwarded by the master node, the target secondary node may perform third processing on the third data to obtain the fourth data. For an example process, refer to the process in which the target secondary node performs third processing on the third data to obtain the fourth data in operation S112 in Embodiment 1. Details are not described herein again.

S2004: The target secondary node sends the fourth data to the terminal device.

In some embodiments, after obtaining the fourth data through processing, the target secondary node may send the fourth data to the terminal device by using an SCG RLC bearer that is associated with the target secondary node and that corresponds to the first PDCP entity (where for ease of understanding and differentiation, the SCG RLC bearer is replaced with a second target SCG RLC bearer for description below). Alternatively, the target secondary node may send the fourth data to the terminal device by using an MCG RLC bearer that is on the master node and that is associated with the target secondary node (where for ease of differentiation, the MCG RLC bearer is replaced with a second MCG RLC bearer for description below). Alternatively, the target secondary node may send the fourth data to the terminal device by using both a first target SCG RLC bearer and a second MCG RLC bearer.

It should be noted herein that, if the type of the first radio bearer is the MN terminated split bearer, the target secondary node may not completely inherit the type of the first radio bearer when saving the capability of the terminal device is considered. For example, the third handover information may further include a second capability saving identifier. In this way, in the process of the node handover, the target secondary node may determine, based on the second capability saving identifier, that the target secondary node may send the fourth data to the terminal device by using only the first target SCG RLC bearer or the second MCG RLC bearer. In the process of the node handover, the target secondary node sends the fourth data to the terminal device by using only the first target SCG RLC bearer or the second MCG RLC bearer, so that the terminal device may maintain only the first target SCG RLC bearer or the second MCG RLC bearer in the process of the node handover, and does not need to maintain both the first target SCG RLC bearer and the second MCG RLC bearer. In this way, the requirement on the device capability of the terminal device can be further reduced.

S214: The master node sends second handover information to the terminal device.

In some embodiments, after determining to perform uninterrupted node handover on the terminal device, the master node may further send the second handover information to the terminal device. The following describes content of the second handover information in detail with reference to Scenario 1 and Scenario 2 above.

Scenario 1:

In some embodiments, the second handover information includes one or more of the first node configuration information of the target secondary node, the non-interruption indication information, and the bearer identification information of the first radio bearer. The first node configuration information is used by the terminal device to perform corresponding configuration, so that the terminal device can receive the third data from the target secondary node by using the first target SCG RLC bearer in the process of the node handover.

Scenario 2:

In some embodiments, the second handover information may include one or more of the second node configuration information of the target secondary node, third node configuration information of the master node, the non-interruption indication information, and the bearer identification information of the first radio bearer. The non-interruption indication information and the bearer identification information of the first radio bearer notify the terminal device to perform uninterrupted node handover for the first radio bearer. The second node configuration information is used by the terminal device to perform corresponding configuration, so that the terminal device can receive the fourth data from the target secondary node by using the second target SCG RLC bearer in the process of the node handover. The third node configuration information is used by the terminal device to perform corresponding configuration, so that the terminal device can receive the fourth data or sixth data from the master node by using the second MCG RLC bearer in the process of the node handover.

In some embodiments, the second handover information may further include the bearer type indication information, and the bearer type indication information indicates a bearer type of a radio bearer used when the target secondary node sends the fourth data to the terminal device. For example, when the bearer type indicated by the bearer type indication information is an SN terminated SCG bearer, it indicates that the target secondary node sends the fourth data to the terminal device by using only the second target SCG RLC bearer. When the bearer type indicated by the bearer type indication information is an SN terminated MCG bearer, it indicates that the target secondary node sends the fourth data to the terminal device by using only the second MCG RLC bearer. When the bearer type indicated by the bearer type indication information is an SN terminated split bearer, it indicates that the target secondary node sends the fourth data to the terminal device by using the second target SCG RLC bearer and the second MCG RLC bearer (where the fourth data is split into fifth data on the second target SCG RLC bearer and sixth data on the second MCG RLC bearer in this case). It should be noted that the bearer type indication information may preferentially indicate that the target secondary node sends the fourth data to the terminal device by using the SN terminated SCG bearer or the SN terminated MCG bearer. In this way, the terminal device may receive the fourth data by using only the second target SCG RLC bearer or the second MCG RLC bearer. In this way, in a process of receiving the fourth data, the terminal device may maintain only the second target SCG RLC bearer or the second MCG RLC bearer, so that the requirement on the device capability of the terminal device can be reduced, and applicability of the node handover method can be improved.

Further, in Scenario 1 or Scenario 2 above, on a premise that the master node sends the second data to the terminal device by using the source SCG RLC bearer and the first MCG RLC bearer (where that is, the master node sends the second data to the terminal device by using the SN terminated split bearer), the second handover information may further include a third capability saving identifier. The third capability saving identifier notifies the terminal device that the terminal device may receive the second data from the source secondary node by using only the source SCG RLC bearer or the first MCG RLC bearer.

S215: The terminal device receives the second handover information, and determines to perform uninterrupted node handover.

In some embodiments, the terminal device may receive the second handover information sent by the master node, and then determine, based on the second handover information, to perform uninterrupted node handover for the first radio bearer.

With reference to Scenario 1 and Scenario 2 above, the following describes in detail some operations performed after the terminal device determines to perform uninterrupted node handover for the first radio bearer.

Scenario 1:

After the terminal device receives the second handover information, if the terminal device determines that the second handover information includes the non-interruption indication information and the bearer identification information of the first radio bearer, the terminal device may determine that the second handover information requests the terminal device to perform uninterrupted node handover for the first radio bearer. Then, if the terminal device extracts the first node configuration information from the second handover information, the terminal device may perform corresponding configuration based on the first node configuration information. Specifically, the terminal device may perform SDAP configuration based on the configuration information that is of SDAP corresponding to the target node and that is included in the first node configuration information. The terminal device may alternatively establish the first target SCG RLC bearer based on the first bearer configuration information included in the first node configuration information. Because a PDCP entity on a terminal device side is public for any cell, for the terminal device, a PDCP entity corresponding to the master node and a PDCP entity corresponding to a secondary node are a same PDCP entity (where the same PDCP entity is replaced with the third PDCP entity herein for description). This is similar to Embodiment 1. In this case, the third PDCP entity includes a second security processing module, and the second security processing module is configured to perform data decryption and/or security protection verification based on the first key indicated by first security information corresponding to the second PDCP entity.

Scenario 2:

In some embodiments, the terminal device may first parse the second handover information. If the terminal device determines that the second handover information includes the non-interruption indication information and the bearer identification information of the first radio bearer, the terminal device may determine that the second handover information requests to perform uninterrupted node handover for the first radio bearer. Then, if the terminal device extracts the second node configuration information from the second handover information, the terminal device may perform corresponding configuration based on the second node configuration information. Specifically, the terminal device may establish, based on the configuration information that is of the first PDCP entity and that is included in the second node configuration information, a PDCP entity (namely, the foregoing third PDCP entity) corresponding to the target secondary node, and the third PDCP entity corresponds to a first security processing module. The first security processing module is configured to perform data decryption and/or security protection verification based on the second key indicated by the second security information corresponding to the first PDCP entity. The terminal may alternatively perform SDAP configuration based on the configuration information that is of SDAP corresponding to the target node and that is included in the first node configuration information. The terminal device may alternatively establish the second target SCG RLC bearer based on the second bearer configuration information included in the first node configuration information. If the terminal device further extracts the third node configuration information from the second handover information, the terminal device may perform corresponding SDAP configuration based on configuration information that is of SDAP corresponding to the master node and that is included in the third node configuration information. The terminal device may alternatively establish the second MCG RLC bearer based on third bearer configuration information included in the third node configuration information.

In some embodiments, if the terminal device extracts the bearer type indication information from the second handover information, the terminal device may determine, based on the bearer type indication information, whether the terminal device is to receive, by using only the second target SCG bearer or the second MCG RLC bearer, the fourth data sent by the target secondary node or is to receive, by using both the first target SCG bearer and the second MCG RLC bearer, the fourth data sent by the target secondary node.

In some embodiments, regardless of Scenario 1 or Scenario 2 above, if the terminal device extracts the third capability saving identifier from the second handover information, when the master node sends the second data to the terminal device by using the source SCG RLC bearer and the first MCG RLC bearer, the terminal device may determine, based on the third capability saving identifier, to receive the second data by using only the source SCG RLC bearer or the first MCG RLC bearer.

Further, regardless of Scenario 1 or Scenario 2 above, the terminal device may generate the configuration response information for the second handover information after completing corresponding configuration based on the second handover information. The configuration response information indicates that the terminal device has completed configuration of resources, for example, a protocol entity and a radio bearer, related to the target secondary node and/or the master node. In some embodiments, after receiving the configuration response information, the master node may forward the configuration response information to the target secondary node, to notify the target secondary node that the terminal device has completed corresponding configuration.

S216: The terminal device continues, in the process of the node handover, to receive the second data sent by the master node.

In some embodiments, in the process of the node handover, the terminal device may continue to receive, by using the source SCG RLC bearer and/or the first MCG RLC bearer, the second data sent by the master node.

Further, after receiving the second data, the terminal device may process the second data by using the third PDCP entity, and deliver processed second data. An example process is similar to the process of processing the received second data by using the fourth PDCP entity and delivering the processed second data in operation S116 in Embodiment 1. Details are not described herein again.

S217: The terminal device receives, in the process of the node handover, the third data sent by the target secondary node.

In some embodiments, after determining to perform uninterrupted node handover, the terminal device may initiate a random access request to the target secondary node based on a random access resource included in the second handover information. After determining, based on a status such as current network load, to allow access of the terminal device, the target secondary node may send a random access response to the terminal device, and further complete an access operation of the terminal device.

In Scenario 1 above, after successfully accessing the target secondary node, the terminal device may receive, by using the first target SCG RLC bearer, the third data sent by the target secondary node. Then, the terminal device may process the third data by using the third PDCP entity, and deliver processed third data to a higher layer. An example process is similar to the process of processing the received second data by using the fourth PDCP entity and delivering the processed second data in operation S116 in Embodiment 1. Details are not described herein again.

In Scenario 2 above, after receiving the access response and determining that the terminal device successfully accesses the target secondary node, the terminal device may receive, by using the second target SCG RLC bearer and/or the second MCG RLC bearer, the fourth data sent by the target secondary node. Herein, in a transmission process, the fourth data is split into seventh data (transmitted through the second target SCG RLC bearer) and eighth data (transmitted through the second MCG RLC bearer). After receiving the fourth data, the terminal device may perform corresponding processing on the fourth data by using the third PDCP entity. For an example process, refer to the foregoing process in which the terminal device processes the second data by using the third PDCP entity. Details are not described herein again. Finally, the terminal device may deliver processed fourth data to a higher layer in order.

S218: The target secondary node determines that the terminal device successfully accesses the target secondary node, and generates handover complete indication information.

S219: The target secondary node sends the handover complete indication information to the master node.

S220: The master node receives the handover complete indication information, and forwards the handover complete indication information to the source secondary node and the terminal device.

S221: The source secondary node receives the handover complete indication information, and stops data transmission that is between the source secondary node and the terminal device and that is based on the first radio bearer.

In some embodiments, for execution processes of operation S218, operation S219, operation S220, and operation S221, refer to the execution processes of operation S118, operation S119, operation S120, and operation S121 in Embodiment 1. Details are not described herein again.

S222: The terminal device receives the handover complete indication information, and stops receiving data that is sent by the source secondary node based on the first radio bearer.

In some embodiments, after receiving the handover complete indication information, the terminal device may determine that the uninterrupted node handover for the first radio bearer has been completed, and may stop receiving the data from the source secondary node. Further, the terminal device may further release or delete a connection to the source secondary node. Specifically, the terminal device may release or delete resources such as an air interface link between the terminal device and the source secondary node, the source SCG RLC bearer, and the first MCG RLC bearer.

In some embodiments, after receiving the handover complete indication information, the terminal device may further feed back the second receiving response information to the master node, to notify the master node that the terminal device has correctly received the handover complete indication information.

Further, in Scenario 2 above, after the node handover is completed, the master node may send path switching information to the core network. The path switching information notifies the core network that a receiver of the downlink data of the core network has been handed over from the master node to the target secondary node. Herein, the path switching information may further include the second data forwarding address. After receiving the path switching information, the core network may send the transmission termination information to the source secondary node, and stop sending new downlink data to the source secondary node. The transmission termination information notifies the source secondary node to stop receiving the new downlink data from the core network. Then, the core network may start, by using the second data forwarding address, to send the new downlink data to the target secondary node.

Figure 8A:
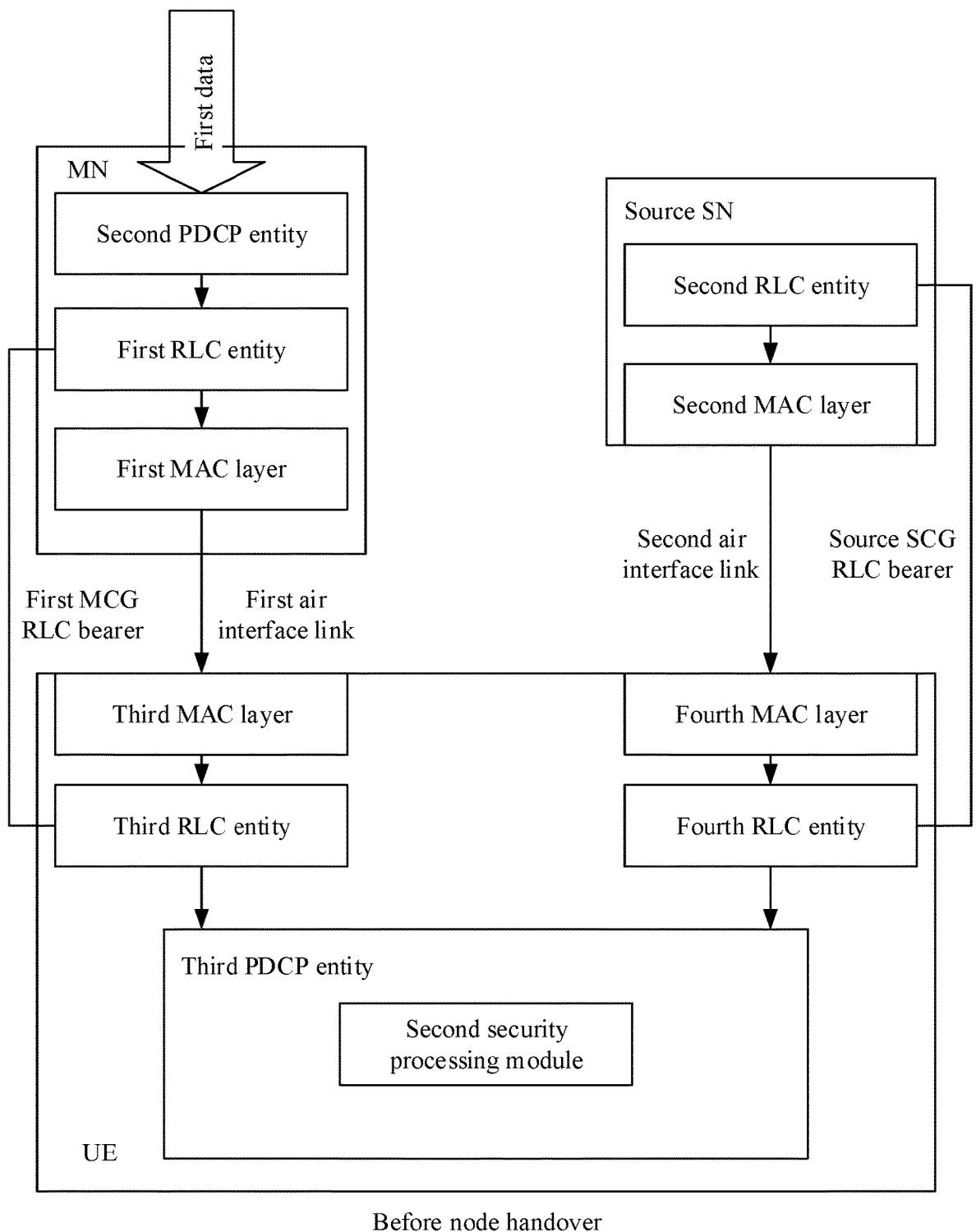
FIG. 8(a) is a schematic diagram of another protocol stack architecture according to an embodiment of this application.

FIG. 8(a) is a schematic diagram of another protocol stack architecture according to an embodiment of this application. The protocol stack architecture is a protocol stack architecture corresponding to an entire communication system before node handover, and the protocol stack architecture is applicable to Scenario 1 or Scenario 2 above. As shown in FIG. 8(a), when a master node sends second data to a terminal device by using a first MCG RLC bearer, after the master node receives first data from a core network, the master node may process the first data into the second data by using a second PDCP entity, a first RLC entity, and a first MAC layer that are established by the master node and a physical layer of the master node, and send the second data to the terminal device through a first air interface link. It should be noted that functions of a PDCP entity, an RLC entity, a MAC layer, and a physical layer that are of a master node are basically the same as functions of a PDCP entity, an RLC entity, a MAC layer, and a physical layer that are of a secondary node. Therefore, for a process of processing data by using the PDCP entity, the RLC entity, the MAC layer, and the physical layer that are of the master node or the secondary node hereinafter, refer to the descriptions in Embodiment 1. Details are not described again hereinafter. The terminal device performs, by using a PHY layer, a third MAC layer, a third RLC entity, and a third PDCP entity that are of the terminal device, a series of processing on the data received by the terminal device on the first air interface link, and delivers processed data.

Alternatively, when a master node sends second data to a terminal device by using a source SCG RLC bearer, the master node first forwards the second data to a source secondary node, and then the source secondary node processes the second data by using a second RLC entity, a second MAC layer, and a PHY layer that are established by the source secondary node, and sends processed data to the terminal device through a second air interface link between the source secondary node and the terminal device. The terminal device performs, by using a PHY layer, a fourth MAC layer, a fourth RLC entity, and a third PDCP entity that are of the terminal device, a series of processing on the data received by the terminal device on the second air interface link, and delivers processed data.

Alternatively, a source secondary node may implement transmission of second data between a master node and a terminal device by using both a source SCG RLC bearer and a first MCG RLC bearer. For an example processes, respectively refer to the foregoing process of implementing transmission of the second data by using the source SCG RLC bearer and the first MCG RLC bearer. Details are not described herein again.

Figure 8B:
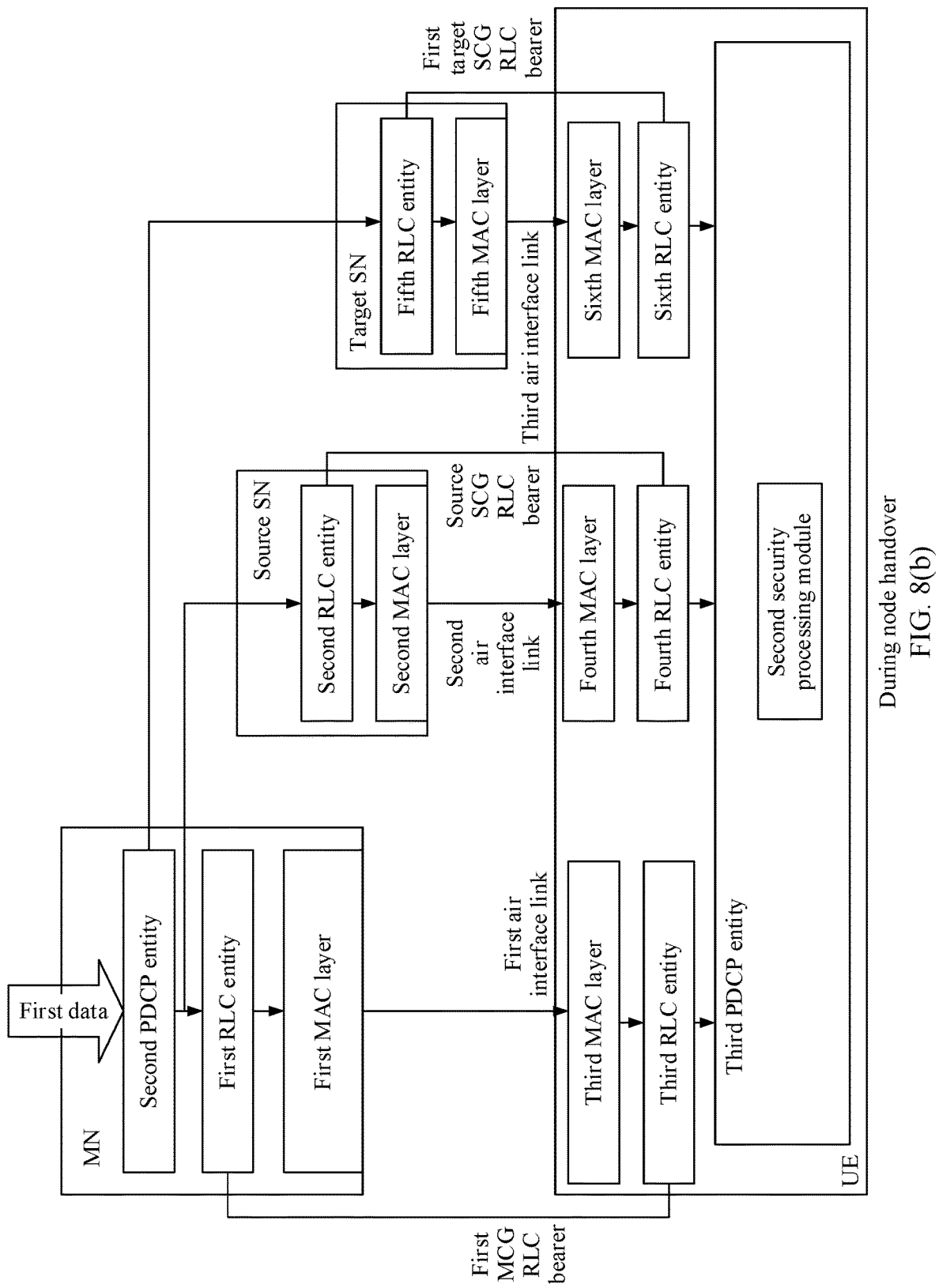
FIG. 8(b) is a schematic diagram of another protocol stack architecture according to an embodiment of this application.

Further, FIG. 8(b) is a schematic diagram of another protocol stack architecture according to an embodiment of this application. The protocol stack architecture is a protocol stack architecture corresponding to an entire communication system in a process of node handover, and the protocol stack architecture is applicable to Scenario 1 above. As shown in FIG. 8(b), in the process of the node handover, a master node continues to implement transmission of second data by using a source SCG RLC bearer and/or a first MCG RLC bearer. For an example process, refer to the foregoing descriptions. Details are not described herein again.

In addition, the master node may further forward the second data to a target secondary node. Then, the target secondary node processes the second data by using a fifth RLC entity, a fifth MAC layer, and a PHY layer that are established by the target secondary node, and sends processed data to the terminal device through a third air interface link between the target secondary node and a terminal device. The terminal device performs, by using a PHY layer, a sixth MAC layer, a sixth RLC entity, and a third PDCP entity that are of the terminal device, a series of processing on the data received by the terminal device on the third air interface link, and delivers processed data.

Figure 8C:
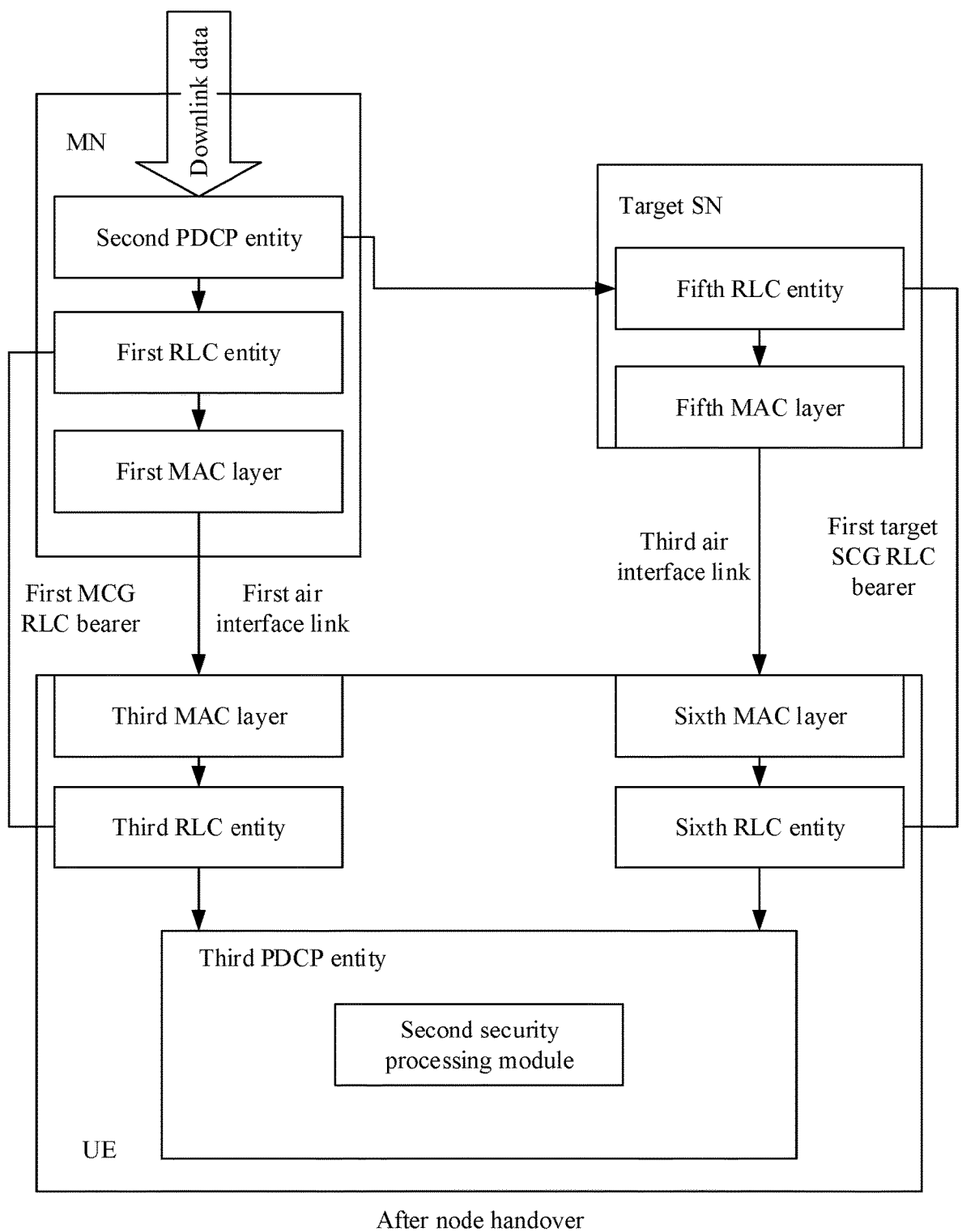
FIG. 8(c) is a schematic diagram of another protocol stack architecture according to an embodiment of this application.

Further, FIG. 8(c) is a schematic diagram of another protocol stack according to an embodiment of this application. The protocol stack architecture is a protocol stack architecture corresponding to an entire communication system after node handover, and the protocol stack architecture is applicable to Scenario 1 above. As shown in FIG. 8(c), after the node handover is completed, a core network sends new downlink data to a master node. After receiving the new downlink data, the master node processes the downlink data, and then sends processed downlink data to a terminal device by using the foregoing first MCG RLC bearer and/or the foregoing first target SCG RLC bearer. For an example process, refer to the foregoing process in which the master node sends the second data to the terminal device by using the first MCG RLC bearer and/or the first target SCG RLC bearer. Details are not described herein again. Then, the terminal device may receive the processed downlink data, and further process the processed downlink data. For an example process, refer to the foregoing process in which the terminal device processes the second data. Details are not described herein again.

Alternatively, FIG. 8(d) is a schematic diagram of another protocol stack architecture according to an embodiment of this application. The protocol stack architecture is a protocol stack architecture corresponding to an entire communication system in a process of node handover, and the protocol stack architecture is applicable to Scenario 2 above. As shown in FIG. 8(d), in the process of the node handover, a master node continues to implement transmission of second data by using the foregoing source SCG RLC bearer and/or the foregoing first MCG RLC bearer. For an example process, refer to the foregoing descriptions. Details are not described herein again.

In addition, the master node may further perform only sequence number assignment on received first data by using a third PDCP entity, to obtain third data. Then, the master node may forward the third data to a first PDCP entity of a target secondary node by using a third data forwarding address. The target secondary node may perform processing such as header compression, data encryption, security protection, and header addition on the third data by using the first PDCP entity, to obtain fourth data.

Then, when the target secondary node sends the fourth data to a terminal device by using a second target SCG RLC bearer, the target secondary node may process the fourth data by using a fifth RLC entity, a fifth MAC layer, and a PHY layer, and send processed fourth data to the terminal device through a third air interface link between the target secondary node and the terminal device. The terminal device performs, by using a PHY layer, a sixth MAC layer, a sixth RLC entity, and a third PDCP entity that are of the terminal device, a series of processing on the data received by the terminal device on the third air interface link, and delivers processed data. Alternatively, when the target node sends the fourth data to a terminal device by using a second MCG RLC bearer, after the target secondary node obtains the fourth data through processing, the target secondary node may send the fourth data to the master node by using the third data forwarding address. Then, the master node may first process the fourth data by using a seventh RLC entity and a first MAC layer that are established by the master node and a PHY layer of the master node, and send processed fourth data to the terminal device through a first air interface link between the master node and the terminal device. The terminal device performs, by using a PHY layer, a third MAC layer, an eighth RLC entity, and a third PDCP entity that are of the terminal device, a series of processing on the data received by the terminal device on the first air interface link, and delivers processed data.

Alternatively, the target secondary node may split the fourth data into fifth data and sixth data, and then respectively implement transmission of the fifth data and the sixth data between the target secondary node and a terminal device by using a second target SCG RLC bearer and a second MCG RLC bearer. For example processes, respectively refer to the foregoing process of implementing data transmission by using the second target SCG RLC bearer and the foregoing process of implementing data transmission by using the second MCG RLC bearer. Details are not described herein again.

Figure 8E:
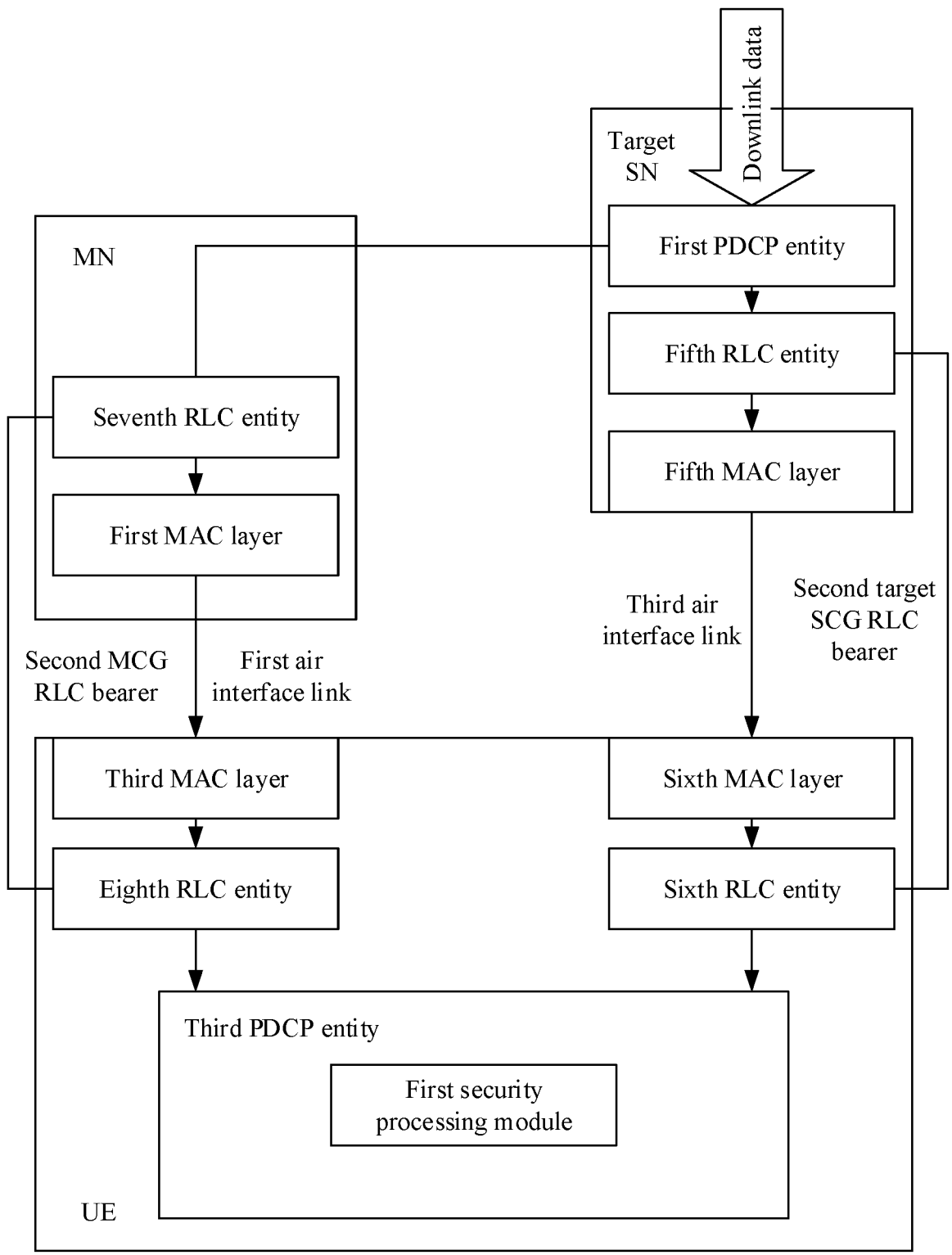
FIG. 8(e) is a schematic diagram of another protocol stack architecture according to an embodiment of this application.

Further, FIG. 8(e) is a schematic diagram of another protocol stack according to an embodiment of this application. The protocol stack architecture is a protocol stack architecture corresponding to an entire communication system after node handover, and the protocol stack architecture is applicable to Scenario 2 above. As shown in FIG. 8(e), after the node handover is completed, a core network sends new downlink data to a target secondary node. After receiving the new downlink data, the target secondary node processes the downlink data, and then sends processed downlink data to a terminal device by using the foregoing second MCG RLC bearer and/or the foregoing second target SCG RLC bearer. Then, the terminal device may receive the processed downlink data, and further process the processed downlink data.

According to the node handover method provided in this embodiment, it is ensured that, in the process of the node handover, the first data that is to be sent to the terminal device by using the first radio bearer originally can be transmitted to the terminal device via both the source secondary node and the target secondary node, and be correctly received by the terminal device, so that interruption that is due to the node handover and that is of transmission of the first data between the core network and the terminal device does not occur, a problem such as a service delay caused by the data transmission interruption caused by the node handover is resolved, applicability and practicability of the node handover method are improved, and user experience of the terminal device is also improved.

Embodiment 3

Figure 9A:
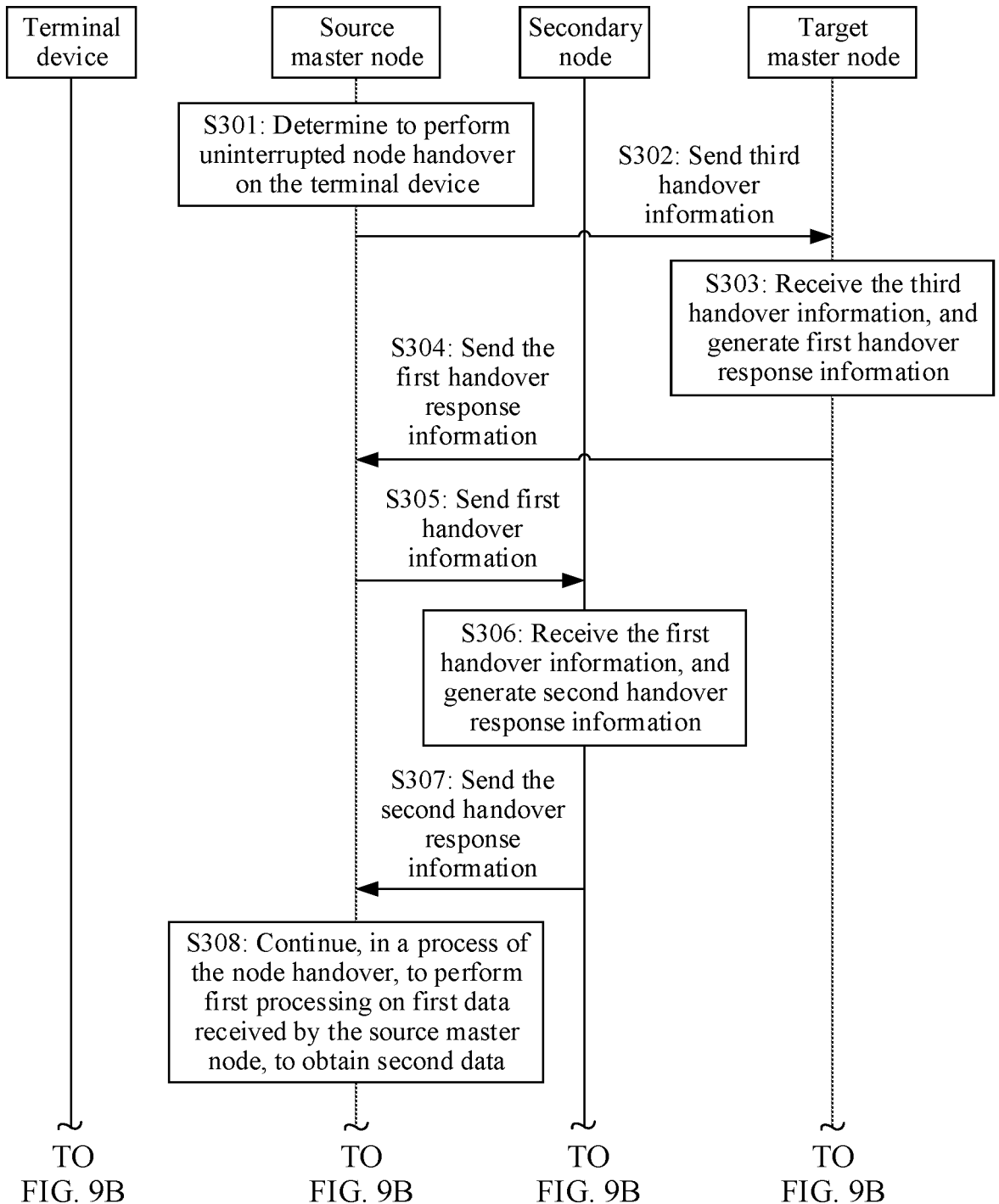
FIG. 9A to FIG. 9C are another schematic flowchart of a node handover method according to an embodiment of this application.
Figure 9B:
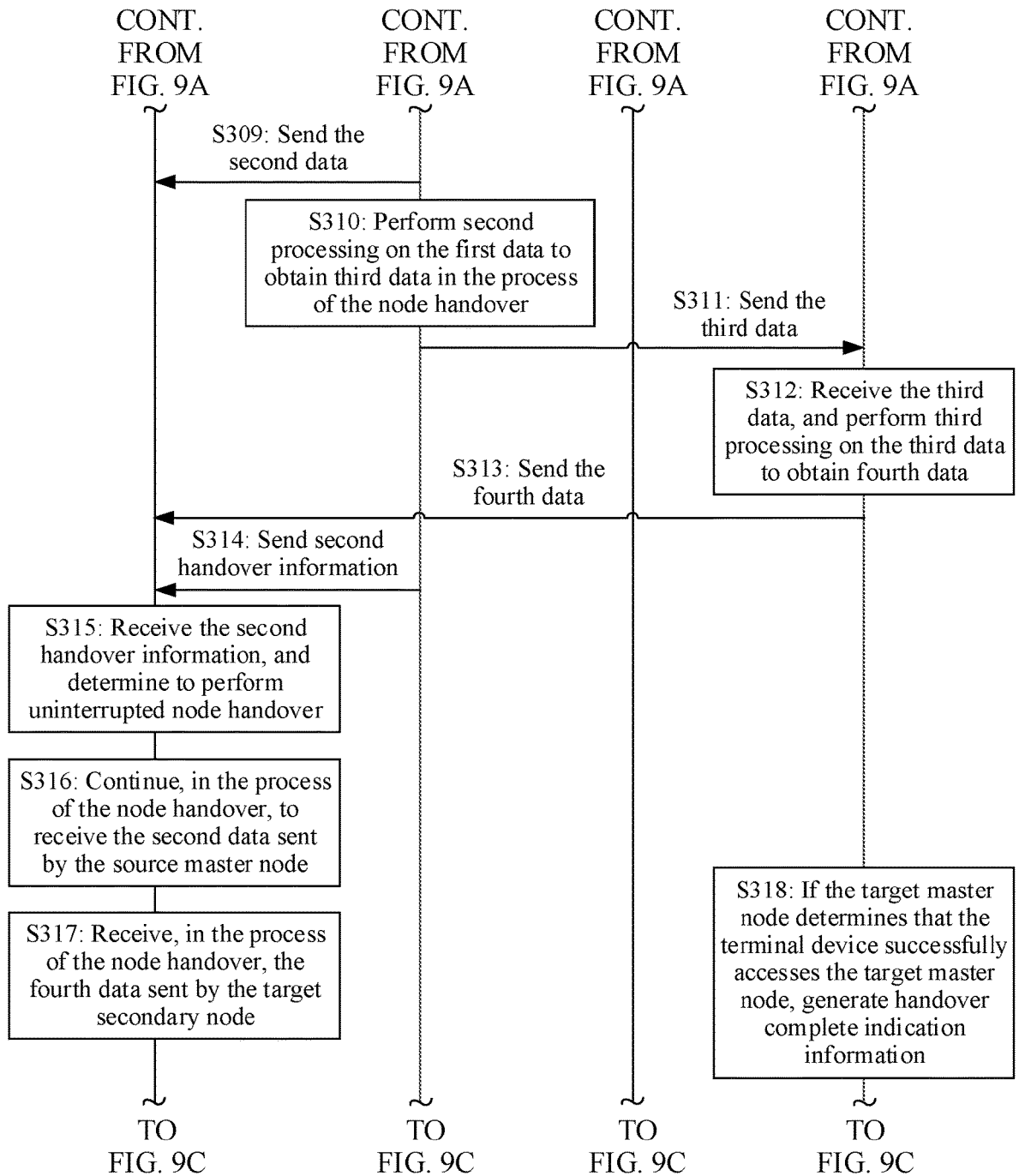
Figure 9C:
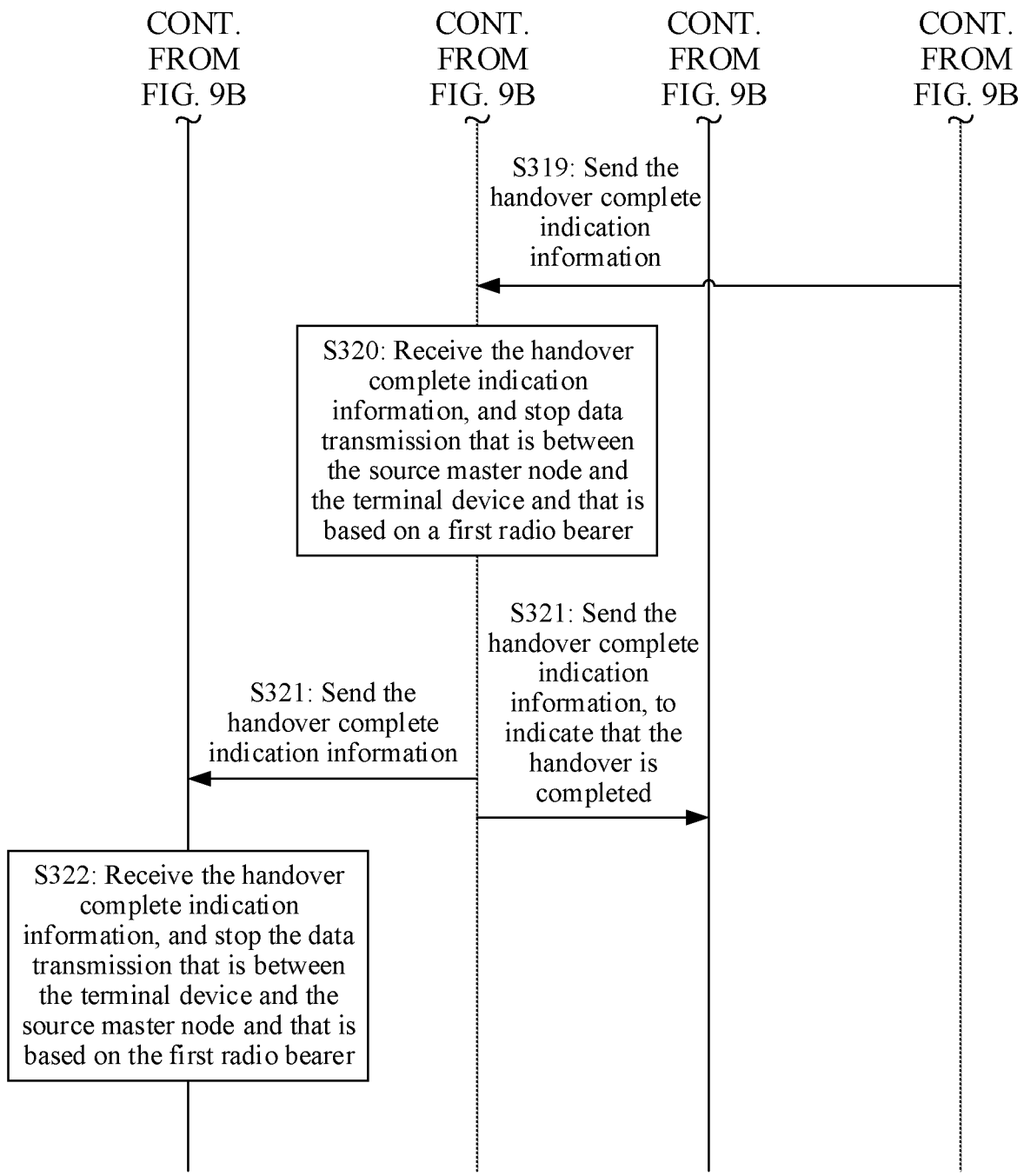

FIG. 9A to FIG. 9C are another schematic flowchart of a node handover method according to an embodiment of this application. The node handover method is applicable to the communication system shown in FIG. 4(b). The node handover method is applicable to the various architectures for implementing dual connectivity shown in FIG. 2(a) to FIG. 2(d). In this embodiment, the EN-DC architecture in FIG. 2(b) is used as an example for description. In a scenario to which the node handover method provided in this embodiment is applicable, a node that is to be handed over is a master node (where to be specific, a source master node is handed over to a target master node). A user plane connection between an access network device and a core network is terminated at the source master node before the handover, and the user plane connection between the access network device and the core network is terminated at the target master node after the handover. In addition, the node handover method provided in this embodiment is applicable to uplink or downlink data transmission between a terminal device and a core network device. In this embodiment, a case in which the core network sends downlink data to the terminal device is used as an example for description. As shown in FIG. 9A to FIG. 9C, the method includes the following operations.

S301: The source master node determines to perform uninterrupted node handover on the terminal device.

In some embodiments, the source master node may determine, based on a signal quality measurement result reported by the terminal device or a current load balancing requirement, that the terminal device is to perform uninterrupted handover of the master node. For an example process, refer to the process in which the master node determines, based on the signal quality measurement result reported by the terminal device or the load balancing requirement, that the terminal device is to hand over the secondary node in Embodiment 1. Details are not described herein again.

Further, after determining that the terminal device is to hand over the master node, the master node may further determine, based on preset non-interruption indication information, a target radio bearer for which uninterrupted node handover is to be performed. For an example process, refer to the process of determining the target radio bearer in Embodiment 1. Details are not described herein again. Similarly, the following describes in detail a process of the uninterrupted node handover by using a first radio bearer included in one or more determined target radio bearers as an example.

S302: The source master node sends third handover information to the target master node.

In some embodiments, after determining to perform uninterrupted node handover for the first radio bearer, the source master node may send the third handover information to the target master node. Herein, the third handover information indicates the target master node to perform uninterrupted node handover.

In some embodiments, the third handover information includes at least non-interruption indication information, first bearer identification information of the first radio bearer, and first node identification information of a secondary node. Herein, the non-interruption indication information indicates that the third handover information requests the target master node to perform uninterrupted node handover. In some embodiments, the non-interruption indication information may explicitly or implicitly exist in the third handover information. The first bearer identification information notifies the target master node that the target master node is to perform uninterrupted node handover for the first radio bearer. The first node identification information indicates the secondary node that establishes dual connectivity with the source master node.

In some embodiments, the third handover information may further include one or more of bearer type related information or data forwarding indication information. Herein, the bearer type related information may include a bearer type of the first radio bearer. During actual application, the bearer type of the first radio bearer may include an MN terminated bearer. Alternatively, more specifically, bearer types of the first radio bearer may include an MN terminated MCG bearer, an MN terminated SCG bearer, and an MN terminated split bearer. The data forwarding indication information indicates that the source master node is to forward data to the target master node, to request the target master node to provide a corresponding data forwarding address.

S303: The target master node receives the third handover information, and generates first handover response information.

In some embodiments, after receiving the third handover information, the target master node may parse the third handover information. If the target master node determines that the third handover information includes the non-interruption indication information, the bearer identification information of the first radio bearer, and the first node identification information of the source master node, the target master node may determine to perform uninterrupted node handover on the terminal device, and the uninterrupted node handover is for the first radio bearer.

After determining to perform uninterrupted node handover on the terminal device, the target master node may generate the first handover response information, and send the first handover response information to the source master node. The first handover response information provides configuration information that is related to the target master node and that is required for the handover, and indicates that the target master node responds to a node handover request of the master node. Specifically, the first handover response information may include node configuration information of the target master node (where the node configuration information is replaced with first node configuration information for description below). The first node configuration information may include one or more of information such as configuration information of a PDCP entity corresponding to the target master node (where for ease of differentiation, the PDCP entity is replaced with a first PDCP entity for description below), configuration information of SDAP corresponding to the target master node, configuration information of an MCG RLC bearer corresponding to the target master node (where the configuration information is replaced with first bearer configuration information for description below), second security information corresponding to the target master node, a first random access resource, and master cell group configuration information of the target master node.

Herein, it should be noted that the first PDCP entity and the MCG RLC bearer that corresponds to the target master node may have been established by the target master node before the node handover, or may be newly established by the target master node after the target master node determines to perform uninterrupted node handover. This is not specifically limited in this application. The second security information indicates a key used when the target master node performs data security processing by using the first PDCP entity (where for ease of differentiation, the key is replaced with a second key for description below). The first node configuration information is mainly used for a subsequent operation such as establishing, by the terminal device, a radio bearer and a security processing module that are associated with the target master node.

Further, when the target master node determines that the third handover information includes the data forwarding indication information, the first handover response information generated by the target master node may further include data forwarding related information of the target master node (where for ease of differentiation, the data forwarding related information is replaced with first data forwarding related information for description below). Herein, the first data forwarding related information is used by the source master node to forward or send data to the target master node, or used by the core network to subsequently forward or send data to the target master node. In some embodiments, the first data forwarding information may include a first data forwarding address provided by the target master node. The first data forwarding address is used by the source master node to subsequently forward, to the target master node, third data obtained by the source master node through second processing. In some embodiments, the first data forwarding related information may further include a second data forwarding address. After the node handover is completed, the second data forwarding address is used by the core network to send a downlink data packet to the target master node.

S304: The target master node sends the first handover response information to the source master node.

S305: The source master node sends first handover information to the secondary node.

In some embodiments, after receiving the first handover response information, the source master node may generate the first handover information, and send the first handover information to the secondary node. The first handover information indicates the secondary node to perform uninterrupted node handover.

In some embodiments, the first handover information may include the non-interruption indication information, the first bearer identification information, and node identification information of the target master node (where for ease of differentiation, the node identification information is replaced with second node identification information for description below). Herein, the non-interruption indication information indicates that the first handover information requests the secondary node to perform uninterrupted node handover. The first bearer identification information notifies the secondary node that the secondary node is to perform uninterrupted node handover for the first radio bearer. The second node identification information notifies the secondary node that the source master node with which the secondary node establishes the DC connectivity is to be replaced with the target master node.

In some embodiments, the first handover information may further include the bearer type related information. The bearer type related information indicates the bearer type of the first radio bearer.

In some embodiments, if the target master node sends, in a subsequent process of the node handover, data to the terminal device by using an SCG RLC bearer associated with the target master node, the first handover information may further include the data forwarding indication information. The data forwarding indication information indicates the secondary node to provide a data forwarding address (where for ease of differentiation, the data forwarding address is replaced with a third data forwarding address for description below). The third data forwarding address is used by the target master node to forward data to the secondary node in the process of the node handover.

S306: The secondary node receives the first handover information, and generates second handover response information.

In some embodiments, after receiving the first handover information, the secondary node may parse the first handover information. If the secondary node determines that the first handover information includes the non-interruption indication information, the first bearer identification information, and the second node identification information, the secondary node may determine that the secondary node is to perform uninterrupted node handover on the terminal device, and the uninterrupted node handover is for the first radio bearer.

Further, after determining that the terminal device is to perform uninterrupted node handover, the secondary node may further generate the second handover response information, and send the second handover response information to the source master node. The second handover response information notifies the source master node that the secondary node has received the first handover information and can perform uninterrupted node handover on the terminal device. In some embodiments, the second handover response information may include one or more of the third data forwarding address and second bearer configuration information required by the terminal device to establish an SCG RLC bearer corresponding to the target master node.

S307: The secondary node sends the second handover response information to the source master node.

In some embodiments, the secondary node sends the second handover response information to the source master node. Then, after the source master node receives the second handover response information, if the source master node extracts the third data forwarding address from the second handover response information, the source master node sends the third data forwarding address to the target master node.

S308: The source master node continues, in the process of the node handover, to perform first processing on first data received by the source master node, to obtain second data.

In some embodiments, after determining to perform uninterrupted node handover on the terminal device, the source master node may continue to receive downlink data sent by the core network (where for ease of understanding and differentiation, the downlink data is replaced with the first data for description below). Then, the source master node performs first processing on the received first data by using a PDCP entity associated with the source master node (where for ease of differentiation, the PDCP entity is replaced with a second PDCP entity for description below), to obtain the second data. For an example process, refer to the process in which the secondary node performs first processing on the first data by using the second PDCP entity associated with the secondary node, to obtain the second data in operation S108 in Embodiment 1. Details are not described herein again.

S309: The source master node sends the second data to the terminal device.

In some embodiments, after obtaining the second data through processing, the source master node may send the second data to the terminal device by using an MCG RLC bearer associated with the source master node (where the MCG RLC bearer is replaced with a source MCG RLC bearer for description below). Alternatively, the source secondary node may send the second data to the terminal device by using an SCG RLC bearer that is on the secondary node and that is associated with the source secondary node (where for ease of differentiation, the SCG RLC bearer is replaced with a first SCG RLC bearer for description below). Alternatively, the source master node may send the second data to the terminal device by using a source MCG RLC bearer and a first SCG RLC bearer.

In some embodiments, if the source master node originally sends data to the terminal device by using the source MCG RLC bearer and the first SCG RLC bearer before the node handover (where that is, the type of the first radio bearer is the MN terminated split bearer), the source master node may alternatively send the second data to the terminal device by using only the source MCG RLC bearer or the first SCG RLC bearer in the process of the node handover. The source master node sends the second data to the terminal device by using only the source MCG RLC bearer or the first SCG RLC bearer, so that the terminal device may maintain only the source MCG RLC bearer or the first SCG RLC bearer in the process of the node handover, and does not need to maintain both the source MCG RLC bearer and the first SCG RLC bearer. In this way, a requirement on a device capability of the terminal device is reduced, and applicability of the node handover method can be improved.

S310: Perform second processing on first data to obtain third data in the process of the node handover.

In some embodiments, after determining to perform uninterrupted node handover on the terminal device, the source master node may further perform second processing on the received first data to obtain the third data. Herein, the foregoing second processing mainly includes sequence number assignment. In other words, after receiving the first data, the source master node may further number the first data by using the second PDCP entity corresponding to the source master node, to obtain the third data.

S311: The source master node sends the third data to the target master node.

In some embodiments, after obtaining the third data through processing, the source master node may forward the third data to the target master node by using the first data forwarding address.

S312: The target master node receives the third data, and performs third processing on the third data to obtain fourth data.

In some embodiments, after receiving the third data forwarded by the source master node, the target master node may perform third processing on the third data to obtain the fourth data. Herein, the third processing mainly includes performing data encryption and/or integrity protection based on the second key corresponding to the first PDCP entity. During actual application, the target master node may perform header compression on the third data, then perform data encryption and/or integrity protection on header compressed third data based on the second key, and finally perform processing such as PDCP header addition on data encrypted and/or integrity protected third data, to obtain the fourth data.

S313: The target master node sends the fourth data to the terminal device.

In some embodiments, after obtaining the fourth data through processing, the target master node may send the fourth data to the terminal device by using an MCG RLC bearer that is associated with the target master node and that corresponds to the first PDCP entity (where for ease of understanding and differentiation, the MCG RLC bearer is replaced with a target MCG RLC bearer for description below). Alternatively, the target master node may send the fourth data to the terminal device by using an SCG RLC bearer that is on the source secondary node and that is associated with the target master node (where for ease of differentiation, the SCG RLC bearer is replaced with a second SCG RLC bearer for description below). Alternatively, the target master node may send the fourth data to the terminal device by using a target MCG RLC bearer and a second SCG RLC bearer.

It should be noted herein that, if the type of the first radio bearer is the MN terminated split bearer, the target master node may not completely inherit the type of the first radio bearer in the process of the node handover when saving the capability of the terminal device is considered. That is, in the process of the node handover, the target master node may send the fourth data to the terminal device by using only the target MCG RLC bearer or the second SCG RLC bearer. Herein, in the process of the node handover, the fourth data is sent to the terminal device by using only the target MCG RLC bearer or the second SCG RLC bearer, so that the terminal device may maintain only the target MCG RLC bearer or the second SCG RLC bearer in the process of the node handover, and does not need to maintain both the target MCG RLC bearer and the second SCG RLC bearer. In this way, the requirement on the device capability of the terminal device can be further reduced.

S314: The source master node sends second handover information to the terminal device.

In some embodiments, after determining to perform uninterrupted node handover for the first radio bearer, the source master node may further send the second handover information to the terminal device.

In some embodiments, the second handover information includes one or more of the first node configuration information of the target master node, the non-interruption indication information, the first bearer identification information, and the second bearer configuration information. The non-interruption indication information and the bearer identification information of the first radio bearer notify the terminal device to perform uninterrupted node handover for the first radio bearer. The first node configuration information is used by the terminal device to perform corresponding configuration, so that the terminal device can receive the fourth data from the target master node by using the target MCG RLC bearer in the process of the node handover. The second bearer configuration information is used by the terminal device to perform corresponding configuration, so that the terminal device can receive data from the target master node by using the second SCG RLC bearer.

In some embodiments, the second handover information may further include bearer type indication information, and the bearer type indication information indicates a bearer type of a radio bearer used when the target master node sends the fourth data to the terminal device. For example, when the bearer type indicated by the bearer type indication information is the MN terminated MCG bearer, it indicates that the target master node sends the fourth data to the terminal device by using only the target MCG RLC bearer. When the bearer type indicated by the bearer type indication information is the MN terminated SCG bearer, it indicates that the target master node sends the fourth data to the terminal device by using only the second SCG RLC bearer. When the bearer type indicated by the bearer type indication information is the MN terminated split bearer, it indicates that the target master node sends the fourth data to the terminal device by using the target MCG RLC bearer and the second SCG RLC bearer.

It should be noted that the bearer type indication information may preferentially indicate that the target master node sends the fourth data to the terminal device by using the target MCG RLC bearer or the second SCG RLC bearer. In this way, in a process of receiving the fourth data, the terminal device may maintain only the target MCG RLC bearer or the second SCG RLC bearer, so that the requirement on the device capability of the terminal device can be reduced, and applicability of the node handover method can be improved.

S315: The terminal device receives the second handover information, and determines to perform uninterrupted node handover.

In some embodiments, the terminal device may receive the second handover information sent by the source master node, and then determine, based on the second handover information, to perform uninterrupted node handover for the first radio bearer.

In some embodiments, the terminal device may first parse the second handover information. If the terminal device determines that the second handover information includes the non-interruption indication information and the bearer identification information of the first radio bearer, the terminal device may determine that the second handover information requests the terminal device to perform uninterrupted node handover for the first radio bearer. Then, if the terminal device extracts the first node configuration information from the second handover information, the terminal device may perform corresponding configuration based on the first node configuration information. Specifically, the terminal device may perform SDAP configuration based on the configuration information that is of SDAP corresponding to the target node and that is included in the first node configuration information. The terminal device may alternatively establish the target MCG RLC bearer based on the first bearer configuration information included in the first node configuration information. The terminal device may alternatively establish the second SCG RLC bearer based on the second bearer configuration information. The terminal device may alternatively establish, based on the configuration information corresponding to the first PDCP entity, the PDCP entity corresponding to the target master node. Herein, because a PDCP entity on a terminal device side is public for any cell, the PDCP entity corresponding to the source master node and the PDCP entity corresponding to the target master node are a same PDCP entity (where the same PDCP entity is replaced with a third PDCP entity for description below). Therefore, that the terminal device establishes, based on the configuration information corresponding to the first PDCP entity, the PDCP entity corresponding to the target master node is equivalent to that a first security processing module corresponding to the target master node is established in the third PDCP entity. The first security processing module is configured to perform data decryption and/or security protection verification based on the second key indicated by the second security information corresponding to the first PDCP entity. In addition, the third PDCP entity further includes a second security processing module corresponding to the source master node, and the second security processing module is configured to perform data decryption and/or security protection verification based on a first key corresponding to the second PDCP entity.

In some embodiments, if the terminal device further extracts the bearer type indication information from the second handover information, the terminal device may determine, based on the bearer type indication information, that the terminal device is to receive, by using the target MCG bearer, the second SCG RLC bearer, or both the target MCG bearer and the second SCG RLC bearer, the fourth data sent by the target master node.

Further, the terminal device may generate the configuration response information for the second handover information after completing corresponding configuration based on the second handover information. The configuration response information indicates that the terminal device has completed configuration of resources, for example, a protocol entity and a radio bearer, related to the target master node and/or the source master node. In some embodiments, after receiving the configuration response information, the source master node may forward the configuration response information to the target master node, to notify the target master node that the terminal device has completed corresponding configuration.

S316: The terminal device continues, in the process of the node handover, to receive the second data sent by the source master node.

In some embodiments, in the process of the node handover, the terminal device may continue to receive, by using the source MCG RLC bearer and/or the first SCG RLC bearer, the second data sent by the source master node, process the second data by using the third PDCP entity, and deliver processed second data. For an example process, refer to the process in which the terminal device receives, by using the source SCG RLC bearer and/or the first MCG RLC bearer, the second data sent by the source secondary node, and processes the second data in operation S116 in Embodiment 1. Details are not described herein again.

S317: The terminal device receives, in the process of the node handover, the fourth data sent by the target master node.

In some embodiments, after determining to perform uninterrupted node handover, the terminal device may initiate a random access request to the target master node based on a random access resource included in the second handover information. After determining, based on a status such as current network load, to allow access of the terminal device, the target master node may send a random access response to the terminal device, and further complete an access operation of the terminal device.

After receiving the access response and determining that the terminal device successfully accesses the target master node, the terminal device may receive, by using the target MCG RLC bearer and/or the second SCG RLC bearer, the fourth data sent by the target master node, and process the fourth data. For an example process, refer to the process in which the terminal device receives, by using the first target SCG RLC bearer and/or the second MCG RLC bearer, the fourth data sent by the target secondary node, and processes the fourth data in Scenario 1 in operation S117 in Embodiment 1. Details are not described herein again.

S318: If the target master node determines that the terminal device successfully accesses the target master node, the target master node generates handover complete indication information.

In some embodiments, if the target master node determines that the terminal device has successfully accessed the target master node, and the terminal device correctly receives the fourth data, the target master node may generate the handover complete indication information. The handover complete indication information indicates that the uninterrupted node handover for the first radio bearer has been completed.

S319: The target master node sends the handover complete indication information to the source master node.

In some embodiments, after generating the handover complete indication information, the target master node may send the handover complete indication information to the source master node and the terminal device.

S320: The source master node receives the handover complete indication information, and stops data transmission that is between the source master node and the terminal device and that is based on the first radio bearer.

In some embodiments, after detecting and receiving the handover complete indication information, the source master node may determine that the uninterrupted node handover for the first radio bearer has been completed. Then, the source master node may stop the data transmission that is between the source master node and the terminal device and that is based on the first radio bearer. It should be noted that, if there is still buffered data when the source master node determines that the uninterrupted node handover for the first radio bearer has been completed, the source master node may continue to send the buffered data, and does not stop data transmission between the source master node and the terminal device until sending of the last data packet is completed. Further, the source master node may further release or delete resources, for example, a protocol entity and a radio bearer, related to the terminal.

In some embodiments, after receiving the handover complete indication information, the source master node may further feed back the first receiving response information to the target master node, to notify the target master node that the source master node has correctly received the handover complete indication information.

S321: The source master node sends the handover complete indication information to the secondary node and the terminal device, to indicate that the node handover is completed.

S322: The terminal device receives the handover complete indication information, and stops the data transmission that is between the terminal device and the source master node and that is based on the first radio bearer.

In some embodiments, after receiving the handover complete indication information, the terminal device may determine that the uninterrupted node handover for the first radio bearer has been completed, and may stop receiving the data from the source master node. Further, the terminal device may further release or delete a connection to the source master node. Specifically, the terminal device may release or delete resources such as an air interface link between the terminal device and the source master node, the source MCG RLC bearer, and the PDCP entity corresponding to the source master node.

In some embodiments, after receiving the handover complete indication information, the terminal device may further feed back the second receiving response information to the target master node, to notify the target master node that the terminal device has correctly received the handover complete indication information.

Further, after receiving the handover complete indication information, the secondary node may determine that the uninterrupted node handover for the first radio bearer has been completed, and may stop receiving the data from the source master node. Specifically, the secondary node may further release or delete the connection to the source master node.

It should be additionally noted that the procedure provided in this embodiment is alternatively applicable to a scenario in which "a user plane connection between an access network device and a core network is terminated at a secondary node all the time before and after the node handover". In this scenario, before the node handover, the secondary node obtains first data from the core network, obtains second data through processing, and sends the second data to a terminal device by using an SCG RLC bearer associated with the secondary node and/or an MCG RLC bearer on the source master node and associated with the secondary node. In a process of the node handover, the secondary node still sends the second data to the terminal device by using the SCG RLC bearer and/or the MCG RLC bearer that are/is associated with the secondary node. In addition, the secondary node may further send a part or all of the second data to the terminal device by using an MCG RLC bearer that is on the target master node and that is associated with the secondary node. After the node handover, the secondary node sends, to the terminal device by using the associated SCG RLC bearer and/or the associated MCG RLC that is on the target master node, the data obtained by the secondary node from the core network. For details of an example configuration process of the target master node, a source secondary node, and the terminal device, refer to the foregoing descriptions. Details are not described herein again.

According to the node handover method provided in this embodiment, it is ensured that, in the process of the node handover, the first data that is to be sent to the terminal device by using the first radio bearer originally can be transmitted to the terminal device via both the source master node and the target master node, and be correctly received by the terminal device, so that interruption that is due to the node handover and that is of transmission of the first data between the core network and the terminal device does not occur, a problem such as a service delay caused by the data transmission interruption caused by the node handover is resolved, applicability and practicability of the node handover method are improved, and user experience of the terminal device is also improved.

Embodiment 4

Figure 10A:
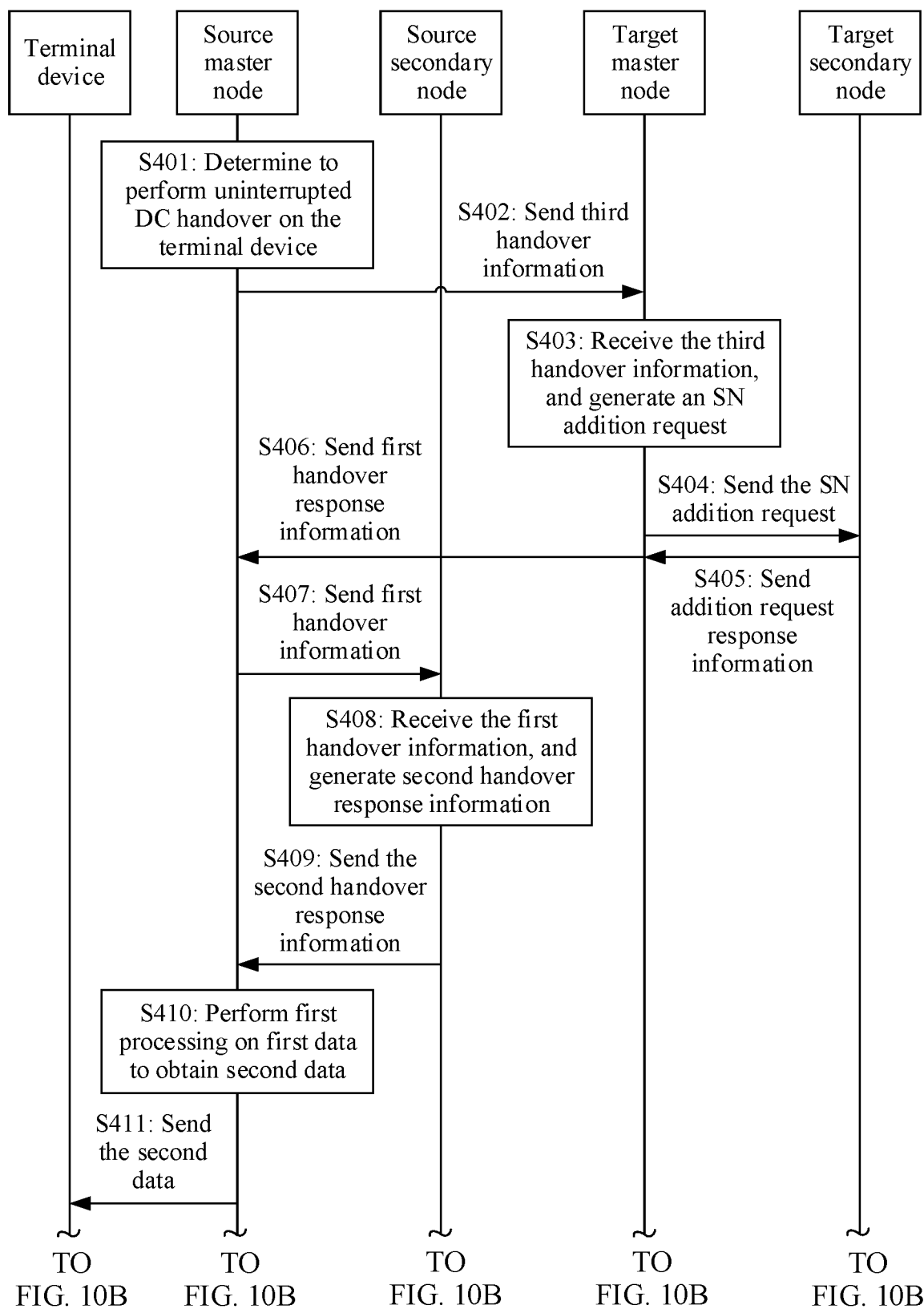
FIG. 10A to FIG. 10C are another schematic flowchart of a node handover method according to an embodiment of this application.
Figure 10B:
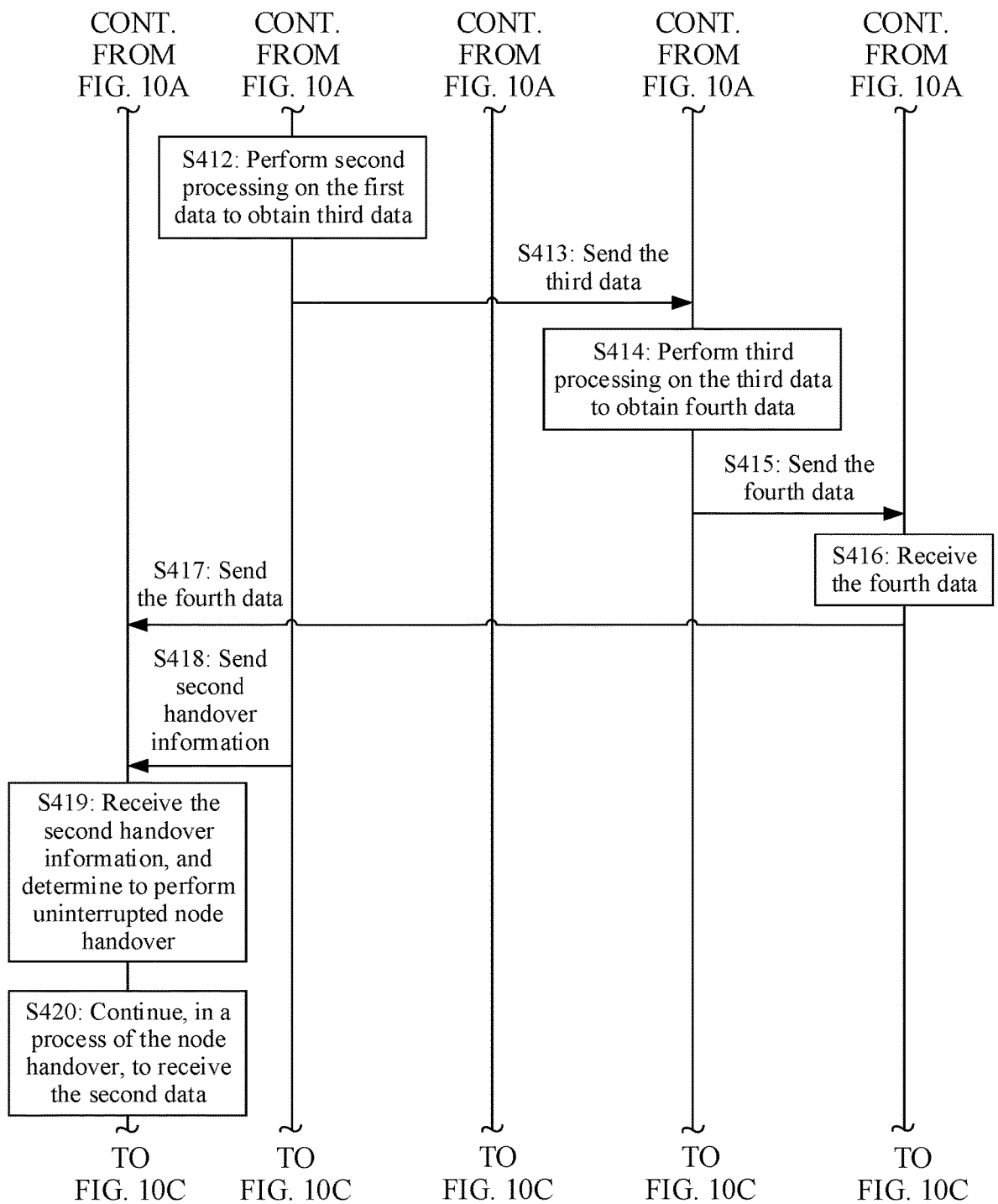
Figure 10C:
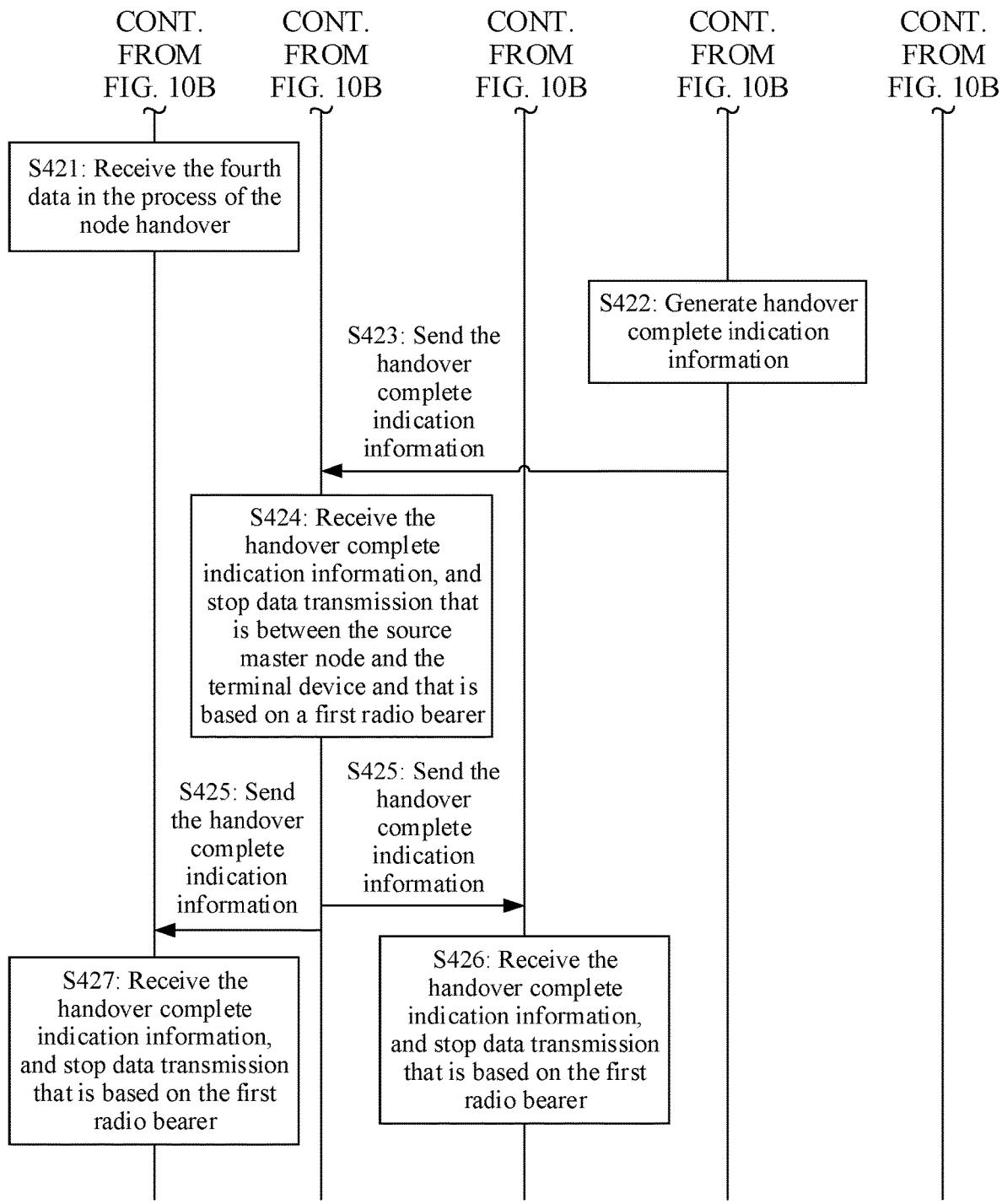
Figure 18:
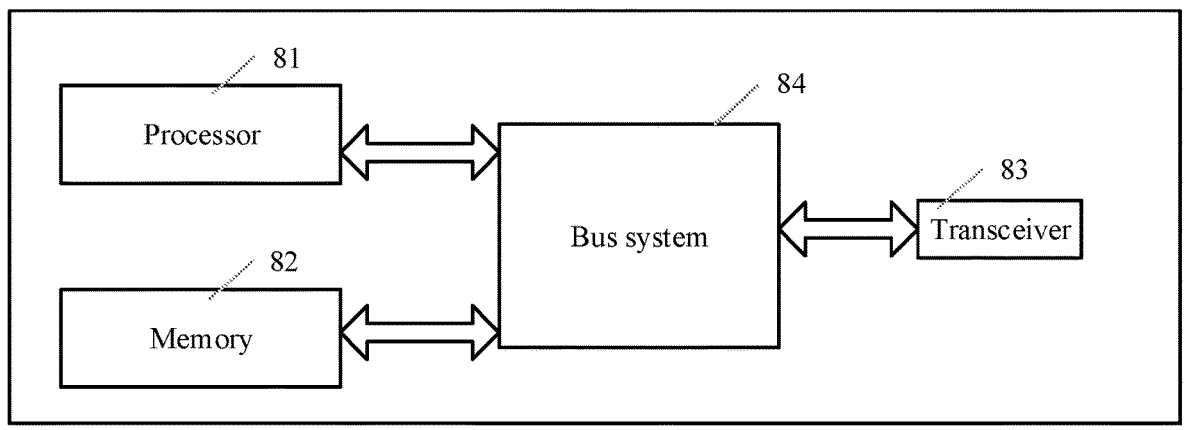
FIG. 18 is another schematic diagram of a structure of an apparatus according to an embodiment of this application.

FIG. 10A to FIG. 10C are another schematic flowchart of a node handover method according to an embodiment of this application. The node handover method is applicable to the communication system shown in FIG. 4(c). The node handover method is applicable to the various architectures for implementing dual connectivity shown in FIG. 2(a) to FIG. 2(d). In this embodiment, the EN-DC architecture in FIG. 2(b) is used as an example for description. In a scenario to which the node handover method provided in this embodiment is applicable, nodes that are to be handed over are a master node and a secondary node (where to be specific, a source master node is handed over to a target master node, and a source secondary node is handed over to a target secondary node). A user plane connection between an access network device and a core network is terminated at the source master node before the handover, and the user plane connection between the access network device and the core network is terminated at the target master node after the handover. In addition, the node handover method (where the node handover method is replaced with a DC handover method for description hereinafter) provided in this embodiment is applicable to uplink or downlink data transmission between a terminal device and a core network device. In this embodiment, a case in which the core network sends downlink data to the terminal device is used as an example for description. As shown in FIG. 18, the method includes the following operations.

S401: The source master node determines to perform uninterrupted DC handover on the terminal device.

In some embodiments, the source master node may determine, based on a load balancing requirement or signal quality measurement results that are of a current primary cell and secondary cell of the terminal device and that are received by the source master node and reported by the terminal device, that the terminal device is to perform DC handover. An example process is similar to the process in which the master node determines, based on the signal quality measurement result received by the master node and reported by the terminal device or a load balancing requirement, that the terminal device is to hand over the secondary node in operation S101 in Embodiment 1. Details are not described herein again.

Further, when determining that the terminal device is to perform DC handover, the source master node may further determine, based on preset non-interruption indication information, a target radio bearer for which uninterrupted node handover is to be performed. An example process is similar to the process of determining the target radio bearer in Embodiment 1. Details are not described herein again. The following describes in detail a process of the uninterrupted node handover by using a first radio bearer included in one or more determined target radio bearers as an example.

S402: The source master node sends third handover information to the target master node.

In some embodiments, after determining to perform uninterrupted DC handover for the first radio bearer, the source master node may send the third handover information to the target master node. Herein, the third handover information indicates the target master node to perform uninterrupted node handover.

In some embodiments, the third handover information includes at least non-interruption indication information, first bearer identification information of the first radio bearer, first node identification information of the source secondary node, and DC configuration information on a source side. For descriptions of the non-interruption indication information, the first bearer identification information, and the first node identification information, refer to the descriptions in operation S302 in Embodiment 3. The DC configuration information on the source side is configuration information for establishing DC connectivity between the source master node and the source secondary node. It should be added that the non-interruption indication information herein may be an indication identifier specially used for the DC handover, and is for differentiating between the DC handover and non-interruption single connectivity handover. In this way, the target master node can determine, by using the indication identifier specially used for the DC handover, whether the target master node supports the DC handover, to determine whether the target master node responds to the third handover information.

In some embodiments, the third handover information may further include one or more of bearer type related information or data forwarding indication information. Herein, for details of the bearer type related information and the data forwarding indication information, refer to the descriptions in operation S302 in Embodiment 3. Details are not described herein again.

S403: The target master node receives the third handover information, and generates an SN addition request.

In some embodiments, after receiving the third handover information and determining that the target master node supports the DC handover, the target master node may parse the third handover information. If the target master node determines that the third handover information includes the non-interruption indication information, the first bearer identification information, the first node identification information, and the DC configuration information on the source side, the target master node may determine to perform non-interruption DC handover on the terminal device, and the uninterrupted DC handover is for the first radio bearer.

Further, after determining to perform uninterrupted DC handover on the terminal device, the target master node may generate an SN addition request. The SN addition request includes one or more of the non-interruption indication information, the DC configuration information, the data forwarding indication information, the first bearer identification information, and the bearer type related information. The SN addition request is for adding the target secondary node for the terminal device.

S404: The target master node sends the SN addition request to the target secondary node.

In some embodiments, after generating the SN addition request, the target master node may send the SN addition request to the target secondary node.

S405: The target secondary node sends addition request response information to the target master node.

After receiving the SN addition request, the target secondary node may generate the addition request response information if the target secondary node determines that the target secondary node can complete configuration corresponding to the DC configuration information. The addition request response information provides configuration information required for the handover, and indicates that the target secondary node responds to a DC handover request of the target master node. In some embodiments, content included in the addition request response information is similar to content included in the first handover response information in Scenario 2 of operation S103 in Embodiment 1. Details are not described herein again. However, a difference lies in that the third data forwarding address included in the first handover response information is used by the target master node to forward the data to the target secondary node in the subsequent process of the DC handover.

S406: The target master node generates first handover response information, and sends the first handover response information to the source master node.

In some embodiments, after receiving the addition request response information and determining that the target secondary node can implement completion of the DC handover, the target master node may generate response information for the third handover information (where the response information is replaced with the first handover response information for description below), and send the first handover response information to the source master node. The first handover response information provides configuration information required for the handover, and indicates that both the target master node and the target secondary node may respond to a DC handover request of the source master node.

Specifically, the first handover response information may include node configuration information of the target master node (where the node configuration information is replaced with first node configuration information for description below). The first node configuration information may include information such as configuration information of a first PDCP entity corresponding to the target master node, configuration information of SDAP corresponding to the target master node, configuration information of a master cell group RLC bearer (MCG RLC bearer) corresponding to the target master node (where the configuration information is replaced with first bearer configuration information for description below), first security information corresponding to the target master node, a second random access resource of a target primary cell, master cell group configuration information of the target master node, configuration information that is of SDAP corresponding to the target secondary node and that is in the first node configuration information, fourth bearer configuration information of the target secondary node, and a first random access resource of the target secondary node. The first security information indicates a key used when the target master node performs data security processing by using the first PDCP entity (where for ease of differentiation, the key is replaced with a second key for description below).

Further, when the target master node determines that the third handover information includes the data forwarding indication information, the first handover response information generated by the target master node may further include data forwarding related information of the target master node (where for ease of differentiation, the data forwarding related information is replaced with first data forwarding related information for description below). Herein, for example content of the first data forwarding related information, refer to the first data forwarding related information in operation S303 in Embodiment 3. Details are not described herein again.

S407: The source master node sends first handover information to the source secondary node.

In some embodiments, after determining to perform uninterrupted DC handover for the first radio bearer, the source master node may send the first handover information to the source secondary node. The first handover information indicates the source secondary node to perform uninterrupted node handover.

In some embodiments, content included in the first handover information is similar to the content included in the first handover information in operation S305 in Embodiment 3, and a main difference lies in that the first handover information in this embodiment does not include node identification information of the target master node.

S408: The source secondary node receives the first handover information, and generates second handover response information.

In some embodiments, after receiving the first handover information, the source secondary node may parse the first handover information. If the source secondary node determines that the first handover information includes the non-interruption indication information and the first bearer identification information, the source secondary node may determine that the source secondary node is to perform non-interruption DC handover on the terminal device, and the non-interruption DC handover is for the first radio bearer. After determining that the terminal device is to perform uninterrupted node handover, the source secondary node may further generate the second handover response information, and send the second handover response information to the source master node. The second handover response information notifies the master node that the source secondary node has received the first handover information and can perform uninterrupted DC handover on the terminal device.

S409: The source secondary node sends the second handover response information to the source master node.

S410: The source master node performs first processing on received first data to obtain second data.

In some embodiments, after receiving the second handover response information, the source master node may continue to receive downlink data sent by the core network (where for ease of understanding and differentiation, the downlink data is replaced with the first data for description below). Then, the source master node may perform first processing on the first data to obtain the second data.

In some embodiments, the source master node performs first processing on the received first data by using a PDCP entity associated with the source master node (where for ease of differentiation, the PDCP entity is replaced with a second PDCP entity for description below), to obtain the second data. For an example process, refer to the process in which the source master node performs first processing on the first data by using the second PDCP entity, to obtain the second data in operation S308 in Embodiment 3. Details are not described herein again.

S411: The source master node sends the second data to the terminal device.

In some embodiments, after obtaining the second data through processing, the source master node may send the second data to the terminal device by using an SCG RLC bearer associated with the source master node (where the SCG RLC bearer is replaced with a source SCG RLC bearer for description below). Alternatively, the source master node may send the second data to the terminal device by using an MCG RLC bearer associated with the source master node (where for ease of differentiation, the MCG RLC bearer is replaced with a source MCG RLC bearer for description below). Alternatively, the source master node may send the second data to the terminal device by using both a source SCG RLC bearer and a source MCG RLC bearer.

In some embodiments, if the source master node originally sends the data to the terminal device by using the source SCG RLC bearer and the source MCG RLC bearer before the node handover (where that is, a type of the first radio bearer is an MN terminated split bearer), the first handover information sent by the source master node may further include a first capability saving identifier. After the source secondary node receives the second handover information, if the source secondary node determines that the second handover information includes the first capability saving identifier, the source secondary node determines that the source master node is to send the second data to the terminal device by using only the source SCG RLC bearer in the process of the DC handover. Alternatively, in the process of the DC handover, the source master node may actively release or delete the source SCG RLC bearer, and send the second data to the terminal device by using only the source MCG RLC bearer. In this case, the second handover information may include a second capability saving identifier, and the second capability saving identifier notifies the source secondary node to release or delete the source SCG RLC bearer. Herein, in the process of the DC handover, the second data is sent to the terminal device by using only the source SCG RLC bearer or the source MCG RLC bearer, so that the terminal device may maintain only the source SCG RLC bearer or the source MCG RLC bearer in the process of the DC handover, and does not need to maintain both the source SCG RLC bearer and the source MCG RLC bearer. In this way, a requirement on a device capability of the terminal device is reduced, and applicability of the node handover method can be improved.

S412: The source master node performs second processing on the first data to obtain third data.

In some embodiments, the source master node performs second processing on the first data by using the second PDCP entity, to obtain the third data. For an example process, refer to the process in which the source master node processes the first data by using the second PDCP entity, to obtain the third data in operation S310 in Embodiment 3. Details are not described herein again.

S413: The source master node sends the third data to the target master node.

In some embodiments, after obtaining the third data through processing, the source master node may forward the third data to the target master node by using the first data forwarding address.

S414: The target master node performs third processing on the third data to obtain fourth data.

In some embodiments, after receiving the third data forwarded by the source master node, the target master node may perform third processing on the third data by using the first PDCP entity corresponding to the target master node, to obtain the fourth data. For an example process, refer to the process in which the source master node performs second processing on the first data by using the first PDCP entity, to obtain the third data in operation S310 in Embodiment 3. Details are not described herein again.

S415: The target master node sends the fourth data to the target secondary node.

In some embodiments, after obtaining the fourth data through processing, the target master node may send a part or all of the fourth data (where it is assumed that the part or all of the fourth data is fifth data herein) to the target secondary node by using the third data forwarding address.

S416: The target secondary node receives the fourth data.

In some embodiments, the target secondary node may receive, by using the third data forwarding address, the fourth data sent by the target master node.

S417: The target secondary node sends the fourth data to the terminal device.

In some embodiments, after receiving the fifth data, the target secondary node may send the fifth data to the terminal device by using a target SCG RLC bearer established by the target secondary node.

In addition, the target master node may also send sixth data other than the fifth data in the fourth data to the terminal device by using a target MCG RLC bearer on the target master node.

Alternatively, the target master node may directly send the fourth data to the terminal device by using a target SCG RLC bearer or a target MCG RLC bearer.

It should be added that, before sending the fourth data to the terminal device, the target master node may first establish the target MCG RLC bearer and/or the target SCG RLC bearer.

It should be noted herein that, if the type of the first radio bearer is the MN terminated split bearer, the target master node may not completely inherit the type of the first radio bearer when saving the capability of the terminal device is considered. That is, the third handover information may include a third capability saving identifier. After extracting the third capability saving identifier, the target secondary node may determine, based on the third capability saving identifier, that the target secondary node may preferentially send the fourth data to the terminal device by using the target SCG RLC bearer or the target MCG RLC bearer in the process of the DC handover. Herein, in the process of the DC handover, the fourth data is sent to the terminal device by using only the target SCG RLC bearer or the target MCG RLC bearer, so that the terminal device may maintain only the target SCG RLC bearer or the target MCG RLC bearer in the process of the node handover, and does not need to maintain both the target SCG RLC bearer and the target MCG RLC bearer. In this way, the requirement on the device capability of the terminal device can be further reduced.

S418: The source master node sends second handover information to the terminal device.

In some embodiments, after determining to perform uninterrupted node handover for the first radio bearer, the source master node may further send the second handover information to the terminal device.

In some embodiments, the third handover information includes one or more of the first node configuration information of the target master node, second node configuration information of the target secondary node, the non-interruption indication information, and the first bearer identification information. The first node configuration information is used by the terminal device to perform corresponding configuration, so that the terminal device can receive data from the target master node by using the target MCG RLC bearer in the process of the DC handover. The second node configuration information is used by the terminal device to perform corresponding configuration, so that the terminal device can receive data from the target secondary node by using the target SCG RLC bearer in the process of the DC handover.

In some embodiments, the second handover information may further include bearer type indication information. For an example function of the bearer type indication information, refer to the descriptions of the bearer type indication information in operation 314 of Embodiment 3. A difference lies in that the bearer type indication information in this embodiment indicates that the target master node sends the fourth data to the terminal device by using only the target SCG RLC bearer or the target MCG RLC bearer.

S419: The terminal device receives the second handover information, and determines to perform uninterrupted node handover.

In some embodiments, the terminal device may receive the second handover information sent by the source master node, and determine, based on the third handover information, to perform uninterrupted node handover for the first radio bearer.

In some embodiments, the terminal device may first parse the second handover information. If the terminal device determines that the third handover information includes one or more of the non-interruption indication information, the first bearer identification information of the first radio bearer, the first node configuration information, and the second node configuration information, the terminal device may determine that the third handover information requests the terminal device to perform uninterrupted DC handover for the first radio bearer.

Then, the terminal device may perform corresponding configuration based on the content included in the second handover information. An example configuration process is similar to the process in which the terminal device performs configuration based on the content included in the second handover information in operation S315 in Embodiment 3. A difference lies in that the terminal device establishes the target MCG RLC bearer and/or the target SCG RLC bearer herein.

In some embodiments, if the terminal device extracts the bearer type indication information from the second handover information, the terminal device may determine, based on the bearer type indication information, whether the terminal device is to receive, by using only the target SCG bearer or the target MCG RLC bearer, the fourth data sent by the target master node or is to receive, by using both the target SCG bearer and the MCG RLC bearer, the data sent by the target master node.

S420: The terminal device continues, in the process of the node handover, to receive the second data.

In some embodiments, in the process of the DC handover, the terminal device may continue to receive, by using the source SCG RLC bearer and/or the source MCG RLC bearer, the second data sent by the source secondary node.

Further, after receiving the second data, the terminal device processes the second data by using a third PDCP entity, and delivers processed second data. For an example process, refer to the process of processing the second data based on the third PDCP entity and delivering the processed second data in operation S316 in Embodiment 3. Details are not described herein again.

S421: The terminal device continues, in the process of the node handover, to receive the fourth data.

In some embodiments, after determining to perform uninterrupted DC handover, the terminal device may initiate a random access request to the target master node and the target secondary node based on the first random access resource and the second random access resource that are included in the third handover information. In some embodiments, the terminal device may access the target master node and the target secondary node in a manner such as contention-based random access, contention-free random access, two-step random access, or random access-less. After determining, based on a status such as current network load, to allow access of the terminal device, the target master node and the target secondary node each may send a random access response to the terminal device, and further complete an access operation of the terminal device.

After receiving the access responses sent by the target master node and the target secondary node and determining that the terminal device successfully accesses the target master node and the target secondary node, the terminal device may receive, by using the target SCG RLC bearer and/or the target MCG RLC bearer, the fourth data sent by the target master node. Then, the terminal device may process the received fourth data by using the third PDCP entity, and deliver processed fourth data. For an example process, refer to the process in which the terminal device processes, by using the third PDCP entity, the fourth data received by the terminal device, and delivers the processed fourth data in operation S317 in Embodiment 3. Details are not described herein again.

S422: If the target master node determines that the terminal device successfully accesses the target master node and the target secondary node, the target master node generates handover complete indication information.

In some embodiments, if the target master node determines that the terminal device has successfully accessed the target master node and the target secondary node, and the terminal device correctly receives the fourth data, the target master node may generate the handover complete indication information. The handover complete indication information indicates that the uninterrupted node handover for the first radio bearer has been completed.

S423: The target master node sends the handover complete indication information to the source master node.

In some embodiments, after generating the handover complete indication information, the target master node may send the handover complete indication information to the source master node and the target secondary node, to indicate that the DC handover has been completed.

S424: The source master node receives the handover complete indication information, and stops data transmission that is between the source master node and the terminal device and that is based on the first radio bearer.

In some embodiments, after receiving the handover complete indication information, the source master node may release the source secondary node and the terminal device. To be specific, the source master node may release or delete a configuration used or a resource occupied to establish dual connectivity with the source secondary node and the terminal device.

S425: The source master node sends the handover complete indication information to the source secondary node and the terminal device.

S426: The source secondary node receives the handover complete indication information, and stops data transmission that is between the source secondary node and the terminal device and that is based on the first radio bearer.

In some embodiments, after detecting and receiving the handover complete indication information, the source secondary node may determine that the uninterrupted DC handover for the first radio bearer has been completed. Then, the source secondary node may stop the data transmission that is between the source secondary node and the terminal device and that is based on the first radio bearer. It should be noted that, if there is still buffered second data when the source secondary node determines that the uninterrupted node handover for the first radio bearer has been completed, the source secondary node may continue to send the second data, and does not stop data transmission between the source secondary node and the terminal device until sending of the last data packet is completed. Further, the source secondary node may further release or delete resources, for example, a protocol entity and a radio bearer, related to the terminal device.

S427: The terminal device receives the handover complete indication information, and stops data transmission that is based on the first radio bearer.

In some embodiments, after receiving the handover complete indication information, the terminal device may determine that the uninterrupted node handover for the first radio bearer has been completed, and may stop receiving data from the source master node and/or the source secondary node. Further, the terminal device may further release or delete a connection to the source master node and/or a connection to the source secondary node. Specifically, the terminal device may release or delete resources such as an air interface link between the terminal device and the source master node and/or an air interface link between the terminal device and the source secondary node, and a radio bearer.

Further, after determining that the DC handover has been completed, the source master node may send the path switching information to the core network. The path switching information notifies the core network that a receiver of the downlink data of the core network may be handed over from the source master node to the target master node. Herein, the path switching information may further include a third data forwarding address provided by the target master node. The third data forwarding address is used by the core network to send the downlink data to the target master node. After receiving the path switching information, the core network may send the transmission termination information to the source master node, and stop sending new downlink data to the source master node. The transmission termination information notifies the source master node to stop receiving the new downlink data from the core network. Then, the core network may start, by using the third data forwarding address, to send the new downlink data to the target master node.

It should be additionally noted that the procedure provided in this embodiment is alternatively applicable to a scenario in which "due to the node handover, a user plane connection between an access network device and a core network changes from being terminated at the secondary node before the handover to being terminated at the target secondary node after the handover". In this scenario, before the node handover, the source secondary node obtains first data from the core network, obtains second data through processing, and sends the second data to a terminal device by using an SCG RLC bearer associated with the source secondary node and/or an MCG RLC bearer on the source master node and associated with the source secondary node. In a process of the node handover, the source secondary node still sends the second data to the terminal device by using the SCG RLC bearer associated with the source secondary node and/or the MCG RLC bearer on the source master node and associated with the source secondary node. In addition, the source secondary node may further process the first data received by the source secondary node into third data, and then forward the third data to the target secondary node. Then, the target secondary node sends the third data to the terminal device by using an SCG RLC bearer associated with the target secondary node and/or an MCG RLC bearer on the target secondary node and associated with the target secondary node. After the node handover, the source secondary node stops sending, to the terminal device by using the SCG RLC bearer associated with the source secondary node and/or the MCG RLC on the source master node and associated with the source secondary node, the data obtained by the source secondary node from the core network. The target secondary node continues to send, to the terminal device by using the SCG RLC bearer associated with the target secondary node and/or the MCG RLC on the source master node and associated with the target secondary node, the data obtained by the target secondary node from the core network. Herein, for details of an example configuration process of the source secondary node, the target master node, the target secondary node, and the terminal device, refer to the foregoing descriptions. Details are not described herein again.

According to the DC handover method provided in this embodiment, it is ensured that, in the process of the DC handover, the first data that is to be sent to the terminal device by using the first radio bearer originally can be transmitted to the terminal device via both the source master node and/or the source secondary node and the target master node and/or the target secondary node, and be correctly received by the terminal device, so that interruption that is due to the DC handover and that is of transmission of the first data between the core network and the terminal device does not occur, a problem such as a service delay caused by the data transmission interruption caused by the DC handover is resolved, applicability and practicability of the DC handover method are improved, and user experience of the terminal device is also improved.

Figure 11:
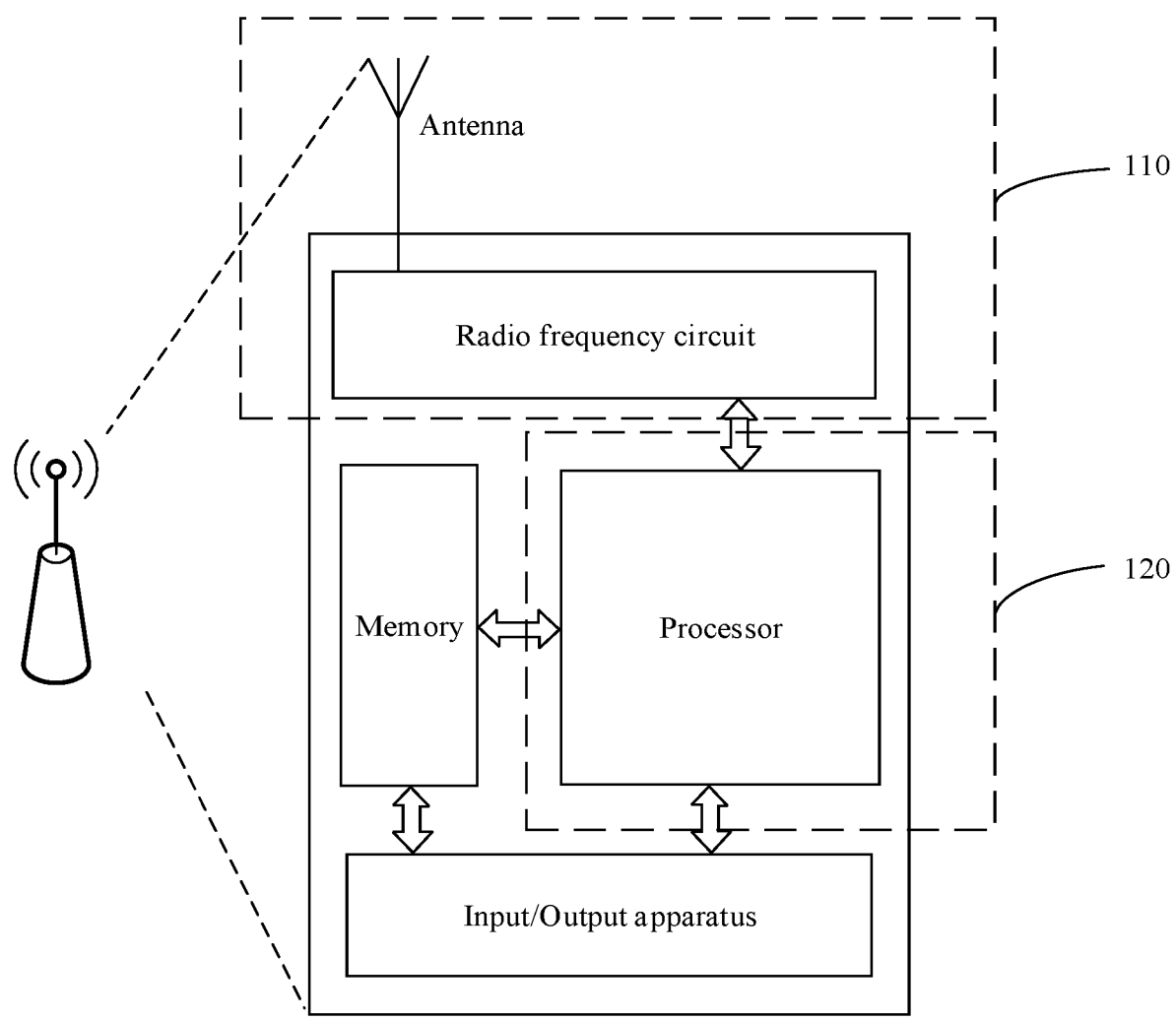
FIG. 11 is a schematic diagram of a structure of an apparatus according to an embodiment of this application.

FIG. 11 is a schematic diagram of a structure of an apparatus according to an embodiment of this application. The apparatus may be the source secondary node in Embodiment 1, Embodiment 2, or Embodiment 4, and the apparatus may be configured to perform the function of the source secondary node in Embodiment 1, Embodiment 2, or Embodiment 4. For ease of description, FIG. 11 shows only main components of the apparatus. It can be learned from FIG. 11 that the apparatus includes a processor, a memory, a radio frequency circuit, an antenna, and an input/output apparatus. The processor is mainly configured to: process a communication protocol and communication data, control the apparatus, execute a software program, process data of the software program, and so on. The memory is mainly configured to store the software program and the data. The radio frequency circuit is mainly configured to perform conversion between a baseband signal and a radio frequency signal, and process the radio frequency signal. The antenna is mainly configured to send and receive a radio frequency signal in a form of an electromagnetic wave. The input/output apparatus, for example, a touchscreen, a display, or a keyboard, is mainly configured to receive data input by a user using the apparatus, and output data to the user. It should be noted that, in some scenarios, the communication device may not include the input/output apparatus.

When data is to be sent, the processor performs baseband processing on the to-be-sent data, and then outputs a baseband signal to the radio frequency circuit. After performing radio frequency processing on the baseband signal, the radio frequency circuit sends a radio frequency signal to the outside by using the antenna in a form of an electromagnetic wave. When data is sent to a terminal device, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 11 shows only one memory and one processor. In an actual apparatus product, there may be one or more processors and one or more memories. The memory may also be referred to as a storage medium, a storage device, or the like. The memory may be disposed independent of the processor, or may be integrated with the processor. This is not limited in this embodiment of this application.

In some embodiments, the processor may include a baseband processor and/or a central processing unit. The baseband processor is mainly configured to process the communication protocol and the communication data. The central processing unit is mainly configured to: control the entire terminal device, execute the software program, and process the data of the software program. Functions of the baseband processor and the central processing unit may be integrated into the processor in FIG. 11. A person skilled in the art may understand that the baseband processor and the central processing unit each may be an independent processor, and are interconnected by using a technology such as a bus. A person skilled in the art may understand that the terminal device may include a plurality of baseband processors to adapt to different network standards, the terminal device may include a plurality of central processing units to enhance processing capabilities of the terminal device, and components of the terminal device may be connected by using various buses. The foregoing baseband processor may alternatively be expressed as a baseband processing circuit or a baseband processing chip. The foregoing central processing unit may alternatively be expressed as a central processing circuit or a central processing chip. A function of processing the communication protocol and the communication data may be embedded in the processor, or may be stored in a storage unit in a form of a software program. The processor executes the software program to implement a baseband processing function.

In this embodiment of this application, the antenna and the radio frequency circuit that have sending and receiving functions may be considered as a transceiver unit of the apparatus, and the processor that has a processing function may be considered as a processing unit of the apparatus. As shown in FIG. 11, the apparatus includes a transceiver unit 110 and a processing unit 120. The transceiver unit herein may also be referred to as a transceiver, a transceiver apparatus, or the like. The processing unit may also be referred to as a processor, a processing board, a processing module, a processing apparatus, or the like. In some embodiments, a component that is in the transceiver unit 110 and that is configured to implement a receiving function may be considered as a receiving unit, and a component that is in the transceiver unit 110 and that is configured to implement a sending function may be considered as a sending unit. That is, the transceiver unit 110 includes the receiving unit and the sending unit. The receiving unit herein sometimes may also be referred to as a receiver, a receiver circuit, or the like. The sending unit sometimes may also be referred to as a transmitter, a transmitter circuit, or the like.

With reference to the content in Embodiment 1, in some embodiments, the transceiver unit 110 receives first handover information, and determines to perform uninterrupted node handover on a terminal device. The transceiver unit 110 receives first data sent from a core network via a first radio bearer. The processing unit 120 continues, in a process of the node handover, to perform first processing on the first data to obtain second data, and sends the second data to the terminal device by using the transceiver unit 110. The first processing includes sequence number assignment and performing data encryption and/or integrity protection based on a first key. The processing unit 120 continues, in the process of the node handover, to perform second processing on the first data to obtain third data, and sends the third data to a target secondary node by using the transceiver unit 110.

In a possible embodiment, the transceiver unit 110 is configured to receive handover complete indication information, where the handover complete indication information indicates that the terminal device successfully accesses the target secondary node. The processing unit 120 is further configured to stop data transmission that is between the apparatus and the terminal device and that is based on the first radio bearer.

In a possible embodiment, the transceiver unit 110 is further configured to:
send the second data to the terminal device by using a source secondary cell group SCG radio link control RLC bearer and/or a first master cell group MCG RLC bearer.

In a possible embodiment, the transceiver unit 110 is further configured to:
send fourth data to the terminal device by using a first target SCG RLC bearer and/or a second MCG RLC bearer.

In a possible embodiment, the transceiver unit 110 is configured to send the third data to a master node.

The processing unit 120 is configured to perform third processing on the third data by using the master node, to obtain fifth data.

The transceiver unit 110 is configured to send the fourth data to the target secondary node, where the fourth data is a part or all of the fifth data.

In a possible embodiment, the transceiver unit 110 is further configured to:
send the fourth data to the terminal device by using a second target SCG RLC bearer.

In a possible embodiment, the transceiver unit 110 is further configured to:
send sixth data to the terminal device by using a third MCG RLC bearer, where the sixth data is a part or all of the fifth data.

In a possible embodiment, the handover complete indication information is from the master node or the target secondary node.

It should be additionally noted that, similarly, an example process of the node handover method performed by the transceiver unit 110 and the processing unit 120 in Embodiment 2 or Embodiment 4 is generally similar to the process of the node handover method performed by the transceiver unit 110 and the processing unit 120 in Embodiment 1. For an example execution process, refer to the operations of the node handover method performed by the source secondary node in Embodiment 2 or Embodiment 4. Details are not described herein again.

Figure 12:
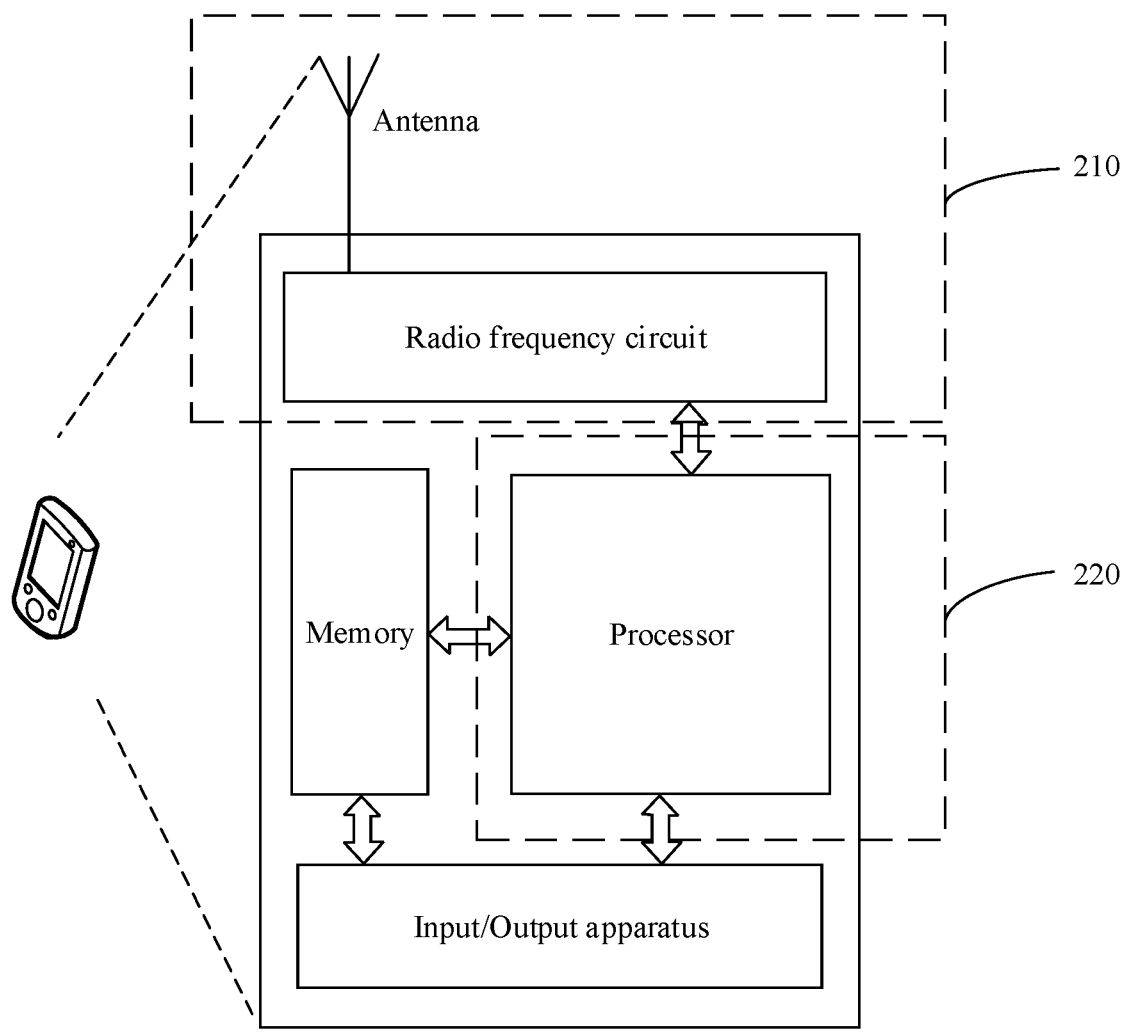
FIG. 12 is another schematic diagram of a structure of an apparatus according to an embodiment of this application.

FIG. 12 is another schematic diagram of a structure of an apparatus according to an embodiment of this application. The apparatus may be the terminal device in Embodiment 1, Embodiment 2, Embodiment 3, or Embodiment 4, and the apparatus may be configured to perform the function of the terminal device in Embodiment 1, Embodiment 2, Embodiment 3, or Embodiment 4. For ease of description, FIG. 12 shows only main components of the apparatus. It can be learned from FIG. 12 that the apparatus includes a processor, a memory, a radio frequency circuit, an antenna, and an input/output apparatus. The apparatus shown in FIG. 12 is similar to the apparatus shown in FIG. 11 in structure. For example content, refer to the foregoing description of the apparatus in FIG. 11. Details are not described herein again.

In this embodiment of this application, the antenna and the radio frequency circuit that have sending and receiving functions may be considered as a transceiver unit of the apparatus, and the processor that has a processing function may be considered as a processing unit of the apparatus. As shown in FIG. 12, the apparatus includes a transceiver unit 210 and a processing unit 220. The transceiver unit herein may also be referred to as a transceiver, a transceiver apparatus, or the like. The processing unit may also be referred to as a processor, a processing board, a processing module, a processing apparatus, or the like. In some embodiments, a component that is in the transceiver unit 210 and that is configured to implement a receiving function may be considered as a receiving unit, and a component that is in the transceiver unit 210 and that is configured to implement a sending function may be considered as a sending unit. That is, the transceiver unit 210 includes the receiving unit and the sending unit. The receiving unit herein sometimes may also be referred to as a receiver, a receiver circuit, or the like. The sending unit sometimes may also be referred to as a transmitter, a transmitter circuit, or the like.

With reference to the content in Embodiment 1, in some embodiments, the transceiver unit 210 is configured to receive second handover information, and determine to perform uninterrupted node handover. The transceiver unit 210 is further configured to continue, in a process of the uninterrupted node handover, to receive second data sent by a source secondary node. The transceiver unit 210 is further configured to receive, in the process of the uninterrupted node handover, fourth data sent by a target secondary node.

In some embodiments, the transceiver unit 210 is further configured to:
continue, in the process of the uninterrupted node handover, to receive, by using a first MCG RLC bearer and/or a source SCG RLC bearer, the second data sent by the source secondary node.

In some embodiments, the second handover information further indicates the terminal device to stop receiving the second data by using the source SCG RLC bearer and receive the second data by using the first MCG RLC bearer.

In some embodiments, the apparatus further includes:
the processing unit 220, configured to perform data decryption and/or integrity protection verification on the second data based on a first key associated with the source secondary node.

In some embodiments, the transceiver unit 210 is further configured to:
receive, by using a first target SCG RLC bearer and/or a second MCG RLC bearer in the process of the uninterrupted node handover, the fourth data sent by the target secondary node.

In some embodiments, the second handover information includes first bearer configuration information and/or second bearer configuration information, and the processing unit 220 is further configured to:
establish the first target SCG RLC bearer based on the first bearer configuration information, and/or establish the second MCG RLC bearer based on the second bearer configuration information.

In some embodiments, the second handover information further includes first security information, the first security information indicates a second key associated with the target secondary node, and the processing unit 220 is further configured to:
perform data decryption and/or integrity protection verification on the fourth data based on the second key.

In some embodiments, the transceiver unit 210 is further configured to:
receive, by using a second target SCG RLC bearer in the process of the uninterrupted node handover, the fourth data sent by the target secondary node.

In some embodiments, the transceiver unit 210 is further configured to:
receive, by using a third MCG RLC bearer in the process of the uninterrupted node handover, sixth data sent by a master node.

In some embodiments, the second handover information includes third bearer configuration information and/or fourth bearer configuration information, and the processing unit 220 is further configured to:
establish the third MCG RLC bearer based on the third bearer configuration information, and/or establish the second target SCG RLC bearer based on the fourth bearer configuration information.

In some embodiments, the second handover information includes second security information, the second security information indicates a third key associated with the master node, and the processing unit 220 is further configured to:
perform data decryption and/or integrity protection verification on the fourth data and/or the sixth data based on the third key.

In some embodiments, the second data, the fourth data, or the sixth data is associated with a first radio bearer, and the first radio bearer is a radio bearer between the source secondary node and the terminal device.

In some embodiments, the transceiver unit 210 is further configured to:
receive handover complete indication information, where the handover complete indication information is from the master node or the target secondary node; and
stop receiving data that is on the first radio bearer and that is sent by the source secondary node.

It should be additionally noted that, similarly, an example process of the node handover method performed by the transceiver unit 210 and the processing unit 220 in Embodiment 2, Embodiment 3, or Embodiment 4 is generally similar to the process of the node handover method performed by the transceiver unit 210 and the processing unit 220 in Embodiment 1. For an example execution process, refer to the operations of the node handover method performed by the terminal device in Embodiment 2, Embodiment 3, or Embodiment 4. Details are not described herein again.

Figure 13:
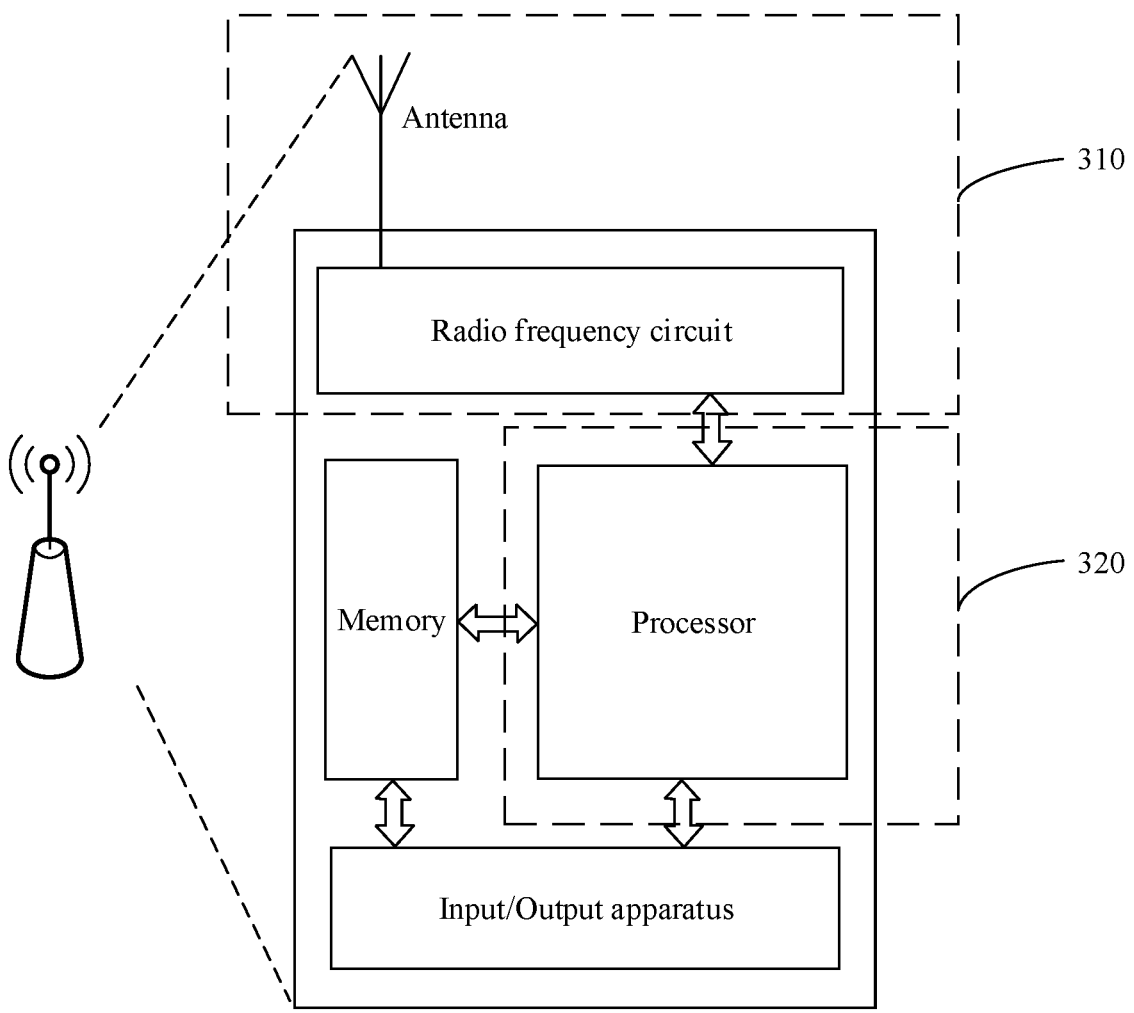
FIG. 13 is another schematic diagram of a structure of an apparatus according to an embodiment of this application.

FIG. 13 is another schematic diagram of a structure of an apparatus according to an embodiment of this application. The apparatus may be the target secondary node in Embodiment 1, Embodiment 2, or Embodiment 4, and the apparatus may be configured to perform the function of the target secondary node in Embodiment 1, Embodiment 2, or Embodiment 4. For ease of description, FIG. 13 shows only main components of the apparatus. It can be learned from FIG. 13 that the apparatus includes a processor, a memory, a radio frequency circuit, an antenna, and an input/output apparatus. The processor is mainly configured to: process a communication protocol and communication data, control the apparatus, execute a software program, process data of the software program, and so on. The memory is mainly configured to store the software program and the data. The radio frequency circuit is mainly configured to perform conversion between a baseband signal and a radio frequency signal, and process the radio frequency signal. The antenna is mainly configured to send and receive a radio frequency signal in a form of an electromagnetic wave. The input/output apparatus, for example, a touchscreen, a display, or a keyboard, is mainly configured to receive data input by a user using the apparatus, and output data to the user. It should be noted that, in some scenarios, the communication device may not include the input/output apparatus.

When data is to be sent, the processor performs baseband processing on the to-be-sent data, and then outputs a baseband signal to the radio frequency circuit. After performing radio frequency processing on the baseband signal, the radio frequency circuit sends a radio frequency signal to the outside by using the antenna in a form of an electromagnetic wave. When data is sent to a terminal device, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 13 shows only one memory and one processor. In an actual apparatus product, there may be one or more processors and one or more memories. The memory may also be referred to as a storage medium, a storage device, or the like. The memory may be disposed independent of the processor, or may be integrated with the processor. This is not limited in this embodiment of this application.

In some embodiments, the processor may include a baseband processor and/or a central processing unit. The baseband processor is mainly configured to process the communication protocol and the communication data. The central processing unit is mainly configured to: control the entire terminal device, execute the software program, and process the data of the software program. Functions of the baseband processor and the central processing unit may be integrated into the processor in FIG. 13. A person skilled in the art may understand that the baseband processor and the central processing unit each may be an independent processor, and are interconnected by using a technology such as a bus. A person skilled in the art may understand that the terminal device may include a plurality of baseband processors to adapt to different network standards, the terminal device may include a plurality of central processing units to enhance processing capabilities of the terminal device, and components of the terminal device may be connected by using various buses. The foregoing baseband processor may alternatively be expressed as a baseband processing circuit or a baseband processing chip. The foregoing central processing unit may alternatively be expressed as a central processing circuit or a central processing chip. A function of processing the communication protocol and the communication data may be embedded in the processor, or may be stored in a storage unit in a form of a software program. The processor executes the software program to implement a baseband processing function.

In this embodiment of this application, the antenna and the radio frequency circuit that have sending and receiving functions may be considered as a transceiver unit of the apparatus, and the processor that has a processing function may be considered as a processing unit of the apparatus. As shown in FIG. 13, the apparatus includes a transceiver unit 310 and a processing unit 320. The transceiver unit herein may also be referred to as a transceiver, a transceiver apparatus, or the like. The processing unit may also be referred to as a processor, a processing board, a processing module, a processing apparatus, or the like. In some embodiments, a component that is in the transceiver unit 310 and that is configured to implement a receiving function may be considered as a receiving unit, and a component that is in the transceiver unit 310 and that is configured to implement a sending function may be considered as a sending unit. That is, the transceiver unit 310 includes the receiving unit and the sending unit. The receiving unit herein sometimes may also be referred to as a receiver, a receiver circuit, or the like. The sending unit sometimes may also be referred to as a transmitter, a transmitter circuit, or the like.

With reference to Embodiment 1, in some embodiments, the transceiver unit 310 is configured to receive third handover information, and determine to perform uninterrupted node handover on a terminal device. The transceiver unit 310 is further configured to send fourth data to the terminal device in a process of the uninterrupted node handover.

In some embodiments, before the fourth data is sent to the terminal device,
the transceiver unit 310 is further configured to receive third data sent by a source secondary node; and
the apparatus further includes:
the processing unit 320, configured to perform data encryption and/or integrity protection on the third data based on a second key, to obtain the fourth data.

In some embodiments, the transceiver unit 310 is further configured to:
send the fourth data to the terminal device by using a first target SCG RLC bearer and/or a second MCG RLC bearer in the process of the uninterrupted node handover.

In some embodiments, the processing unit 320 is further configured to:
establish the first target SCG RLC bearer.

In some embodiments, the transceiver unit 310 is further configured to:
send handover response information for the third handover information, where the handover response information includes first security information, the first security information indicates the second key, and the second key is used by the terminal device to perform data decryption and/or integrity protection verification on the fourth data.

In some embodiments, before sending the fourth data to the terminal device, the transceiver unit 310 is further configured to:
receive the fourth data sent by a master node, where the fourth data is a part or all of fifth data obtained by the master node by performing data encryption and integrity protection on the third data by using a third key associated with the master node.

In some embodiments, the transceiver unit 310 is further configured to:
send the fourth data to the terminal device by using a second target SCG RLC bearer.

In some embodiments, the processing unit 320 is further configured to determine that the terminal device successfully accesses the target secondary node.

The transceiver unit 310 is further configured to send handover complete indication information to the master node and/or the terminal device.

It should be additionally noted that, similarly, for an example process of the node handover method performed by the transceiver unit 310 and the processing unit 320 in Embodiment 2 or Embodiment 4, generally refer to the process of the node handover method performed by the transceiver unit 310 and the processing unit 320 in Embodiment 1. For example content, refer to the operations of the node handover method performed by the target secondary node in Embodiment 2 or Embodiment 4. Details are not described herein again.

Figure 14:
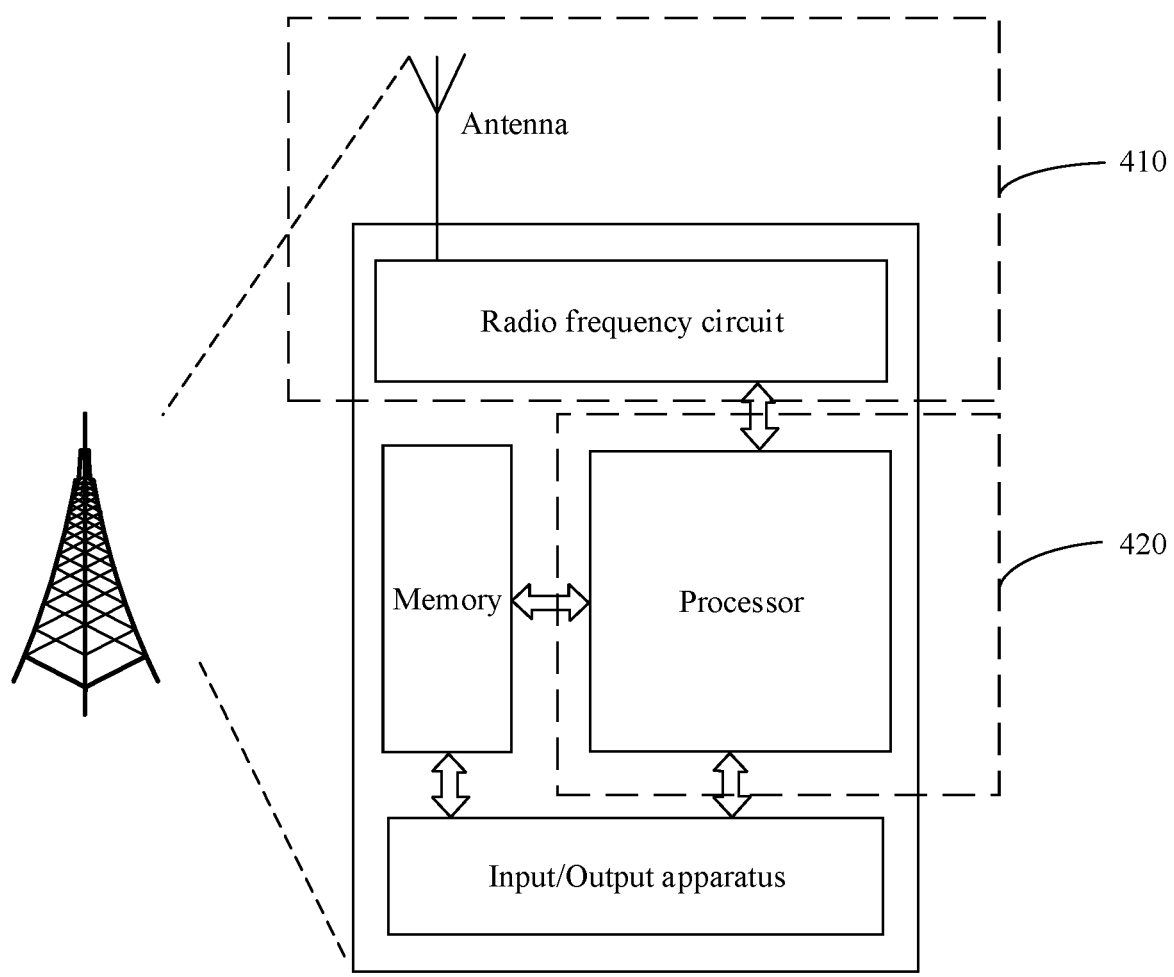
FIG. 14 is another schematic diagram of a structure of an apparatus according to an embodiment of this application.

FIG. 14 is another schematic diagram of a structure of an apparatus according to an embodiment of this application. The apparatus may be the master node in Embodiment 1 or Embodiment 2, and the apparatus may be configured to perform the function of the master node in Embodiment 1 or Embodiment 2. For ease of description, FIG. 14 shows only main components of the apparatus. It can be learned from FIG. 14 that the apparatus includes a processor, a memory, a radio frequency circuit, an antenna, and an input/output apparatus. The apparatus shown in FIG. 14 is similar to the apparatus shown in FIG. 10A to FIG. 10C in structure. For example content, refer to the foregoing description of the apparatus in FIG. 10A to FIG. 10C. Details are not described herein again.

In this embodiment of this application, the antenna and the radio frequency circuit that have sending and receiving functions may be considered as a transceiver unit of the apparatus, and the processor that has a processing function may be considered as a processing unit of the apparatus. As shown in FIG. 14, the apparatus includes a transceiver unit 410 and a processing unit 420. The transceiver unit herein may also be referred to as a transceiver, a transceiver apparatus, or the like. The processing unit may also be referred to as a processor, a processing board, a processing module, a processing apparatus, or the like. In some embodiments, a component that is in the transceiver unit 410 and that is configured to implement a receiving function may be considered as a receiving unit, and a component that is in the transceiver unit 410 and that is configured to implement a sending function may be considered as a sending unit. That is, the transceiver unit 410 includes the receiving unit and the sending unit. The receiving unit herein sometimes may also be referred to as a receiver, a receiver circuit, or the like. The sending unit sometimes may also be referred to as a transmitter, a transmitter circuit, or the like.

With reference to Embodiment 1, in some embodiments, the processing unit 420 is configured to determine to perform uninterrupted node handover on a terminal device.

The transceiver unit 410 is configured to send first handover information to a source secondary node, where the first handover information indicates the source secondary node to perform first processing on first data to obtain second data and perform second processing on the first data to obtain third data in a process of the uninterrupted node handover, the first data is data that is on a first radio bearer and that is received by the source secondary node from a core network, the first processing includes sequence number assignment and performing data encryption and/or integrity protection based on a first key corresponding to the source secondary base station, and the second processing includes the sequence number assignment.

The transceiver unit 410 is further configured to send third handover information to a target secondary node, where the third handover information indicates the target secondary node to send fourth data to the terminal device in the process of the uninterrupted node handover; and the fourth data is data obtained by performing third processing on the third data by the target secondary node, where the third processing includes performing encryption and/or integrity protection based on a second key corresponding to the target secondary base station; or the fourth data is data obtained by performing third processing on the third data by the master node and sent to the target secondary node by the master node, where the third processing includes performing data encryption and/or integrity protection based on a third key corresponding to the master base station.

The transceiver unit 410 is further configured to send second handover information to the terminal device, where the second handover information indicates the terminal device to continue, in the process of the uninterrupted node handover, to receive the second data sent by the source secondary node and receive the fourth data sent by the target secondary node.

In some embodiments, the transceiver unit 410 is further configured to:
  receive the second data sent by the source secondary node; and
  send the second data to the terminal device by using a first MCG RLC bearer.

In some embodiments, the transceiver unit 310 is further configured to:
  receive handover response information that is sent by the target secondary node and that is for the third handover information, where the handover response information includes first security information, the first security information indicates the second key, and the second key is used by the terminal device to perform data decryption and/or integrity protection verification on the fourth data.

In some embodiments, the transceiver unit 410 is further configured to:
  receive the fourth data sent by the target secondary node; and
  send the fourth data to the terminal device by using a second MCG RLC bearer.

In some embodiments, the processing unit 420 is further configured to:
  establish the second MCG RLC bearer.

In some embodiments, the transceiver unit 410 is further configured to receive the third data sent by the source secondary node.

The processing unit 420 is further configured to perform data encryption and/or integrity protection on the third data based on the third key, to obtain fifth data.

The transceiver unit 410 is further configured to send sixth data to the terminal device by using a third MCG RLC bearer, and/or send the fourth data to the terminal device by using a second target SCG RCL bearer, where the fourth data and the sixth data are a part or all of the fifth data.

In some embodiments, the processing unit 420 is further configured to:
  establish the third MCG RLC bearer.

In some embodiments, the transceiver unit 410 is further configured to:
  receive handover complete indication information sent by the target secondary node, and send the handover complete indication information to the source secondary node, where the handover complete indication information indicates that the terminal device successfully accesses the target secondary node.

It should be additionally noted that, similarly, for an example process of the node handover method performed by the transceiver unit 410 and the processing unit 420 in Embodiment 2, generally refer to the process of the node handover method performed by the transceiver unit 410 and the processing unit 420 in Embodiment 1. For example content, refer to the operations of the node handover method performed by the source master node in Embodiment 2. Details are not described herein again.

Figure 15:
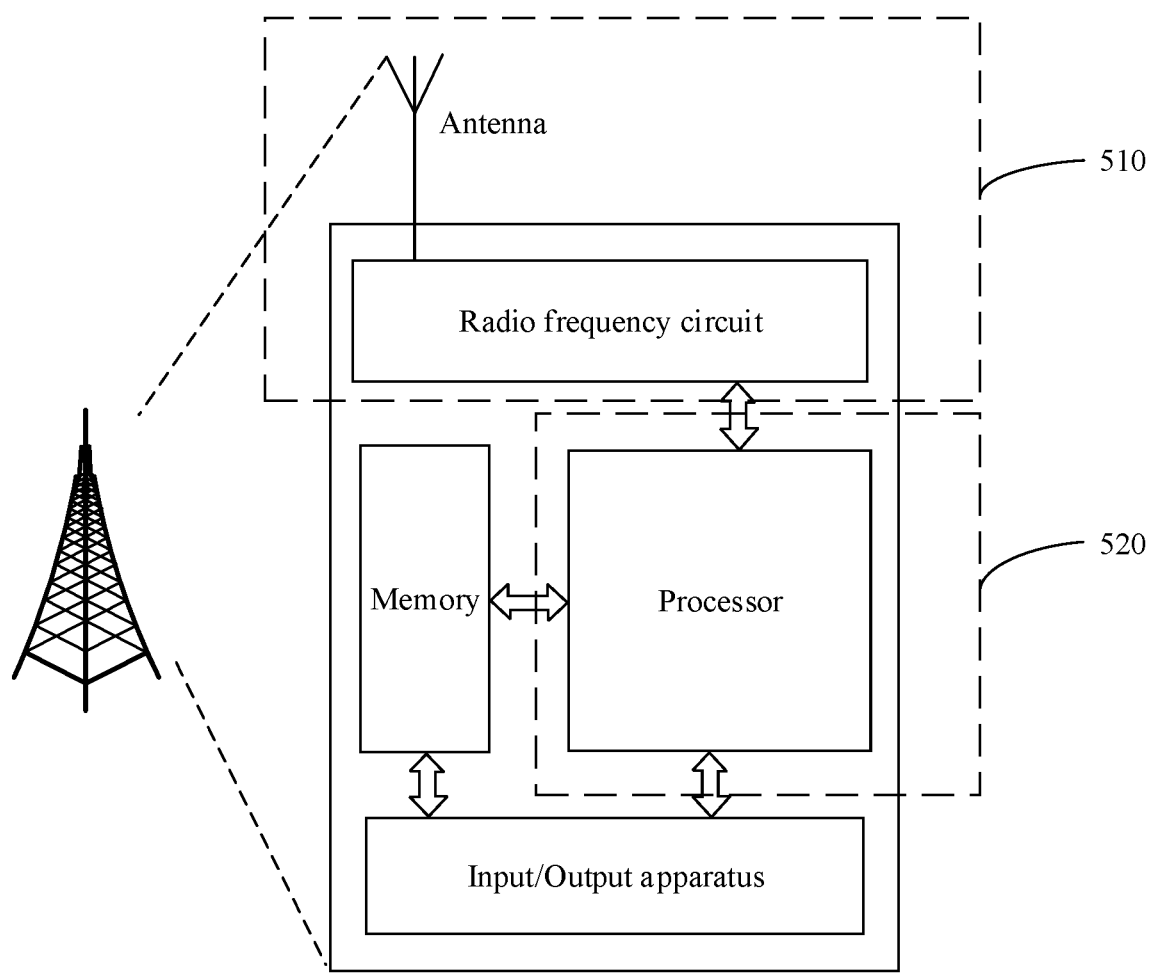
FIG. 15 is another schematic diagram of a structure of an apparatus according to an embodiment of this application.

FIG. 15 is another schematic diagram of a structure of an apparatus according to an embodiment of this application. The apparatus may be the source master node in Embodiment 3 or Embodiment 4, and the apparatus may be configured to perform the function of the source master node in Embodiment 3 or Embodiment 4. For ease of description, FIG. 15 shows only main components of the apparatus. It can be learned from FIG. 15 that the apparatus includes a processor, a memory, a radio frequency circuit, an antenna, and an input/output apparatus. The processor is mainly configured to: process a communication protocol and communication data, control the apparatus, execute a software program, process data of the software program, and so on. The memory is mainly configured to store the software program and the data. The radio frequency circuit is mainly configured to perform conversion between a baseband signal and a radio frequency signal, and process the radio frequency signal. The antenna is mainly configured to send and receive a radio frequency signal in a form of an electromagnetic wave. The input/output apparatus, for example, a touchscreen, a display, or a keyboard, is mainly configured to receive data input by a user using the apparatus, and output data to the user. It should be noted that, in some scenarios, the communication device may not include the input/output apparatus.

When data is to be sent, the processor performs baseband processing on the to-be-sent data, and then outputs a baseband signal to the radio frequency circuit. After performing radio frequency processing on the baseband signal, the radio frequency circuit sends a radio frequency signal to the outside by using the antenna in a form of an electromagnetic wave. When data is sent to a terminal device, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 15 shows only one memory and one processor. In an actual apparatus product, there may be one or more processors and one or more memories. The memory may also be referred to as a storage medium, a storage device, or the like. The memory may be disposed independent of the processor, or may be integrated with the processor. This is not limited in this embodiment of this application.

In some embodiments, the processor may include a baseband processor and/or a central processing unit. The baseband processor is mainly configured to process the communication protocol and the communication data. The central processing unit is mainly configured to: control the entire terminal device, execute the software program, and process the data of the software program. Functions of the baseband processor and the central processing unit may be integrated into the processor in FIG. 15. A person skilled in the art may understand that the baseband processor and the central processing unit each may be an independent processor, and are interconnected by using a technology such as a bus. A person skilled in the art may understand that the terminal device may include a plurality of baseband processors to adapt to different network standards, the terminal device may include a plurality of central processing units to enhance processing capabilities of the terminal device, and components of the terminal device may be connected by using various buses. The foregoing baseband processor may alternatively be expressed as a baseband processing circuit or a baseband processing chip. The foregoing central processing unit may alternatively be expressed as a central processing circuit or a central processing chip. A function of processing the communication protocol and the communication data may be embedded in the processor, or may be stored in a storage unit in a form of a software program. The processor executes the software program to implement a baseband processing function.

In this embodiment of this application, the antenna and the radio frequency circuit that have sending and receiving functions may be considered as a transceiver unit of the apparatus, and the processor that has a processing function may be considered as a processing unit of the apparatus. As shown in FIG. 15, the apparatus includes a transceiver unit 510 and a processing unit 520. The transceiver unit herein may also be referred to as a transceiver, a transceiver apparatus, or the like. The processing unit may also be referred to as a processor, a processing board, a processing module, a processing apparatus, or the like. In some embodiments, a component that is in the transceiver unit 510 and that is configured to implement a receiving function may be considered as a receiving unit, and a component that is in the transceiver unit 510 and that is configured to implement a sending function may be considered as a sending unit. That is, the transceiver unit 510 includes the receiving unit and the sending unit. The receiving unit herein sometimes may also be referred to as a receiver, a receiver circuit, or the like. The sending unit sometimes may also be referred to as a transmitter, a transmitter circuit, or the like.

With reference to Embodiment 3, in some embodiments, the transceiver unit 510 is configured to determine to perform uninterrupted node handover on a terminal device. The transceiver unit 510 is configured to send third handover information to a target master node. The transceiver unit 510 is further configured to send second handover information to the terminal device. The transceiver unit 510 is configured to receive first data sent from a core network via a first radio bearer. The processing unit 520 is configured to: continue, in a process of the node handover, to perform first processing on the first data to obtain second data, and send the second data to the terminal device by using the transceiver unit 510. The processing unit 520 is further configured to perform second processing on the first data to obtain third data in the process of the node handover, and send the third data to the target master node by using the transceiver unit 510.

In some embodiments, the transceiver unit 510 is configured to receive handover complete indication information, where the handover complete indication information indicates that the terminal device successfully accesses a target secondary node. The processing unit 520 is configured to stop data transmission that is between the apparatus and the terminal device and that is based on the first radio bearer.

In some embodiments, the transceiver unit 510 is configured to send the second data to the terminal device by using a first SCG RLC bearer and/or a source MCG RLC bearer.

In some embodiments, the second data or fourth data is associated with the first radio bearer, and the first radio bearer is a radio bearer between the source master node and the terminal device.

It should be additionally noted that, similarly, for an example process of the node handover method performed by the transceiver unit 510 and the processing unit 520 in Embodiment 4, generally refer to the process of the node handover method performed by the transceiver unit 510 and the processing unit 520 in Embodiment 3. For example content, refer to the operations of the node handover method performed by the source master node in Embodiment 4. Details are not described herein again.

Figure 16:
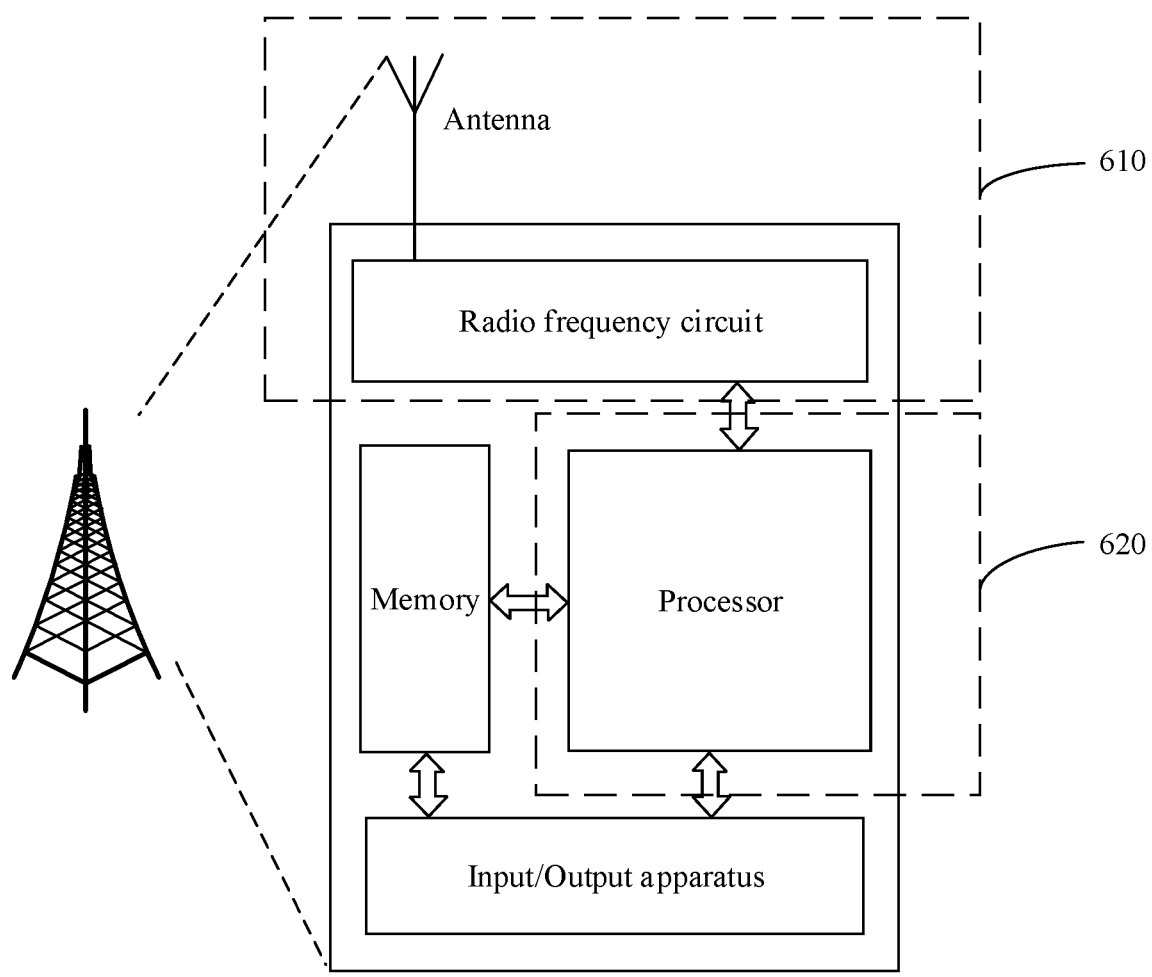
FIG. 16 is another schematic diagram of a structure of an apparatus according to an embodiment of this application.

FIG. 16 is another schematic diagram of a structure of an apparatus according to an embodiment of this application. The apparatus may be the target master node in Embodiment 3 or Embodiment 4, and the apparatus may be configured to perform the function of the target master node in Embodiment 3 or Embodiment 4. For ease of description, FIG. 16 shows only main components of the apparatus. It can be learned from FIG. 16 that the apparatus includes a processor, a memory, a radio frequency circuit, an antenna, and an input/output apparatus. The processor is mainly configured to: process a communication protocol and communication data, control the apparatus, execute a software program, process data of the software program, and so on. The memory is mainly configured to store the software program and the data. The radio frequency circuit is mainly configured to perform conversion between a baseband signal and a radio frequency signal, and process the radio frequency signal. The antenna is mainly configured to send and receive a radio frequency signal in a form of an electromagnetic wave. The input/output apparatus, for example, a touchscreen, a display, or a keyboard, is mainly configured to receive data input by a user using the apparatus, and output data to the user. It should be noted that, in some scenarios, the communication device may not include the input/output apparatus.

When data is to be sent, the processor performs baseband processing on the to-be-sent data, and then outputs a baseband signal to the radio frequency circuit. After performing radio frequency processing on the baseband signal, the radio frequency circuit sends a radio frequency signal to the outside by using the antenna in a form of an electromagnetic wave. When data is sent to a terminal device, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 16 shows only one memory and one processor. In an actual apparatus product, there may be one or more processors and one or more memories. The memory may also be referred to as a storage medium, a storage device, or the like. The memory may be disposed independent of the processor, or may be integrated with the processor. This is not limited in this embodiment of this application.

In an embodiment, the processor may include a baseband processor and/or a central processing unit. The baseband processor is mainly configured to process the communication protocol and the communication data. The central processing unit is mainly configured to: control the entire terminal device, execute the software program, and process the data of the software program. Functions of the baseband processor and the central processing unit may be integrated into the processor in FIG. 16. A person skilled in the art may understand that the baseband processor and the central processing unit each may be an independent processor, and are interconnected by using a technology such as a bus. A person skilled in the art may understand that the terminal device may include a plurality of baseband processors to adapt to different network standards, the terminal device may include a plurality of central processing units to enhance processing capabilities of the terminal device, and components of the terminal device may be connected by using various buses. The foregoing baseband processor may alternatively be expressed as a baseband processing circuit or a baseband processing chip. The foregoing central processing unit may alternatively be expressed as a central processing circuit or a central processing chip. A function of processing the communication protocol and the communication data may be embedded in the processor, or may be stored in a storage unit in a form of a software program. The processor executes the software program to implement a baseband processing function.

In this embodiment of this application, the antenna and the radio frequency circuit that have sending and receiving functions may be considered as a transceiver unit of the apparatus, and the processor that has a processing function may be considered as a processing unit of the apparatus. As shown in FIG. 16, the apparatus includes a transceiver unit 610 and a processing unit 620. The transceiver unit herein may also be referred to as a transceiver, a transceiver apparatus, or the like. The processing unit may also be referred to as a processor, a processing board, a processing module, a processing apparatus, or the like. In some embodiments, a component that is in the transceiver unit 610 and that is configured to implement a receiving function may be considered as a receiving unit, and a component that is in the transceiver unit 610 and that is configured to implement a sending function may be considered as a sending unit. That is, the transceiver unit 610 includes the receiving unit and the sending unit. The receiving unit herein sometimes may also be referred to as a receiver, a receiver circuit, or the like. The sending unit sometimes may also be referred to as a transmitter, a transmitter circuit, or the like.

With reference to Embodiment 3, the transceiver unit 610 is configured to receive third handover information, and the processing unit 620 is configured to determine to perform uninterrupted node handover on a terminal device. The transceiver unit 610 is further configured to receive third data, and send fourth data to the terminal device.

In an embodiment, the transceiver unit 610 sends the fourth data to the terminal device by using a target MCG RLC bearer and/or a second SCG RLC bearer.

In some embodiments, second data or the fourth data is associated with a first radio bearer, and the first radio bearer is a radio bearer between a source master node and the terminal device.

In an embodiment, the processing unit 620 is configured to perform data encryption and/or integrity protection on the third data based on a second key, to obtain the fourth data.

In an embodiment, the processing unit 620 is configured to determine that the terminal device successfully accesses the target master node, and the transceiver unit 610 is configured to send handover complete indication information to the source master node.

In an embodiment, the transceiver unit 610 is configured to send handover response information for the third handover information.

It should be additionally noted that, similarly, for an example process of the node handover method performed by the transceiver unit 610 and the processing unit 620 in Embodiment 4, generally refer to the process of the node handover method performed by the transceiver unit 610 and the processing unit 620 in Embodiment 3. For example content, refer to the operations of the node handover method performed by the source master node in Embodiment 4. Details are not described herein again.

Figure 17:
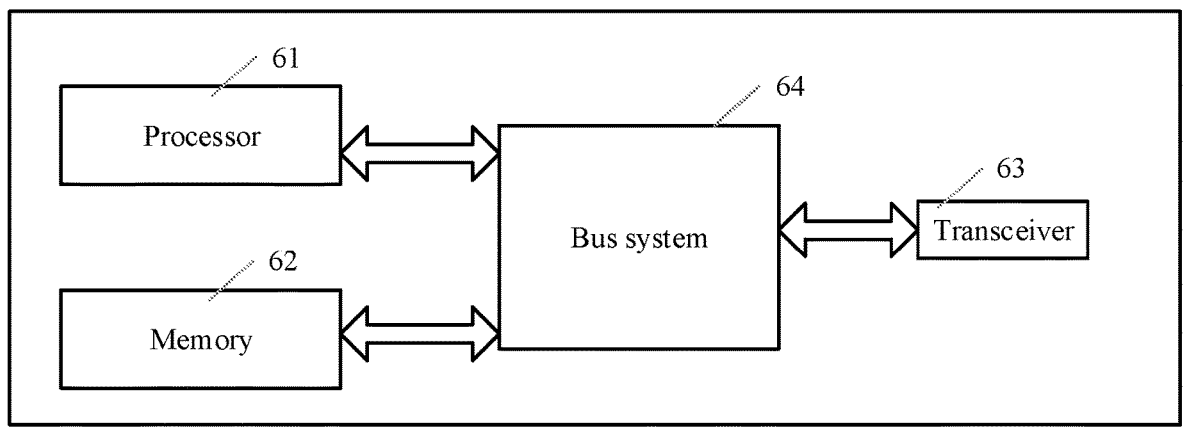
FIG. 17 is another schematic diagram of a structure of an apparatus according to an embodiment of this application.

FIG. 17 is another schematic diagram of a structure of an apparatus according to an embodiment of this application. The apparatus may be the source secondary node in Embodiment 1, Embodiment 2, or Embodiment 4, and the apparatus may be configured to implement the node handover method implemented by the source secondary node. The apparatus includes a processor 61, a memory 62, a transceiver 63, and a bus system 64.

The memory 62 includes but is not limited to a RAM, a ROM, an EPROM, or a CD-ROM. The memory 62 is configured to store related instructions and data. The memory 62 stores the following elements, an executable module or a data structure, a subset thereof, or an extended set thereof:

operation instructions, including various operation instructions and used to implement various operations; and an operating system, including various system programs and configured to implement various basic services and process a hardware-based task.

FIG. 17 shows only one memory. Certainly, a plurality of memories may alternatively be disposed as required.

The transceiver 63 may be a communication module or a transceiver circuit. In this embodiment of this application, the transceiver 63 is configured to perform an operation such as receiving the third handover information in Embodiment 1, Embodiment 2, or Embodiment 4.

The processor 61 may be a controller, a CPU, a general purpose processor, a DSP, an ASIC, an FPGA or another programmable logic device, a transistor logic device, a hardware component, or any combination thereof. The processor 61 may implement or execute various example logical blocks, modules, and circuits described with reference to content disclosed in this embodiment of this application. Alternatively, the processor 61 may be a combination of processors implementing a computing function, for example, a combination of one or more microprocessors or a combination of a DSP and a microprocessor.

In some embodiments, components of the apparatus may be coupled together by using the bus system 64. In addition to a data bus, the bus system 64 may further include a power bus, a control bus, a status signal bus, and the like. However, for clear descriptions, various buses are marked as the bus system 64 in FIG. 17. For ease of illustration, FIG. 17 merely shows an example of the bus system 64.

An embodiment of this application further provides a computer-readable medium. The computer-readable medium stores a computer program. When the computer program is executed by a computer, the methods or the operations performed by the source secondary node in the foregoing embodiments are implemented.

An embodiment of this application further provides a computer program product. When the computer program product is executed by a computer, the methods or the operations performed by the source secondary node in the foregoing embodiments are implemented.

An embodiment of this application further provides an apparatus. The apparatus may be the source secondary node in the foregoing embodiments. The apparatus includes a processor and an interface. The processor is configured to perform the methods or the operations performed by the source secondary node in the foregoing embodiments. It should be understood that the source secondary node may be a chip, and the processor may be implemented by using hardware or software. When the processor is implemented by using the hardware, the processor may be a logic circuit, an integrated circuit, or the like. When the processor is implemented by using the software, the processor may be a general-purpose processor, and is implemented by reading software code stored in a memory. The memory may be integrated into the processor, or may be located outside the processor and exist independently.

Refer to FIG. 17. The apparatus may alternatively be the target secondary node in Embodiment 1, Embodiment 2, or Embodiment 4, and the apparatus may be configured to implement the node handover method implemented by the target secondary node. Herein, for descriptions of functional units included in the apparatus, refer to the foregoing descriptions. Details are not described herein again. In some embodiments, a processor 61, a memory 62, and a transceiver 63 are coupled together by using a bus system 64, to perform the operations of the node handover method implemented by the target secondary node in Embodiment 1, Embodiment 2, or Embodiment 4.

An embodiment of this application further provides a computer-readable medium. The computer-readable medium stores a computer program. When the computer program is executed by a computer, the methods or the operations performed by the target secondary node in the foregoing embodiments are implemented.

An embodiment of this application further provides a computer program product. When the computer program product is executed by a computer, the methods or the operations performed by the target secondary node in the foregoing embodiments are implemented.

An embodiment of this application further provides an apparatus. The apparatus may be the target secondary node in the foregoing embodiments. The apparatus includes a processor and an interface. The processor is configured to perform the methods or the operations performed by the target secondary node in the foregoing embodiments. It should be understood that the target secondary node may be a chip, and the processor may be implemented by using hardware or software. When the processor is implemented by using the hardware, the processor may be a logic circuit, an integrated circuit, or the like. When the processor is implemented by using the software, the processor may be a general-purpose processor, and is implemented by reading software code stored in a memory. The memory may be integrated into the processor, or may be located outside the processor and exist independently.

Refer to FIG. 17. The apparatus may alternatively be the master node in Embodiment 1 or Embodiment 2, and the apparatus may be configured to implement the node handover method implemented by the master node. Herein, for descriptions of functional units included in the apparatus, refer to the foregoing descriptions. Details are not described herein again. In some embodiments, a processor 61, a memory 62, and a transceiver 63 are coupled together by using a bus system 64, to perform the operations of the node handover method implemented by the master node in Embodiment 1 or Embodiment 2.

An embodiment of this application further provides a computer-readable medium. The computer-readable medium stores a computer program. When the computer program is executed by a computer, the methods or the operations performed by the master node in the foregoing embodiments are implemented.

An embodiment of this application further provides a computer program product. When the computer program product is executed by a computer, the methods or the operations performed by the master node in the foregoing embodiments are implemented.

An embodiment of this application further provides an apparatus. The apparatus may be the master node in the foregoing embodiments. The apparatus includes a processor and an interface. The processor is configured to perform the methods or the operations performed by the master node in the foregoing embodiments. It should be understood that the master node may be a chip, and the processor may be implemented by using hardware or software. When the processor is implemented by using the hardware, the processor may be a logic circuit, an integrated circuit, or the like. When the processor is implemented by using the software, the processor may be a general-purpose processor, and is implemented by reading software code stored in a memory. The memory may be integrated into the processor, or may be located outside the processor and exist independently.

Refer to FIG. 17. The apparatus may alternatively be the source master node in Embodiment 3 or Embodiment 4, and the apparatus may be configured to implement the node handover method implemented by the source master node. Herein, for descriptions of functional units included in the apparatus, refer to the foregoing descriptions. Details are not described herein again. In some embodiments, a processor 61, a memory 62, and a transceiver 63 are coupled together by using a bus system 64, to perform the operations of the node handover method implemented by the source master node in Embodiment 3 or Embodiment 4.

An embodiment of this application further provides a computer-readable medium. The computer-readable medium stores a computer program. When the computer program is executed by a computer, the methods or the operations performed by the source master node in the foregoing embodiments are implemented.

An embodiment of this application further provides a computer program product. When the computer program product is executed by a computer, the methods or the operations performed by the source master node in the foregoing embodiments are implemented.

An embodiment of this application further provides an apparatus. The apparatus may be the source master node in the foregoing embodiments. The apparatus includes a processor and an interface. The processor is configured to perform the methods or operations performed by the source master node in the foregoing embodiments. It should be understood that the source master node may be a chip, and the processor may be implemented by using hardware or software. When the processor is implemented by using the hardware, the processor may be a logic circuit, an integrated circuit, or the like. When the processor is implemented by using the software, the processor may be a general-purpose processor, and is implemented by reading software code stored in a memory. The memory may be integrated into the processor, or may be located outside the processor and exist independently.

Refer to FIG. 17. The apparatus may alternatively be the target master node in Embodiment 3 or Embodiment 4, and the apparatus may be configured to implement the node handover method implemented by the target master node. Herein, for descriptions of functional units included in the apparatus, refer to the foregoing descriptions. Details are not described herein again. In some embodiments, a processor 61, a memory 62, and a transceiver 63 are coupled together by using a bus system 64, to perform the operations of the node handover method implemented by the target master node in Embodiment 3 or Embodiment 4.

An embodiment of this application further provides a computer-readable medium. The computer-readable medium stores a computer program. When the computer program is executed by a computer, the methods or the operations performed by the target master node in the foregoing embodiments are implemented.

An embodiment of this application further provides a computer program product. When the computer program product is executed by a computer, the methods or the operations performed by the target master node in the foregoing embodiments are implemented.

An embodiment of this application further provides an apparatus. The apparatus may be the target master node in the foregoing embodiments. The apparatus includes a processor and an interface. The processor is configured to perform the methods or operations performed by the target master node in the foregoing embodiments. It should be understood that the target master node may be a chip, and the processor may be implemented by using hardware or software. When the processor is implemented by using the hardware, the processor may be a logic circuit, an integrated circuit, or the like. When the processor is implemented by using the software, the processor may be a general-purpose processor, and is implemented by reading software code stored in a memory. The memory may be integrated into the processor, or may be located outside the processor and exist independently.

FIG. 18 is another schematic diagram of a structure of an apparatus according to an embodiment of this application. The apparatus may be the terminal device in Embodiment 1 to Embodiment 4, and the apparatus may be configured to implement the node handover methods implemented by the terminal device. The apparatus includes a processor 81, a memory 82, a transceiver 83, and a bus system 84.

The memory 82 includes but is not limited to a RAM, a ROM, an EPROM, or a CD-ROM. The memory 82 is configured to store related instructions and data. The memory 82 stores the following elements, an executable module or a data structure, a subset thereof, or an extended set thereof:

operation instructions, including various operation instructions and used to implement various operations; and an operating system, including various system programs and configured to implement various basic services and process a hardware-based task.

FIG. 18 shows only one memory. Certainly, a plurality of memories may alternatively be disposed as required.

The transceiver 83 may be a communication module or a transceiver circuit. In this embodiment of this application, the transceiver 83 is configured to perform an operation such as receiving the second handover information and determining to perform uninterrupted node handover in the foregoing embodiment.

The processor 81 may be a controller, a CPU, a general purpose processor, a DSP, an ASIC, an FPGA or another programmable logic device, a transistor logic device, a hardware component, or any combination thereof. The processor 81 may implement or execute various example logical blocks, modules, and circuits described with reference to content disclosed in this embodiment of this application. Alternatively, the processor 81 may be a combination of processors implementing a computing function, for example, a combination of one or more microprocessors or a combination of a DSP and a microprocessor.

In some embodiments, components of the apparatus may be coupled together by using the bus system 84. In addition to a data bus, the bus system 84 may further include a power bus, a control bus, a status signal bus, and the like. However, for clear descriptions, various buses are marked as the bus system 84 in FIG. 18. For ease of illustration, FIG. 18 merely shows an example of the bus system 84.

An embodiment of this application further provides a computer-readable medium. The computer-readable medium stores a computer program. When the computer program is executed by a computer, the methods or the operations performed by the terminal device in the foregoing embodiments are implemented.

An embodiment of this application further provides a computer program product. When the computer program product is executed by a computer, the methods or the operations performed by the terminal device in the foregoing embodiments are implemented.

An embodiment of this application further provides an apparatus. The apparatus may be the terminal device in the foregoing embodiments. The apparatus includes a processor and an interface. The processor is configured to perform the methods or operations performed by the terminal device in the foregoing embodiments. It should be understood that the terminal device may be a chip, and the processor may be implemented by using hardware or software. When the processor is implemented by using the hardware, the processor may be a logic circuit, an integrated circuit, or the like. When the processor is implemented by using the software, the processor may be a general-purpose processor, and is implemented by reading software code stored in a memory. The memory may be integrated into the processor, or may be located outside the processor and exist independently.

It should be noted that this application further provides a communication system, including the at least one master node, the at least one source secondary node, the at least one target secondary node, and the terminal device; the at least one source master node, the at least one secondary node, the at least one target master node, and the terminal device; or the at least one source master node, the at least one source secondary node, the at least one target master node, the at least one target secondary node, and the terminal device.

All or some of the foregoing method embodiments may be implemented by using software, hardware, firmware, or any combination thereof. When the software is used to implement embodiments, all or some of the method embodiments may be implemented in a form of a computer program product. The computer program product includes one or more computer instructions. When the computer instructions are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (SL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

It should be understood that the terms "system" and "network" may be usually used interchangeably in embodiments of this application. The term "and/or" in embodiments describes only an association relationship between associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, the units and algorithm operations in the examples described with reference to embodiments disclosed in this specification may be implemented by electronic hardware, computer software, or a combination thereof. To clearly describe the interchangeability between the hardware and the software, the foregoing has generally described compositions and operations of each example based on functions. Whether the functions are performed by hardware or software depends on particular applications and design constraints of the technical solutions. A person skilled in the art may use different methods to implement the functions for each particular application, but it should not be considered that the implementation goes beyond the scope of this application.

In embodiments provided in this application, it should be understood that the disclosed systems, apparatuses, and methods may be implemented in other manners. For example, the foregoing apparatuses are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or another form.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

In conclusion, the foregoing descriptions are merely example embodiments of the technical solutions in this application, but are not intended to limit the protection scope of this application. Any modification, equivalent replacement, or improvement made without departing from the spirit and the principle of this application shall fall within the protection scope of this application.

What is claimed is:

1. A node handover method in a communications system comprising:
   receiving, by a source secondary node, first data sent from a core network, via a first radio bearer, for transmission to a terminal device;
   receiving, by the source secondary node, first handover information from a master node, wherein the first handover information indicates the source secondary node to perform first processing on the first data to obtain second data, and perform second processing on the first data to obtain third data in a process of an uninterrupted node handover, wherein each of the second data and the third data include the first data for transmission to the terminal device;
   determining, by the source secondary node, to perform the uninterrupted node handover on the terminal device;
   continuing, by the source secondary node in the process of the uninterrupted node handover, to perform the first processing, wherein the first processing comprises sequence number assignment and performing data encryption or integrity protection based on a first key;
   sending, by the source secondary node in the process of the uninterrupted node handover, the second data, with the first data included, to the terminal device using the first radio bearer;
   performing, by the source secondary node in the process of the uninterrupted node handover, the second processing, and sending the third data to a target secondary node, wherein the second processing comprises sequence number assignment;
   receiving, by the target secondary node, the third data from the source secondary node, and performing third processing on the third data to obtain fourth data that includes the first data, wherein the third processing comprises performing data encryption or integrity protection based on a second key; and
   sending, by the target secondary node in the process of the uninterrupted node handover, the fourth data, with the first data included, to the terminal device using the first radio bearer.

2. The method according to claim 1, wherein the second data is sent to the terminal device via a source secondary cell group (SCG) radio link control (RLC) bearer and/or a first master cell group (MCG) RLC bearer.

3. The method according to claim 1, wherein the fourth data is sent to the terminal device via a first target SCG RLC bearer or a second MCG RLC bearer.

4. The method according to claim 1, further comprising:
receiving, by the target secondary node, third handover information from the master node,
determining, by the target secondary node, the uninterrupted node handover; and
sending, by the target secondary node, handover response information to the master node, wherein the handover response information comprises first security information, the first security information indicates the second key, and the second key is used by the terminal device to perform data decryption or integrity protection verification on the fourth data.

5. The method according to claim 1, further comprising:
determining, by the target secondary node, that the terminal device successfully accesses the target secondary node, and sending handover complete indication information to the master node or the terminal device.

6. The method according to claim 1, further comprising:
sending, by the master node, second handover information to the terminal device to perform the uninterrupted node handover.

7. A node handover method, comprising:
receiving, by a terminal device, second handover information from a master node;
determining, by the terminal device, to perform an uninterrupted node handover;
continuing, by the terminal device in a process of the uninterrupted node handover, to receive second data from a source secondary node, wherein the second data includes first data sent from a core network via a first radio bearer; and
receiving, by the terminal device in the process of the uninterrupted node handover, fourth data from a target secondary node, wherein the fourth data includes the first data sent from the core network via the first radio bearer.

8. The method according to claim 7, wherein the continuing, by the terminal device in the process of the uninterrupted node handover, to receive the second data from the source secondary node comprises:
continuing, by the terminal device in the process of the uninterrupted node handover, to receive, via a first master cell group (MCG) radio link control (RLC) bearer and/or a source secondary cell group (SCG) RLC bearer, the second data sent by the source secondary node.

9. The method according to claim 8, wherein the second handover information further indicates the terminal device to stop receiving the second data via the source SCG RLC bearer and receive the second data via the first MCG RLC bearer.

10. The method according to claim 7, further comprising:
performing, by the terminal device, data decryption or integrity protection verification on the second data based on a first key associated with the source secondary node.

11. The method according to claim 7, wherein the receiving, by the terminal device in the process of the uninterrupted node handover, fourth data from a target secondary node comprises:
receiving, by the terminal device via a first target SCG RLC bearer or a second MCG RLC bearer in the process of the uninterrupted node handover, the fourth data from the target secondary node.

12. The method according to claim 7, wherein the receiving, by the terminal device in the process of the uninterrupted node handover, the fourth data from the target secondary node comprises:
receiving, by the terminal device via a second target SCG RLC bearer in the process of the uninterrupted node handover, the fourth data from the target secondary node.

13. The method according to claim 7, further comprising:
receiving, by the terminal device, handover complete indication information, wherein the handover complete indication information is from the master node or the target secondary node; and
stopping, by the terminal device, receiving data that is on a first radio bearer and that is sent by the source secondary node.

14. A communications apparatus, comprising:
a memory storing instructions; and
at least one processor in communication with the memory, the at least one processor configured, upon execution of the instructions, to perform operations comprising:
receiving second handover information from a master node,
determining to perform an uninterrupted node handover;
continuing, in a process of the uninterrupted node handover, to receive second data from a source secondary node, wherein the second data includes first data sent from a core network via a first radio bearer; and
receiving, in the process of the uninterrupted node handover, fourth data from a target secondary node, wherein the fourth data includes the first data sent from the core network via the first radio bearer.

15. The apparatus according to claim 14, wherein the continuing, in the process of the uninterrupted node handover, to receive the second data from the source secondary node comprises:
continuing, in the process of the uninterrupted node handover, to receive, via a first master cell group (MCG) radio link control (RLC) bearer and/or a source secondary cell group (SCG) RLC bearer, the second data from the source secondary node.

16. The apparatus according to claim 15, wherein the second handover information further indicates a terminal device to stop receiving the second data via the source SCG RLC bearer and receive the second data via the first MCG RLC bearer.

17. The apparatus according to claim 14, wherein the instructions, when executed by the at least one processor, further cause the apparatus to:
perform data decryption and/or integrity protection verification on the second data based on a first key associated with the source secondary node.

18. The apparatus according to claim 14, wherein the receiving, in the process of the uninterrupted node handover, the fourth data from the target secondary node comprises:
receiving, via a first target SCG RLC bearer and/or a second MCG RLC bearer in the process of the uninterrupted node handover, the fourth data from the target secondary node.

19. The apparatus according to claim 14, wherein the receiving, in the process of the uninterrupted node handover, the fourth data from the target secondary node comprises:
receiving, via a second target SCG RLC bearer in the process of the uninterrupted node handover, the fourth data from the target secondary node.

20. The apparatus according to claim 14, wherein the instructions, when executed by the at least one processor, further cause the apparatus to:
receive handover complete indication information, wherein the handover complete indication information is from the master node or the target secondary node; and
stop receiving data that is on a first radio bearer and that is from the source secondary node.

* * * * *